US008538593B2

(12) United States Patent
Sun et al.

(10) Patent No.: US 8,538,593 B2
(45) Date of Patent: Sep. 17, 2013

(54) METHOD FOR INTEGRATING INDIVIDUAL LOAD FORECASTS INTO A COMPOSITE LOAD FORECAST TO PRESENT A COMPREHENSIVE SYNCHRONIZED AND HARMONIZED LOAD FORECAST

(75) Inventors: David Sun, Kirkland, WA (US); Kwok Cheung, Redmond, WA (US); Kenneth Chung, Bellevue, WA (US); Tory McKeag, Duvall, WA (US)

(73) Assignee: Alstom Grid Inc., Redmond, WA (US)

( * ) Notice: Subject to any disclaimer, the term of this patent is extended or adjusted under 35 U.S.C. 154(b) by 286 days.

(21) Appl. No.: 12/830,028

(22) Filed: Jul. 2, 2010

(65) Prior Publication Data
US 2011/0029141 A1 Feb. 3, 2011

(51) Int. Cl.
*G05D 11/00* (2006.01)

(52) U.S. Cl.
USPC .............................. 700/286; 415/90; 210/652

(58) Field of Classification Search
USPC ................... 700/286, 291; 415/90; 210/652
See application file for complete search history.

(56) References Cited

U.S. PATENT DOCUMENTS

| | | | |
|---|---|---|---|
| 4,078,260 A | 3/1978 | Chen et al. | 707/611 |
| 4,455,614 A | 6/1984 | Martz et al. | 700/288 |
| 4,804,938 A | 2/1989 | Rouse et al. | 370/276 |
| 5,136,497 A | 8/1992 | Coe et al. | 700/45 |
| 5,185,886 A | 2/1993 | Edem et al. | 707/611 |
| 5,384,697 A | 1/1995 | Pascucci | 700/10 |
| 5,414,640 A | 5/1995 | Seem | 700/291 |
| 5,594,659 A | 1/1997 | Schlueter | 700/286 |
| 5,598,566 A | 1/1997 | Pascucci et al. | 713/324 |
| 5,655,136 A | 8/1997 | Morgan | 382/187 |
| 5,904,727 A | 5/1999 | Prabhakaran | 701/208 |
| 5,933,355 A | 8/1999 | Deb | 702/60 |
| 5,937,414 A | 8/1999 | Souder et al. | 707/616 |
| 5,963,457 A | 10/1999 | Kanoi et al. | 700/291 |
| 6,021,402 A | 2/2000 | Takriti | 705/412 |
| 6,178,362 B1 | 1/2001 | Woolard et al. | 700/295 |
| 6,259,972 B1 | 7/2001 | Sumic et al. | 700/292 |
| 6,289,267 B1 | 9/2001 | Alexander et al. | 700/286 |
| 6,313,752 B1 | 11/2001 | Corrigan et al. | 340/657 |
| 6,353,847 B1 | 3/2002 | Maruyama et al. | 718/105 |
| 6,528,957 B1 | 3/2003 | Luchacho | 315/307 |
| 6,549,880 B1 | 4/2003 | Willoughby et al. | 703/13 |
| 6,577,962 B1 | 6/2003 | Afshari | 702/61 |
| 6,591,255 B1 | 7/2003 | Tatum et al. | 706/25 |
| 6,620,327 B2* | 9/2003 | Haddock | 210/652 |
| 6,681,154 B2* | 1/2004 | Nierlich et al. | 700/286 |
| 6,681,156 B1 | 1/2004 | Weiss | 700/291 |

(Continued)

OTHER PUBLICATIONS

Tomsovic, K., Bakken, D., Venkatasubramanian, M. and Bose, A.—Designing the Next Generation of Real-Time Control, Communication and Computations for Large Power Systems, Proceedings of the IEEE (Special Issue on Energy Infrastructure Systems), 93(5), May 2005.

(Continued)

*Primary Examiner* — Mohammad Ali
*Assistant Examiner* — Anthony Whittington
(74) *Attorney, Agent, or Firm* — Turocy & Watson, LLP

(57) ABSTRACT

A method is provided for merging different load forecasts for power grid centers. Area load forecasts are accepted from load forecast engines. A relational database saves load forecast engine data. A comprehensive operating plan integrates individual load forecasts into a composite load forecast to present a comprehensive, synchronized and harmonized load forecast.

19 Claims, 31 Drawing Sheets

(56) References Cited

U.S. PATENT DOCUMENTS

| | | | |
|---|---|---|---|
| 6,741,485 B1 | 5/2004 | Runkle et al. | 363/170 |
| 6,813,525 B2 | 11/2004 | Reid et al. | 700/19 |
| 6,885,915 B2 | 4/2005 | Rehtanz et al. | 700/291 |
| 6,901,347 B1 | 5/2005 | Murray et al. | 702/182 |
| 6,925,385 B2 | 8/2005 | Ghosh et al. | 702/14 |
| 6,961,641 B1 | 11/2005 | Forth et al. | 700/295 |
| 6,965,454 B1 | 11/2005 | Silverbrook et al. | 358/1.9 |
| 7,058,522 B2 | 6/2006 | Chen | 702/60 |
| 7,177,727 B2 | 2/2007 | Chu et al. | 700/287 |
| 7,177,728 B2 | 2/2007 | Gardner | 700/295 |
| 7,194,338 B2 | 3/2007 | Schlueter et al. | 700/286 |
| 7,233,843 B2 | 6/2007 | Budhraja et al. | 700/291 |
| 7,283,930 B2 | 10/2007 | Flynn | 702/182 |
| 7,305,282 B2 * | 12/2007 | Chen | 700/291 |
| 7,343,226 B2 | 3/2008 | Ehlers et al. | 700/276 |
| 7,454,717 B2 | 11/2008 | Hinckley et al. | 715/863 |
| 7,519,438 B2 | 4/2009 | Barbour et al. | 700/22 |
| 7,558,703 B2 | 7/2009 | Stoupis et al. | 702/183 |
| 7,689,394 B2 | 3/2010 | Furem et al. | 703/8 |
| 7,774,307 B2 | 8/2010 | Ju et al. | 707/616 |
| 7,831,569 B2 | 11/2010 | Bestgen et al. | 707/676 |
| 7,873,442 B2 * | 1/2011 | Tsui | 700/291 |
| 8,222,765 B2 | 7/2012 | Collins et al. | 307/44 |
| 8,280,799 B2 | 10/2012 | Bing | 705/37 |
| 2001/0045949 A1 | 11/2001 | Chithambaram et al. | 345/418 |
| 2002/0029097 A1 | 3/2002 | Pionzio, Jr. et al. | 700/287 |
| 2002/0032535 A1 | 3/2002 | Alexander et al. | 702/64 |
| 2002/0042789 A1 | 4/2002 | Michalewicz et al. | 707/3 |
| 2002/0085326 A1 | 7/2002 | Kim et al. | 361/42 |
| 2002/0198629 A1 * | 12/2002 | Ellis | 700/286 |
| 2003/0158631 A1 | 8/2003 | Masuda et al. | 700/286 |
| 2003/0171851 A1 | 9/2003 | Brickfield et al. | 700/286 |
| 2004/0093124 A1 | 5/2004 | Havlena | 700/291 |
| 2004/0117330 A1 | 6/2004 | Ehlers et al. | 705/412 |
| 2004/0139038 A1 | 7/2004 | Ehlers et al. | 705/412 |
| 2004/0158360 A1 * | 8/2004 | Garland et al. | 700/286 |
| 2004/0220702 A1 | 11/2004 | Matsubara et al. | 700/291 |
| 2004/0225648 A1 | 11/2004 | Ransom et al. | 707/3 |
| 2004/0225649 A1 | 11/2004 | Yeo et al. | 707/3 |
| 2004/0249775 A1 | 12/2004 | Chen | 706/21 |
| 2004/0260430 A1 * | 12/2004 | Mansingh et al. | 700/286 |
| 2004/0260489 A1 | 12/2004 | Mansingh et al. | 702/60 |
| 2005/0033481 A1 | 2/2005 | Budhraja et al. | 700/286 |
| 2005/0039787 A1 | 2/2005 | Bing | 136/243 |
| 2005/0055330 A1 | 3/2005 | Britton et al. | 707/1 |
| 2005/0071124 A1 | 3/2005 | Komatsu | 702/182 |
| 2005/0169743 A1 * | 8/2005 | Hicks | 415/90 |
| 2005/0197742 A1 * | 9/2005 | Scott et al. | 700/286 |
| 2005/0234600 A1 * | 10/2005 | Boucher et al. | 700/286 |
| 2005/0240381 A1 | 10/2005 | Seiler et al. | 703/1 |
| 2005/0240539 A1 | 10/2005 | Olavson | 705/400 |
| 2006/0005738 A1 | 1/2006 | Kumar | 105/35 |
| 2006/0072828 A1 | 4/2006 | Silverbrook et al. | 382/203 |
| 2006/0156248 A1 | 7/2006 | Chaudhri et al. | 715/779 |
| 2006/0167591 A1 * | 7/2006 | McNally | 700/291 |
| 2006/0174209 A1 | 8/2006 | Barros | 715/764 |
| 2006/0200308 A1 | 9/2006 | Arutunian | 701/208 |
| 2006/0206240 A1 * | 9/2006 | Tsui | 700/291 |
| 2006/0259199 A1 | 11/2006 | Gjerde et al. | 700/284 |
| 2007/0083821 A1 | 4/2007 | Garbow et al. | 715/781 |
| 2007/0143046 A1 | 6/2007 | Budike | 702/62 |
| 2007/0156291 A1 | 7/2007 | Curt et al. | 700/286 |
| 2007/0213956 A1 | 9/2007 | Nasle et al. | 702/182 |
| 2007/0236507 A1 | 10/2007 | Tigges | 345/592 |
| 2007/0244604 A1 * | 10/2007 | McNally | 700/291 |
| 2007/0276547 A1 | 11/2007 | Miller | 700/295 |
| 2007/0285079 A1 | 12/2007 | Nasle | 324/76.22 |
| 2008/0077368 A1 | 3/2008 | Nasle | 703/4 |
| 2008/0167756 A1 * | 7/2008 | Golden et al. | 700/297 |
| 2008/0174564 A1 | 7/2008 | Kim et al. | 345/173 |
| 2008/0189656 A1 | 8/2008 | Abanami et al. | 715/810 |
| 2008/0263469 A1 | 10/2008 | Nasle et al. | 715/771 |
| 2008/0301565 A1 | 12/2008 | Abhyanker | 715/744 |
| 2009/0062969 A1 | 3/2009 | Chandra et al. | 700/291 |
| 2009/0073191 A1 | 3/2009 | Smith et al. | 345/629 |
| 2009/0093916 A1 | 4/2009 | Parsonnet et al. | 700/286 |
| 2009/0234511 A1 | 9/2009 | Ouchi et al. | 700/291 |
| 2010/0076835 A1 | 3/2010 | Silverman | 705/14.33 |
| 2010/0100250 A1 | 4/2010 | Budhraja et al. | 700/291 |
| 2010/0179704 A1 | 7/2010 | Ozog | 700/291 |
| 2010/0222935 A1 | 9/2010 | Forbes, Jr. et al. | 700/291 |
| 2010/0274402 A1 | 10/2010 | Shaffer | 700/291 |
| 2010/0292856 A1 | 11/2010 | Fujita | 700/291 |
| 2011/0029141 A1 | 2/2011 | Sun et al. | 700/291 |
| 2011/0029142 A1 | 2/2011 | Sun et al. | 700/291 |
| 2011/0029147 A1 | 2/2011 | Sun et al. | 700/295 |
| 2011/0035071 A1 | 2/2011 | Sun et al. | 700/291 |
| 2011/0071690 A1 | 3/2011 | Sun et al. | 700/286 |
| 2011/0173109 A1 | 7/2011 | Synesiou et al. | 705/34 |
| 2011/0202467 A1 | 8/2011 | Hilber et al. | 705/80 |
| 2011/0231028 A1 | 9/2011 | Ozog | 700/291 |
| 2011/0282508 A1 | 11/2011 | Goutard et al. | 700/293 |

OTHER PUBLICATIONS

Overbye, T. J., Meliopoulos, A.P., Wiegmann, D.A., & Cokkinides, G.J. (2005) Visualization of Power Systems and Components: Final Report. University of Illinois at Urbana-Champaign. Power Systems Engineering Research Center (PSERC) Publication 05-065.

Ray Klump, David Schooley, et al. "An advanced visualization platform for real-time power systems operations". Power Systems Computation Conference (PSCC), Sevilla, Spain, Jun. 2002, 8 pages.

Pahalawaththa, N.C. Arnold, C P. Shurety, M. "A power system CAD package for the workstation and personal computer environment." IEEE Transactions on Power Systems. vol. 6, No. 1, pp. 400-406. Feb. 1991.

CERTS Real-time Voltage Monitoring and VAR Management System, California Energy Commission, Oct. 2003, P500-03-087F, 20 pages.

A. P. Sakis Meliopoulos, Power System Modeling, Analysis and Control, Georgia Institute of Technology, 2002.

Wu, F.F. Moslehi, K. Bose, A. Power System Control Centers; Past, Present, and Future. Proceedings IEEE, 2005, vol. 93; No. 11, pp. 1890-1908.

S Raul Vilcahuaman, Volt/Var Control with Interactive Graphics Interface on Distribution Systems. Publication and date presently unknown. [Retrieved Apr. 9, 2010]. Downloaded from the Internet: <url>http://www.iansa.com.pe/volt_var_control.PDF.

Rasmussen, Neil, "Increasing data center efficiency by using improved high density power distribution", American Power Conversion, pp. 1-10, (2008).

http://www.techsmith.com/snagit-feature.html.

http://en.wikipedia.org/wiki/snagit.

* cited by examiner

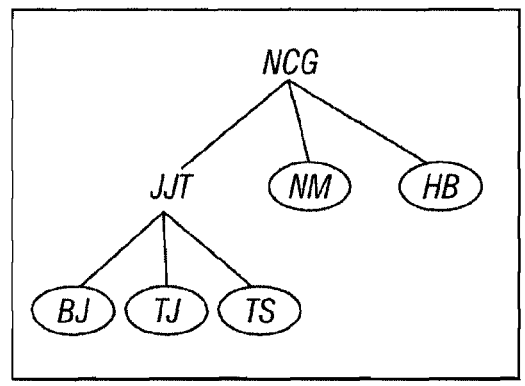
Case A
FIG. 11
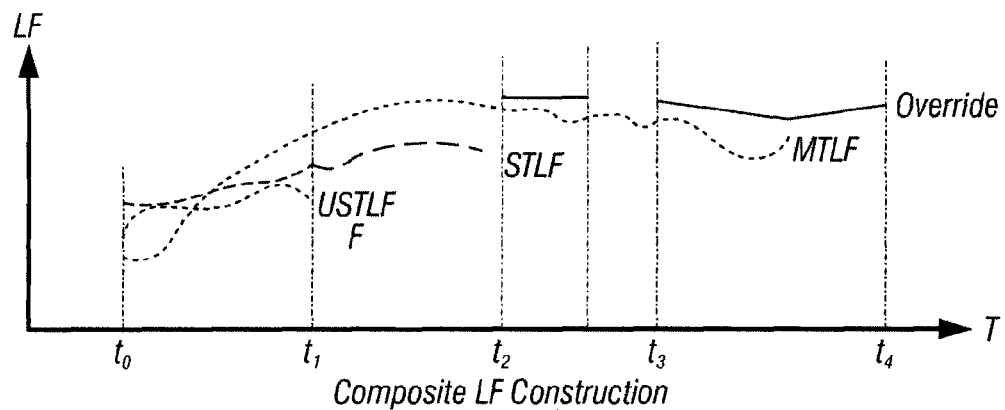
Composite LF Construction
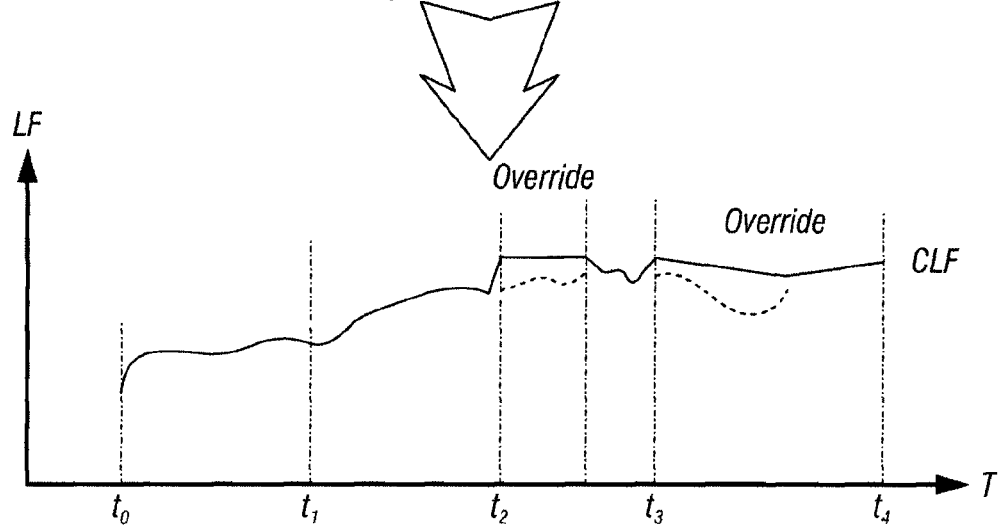
FIG. 12

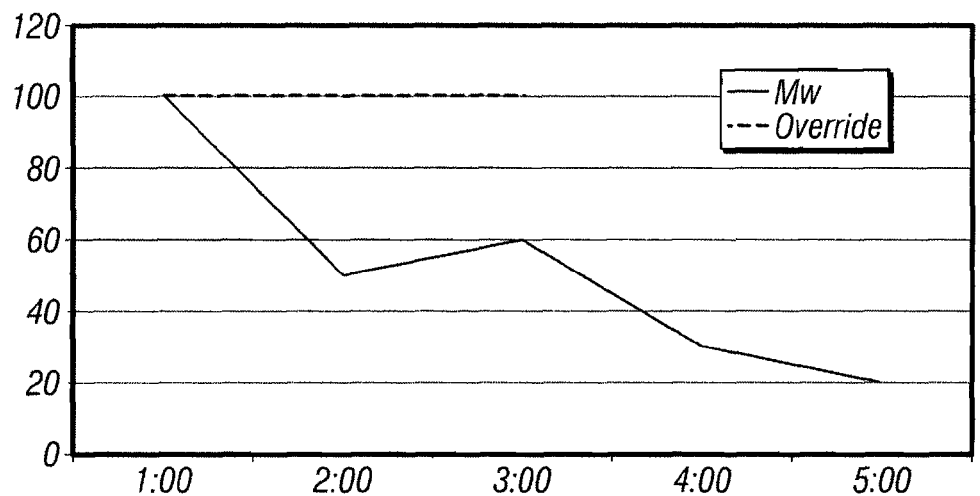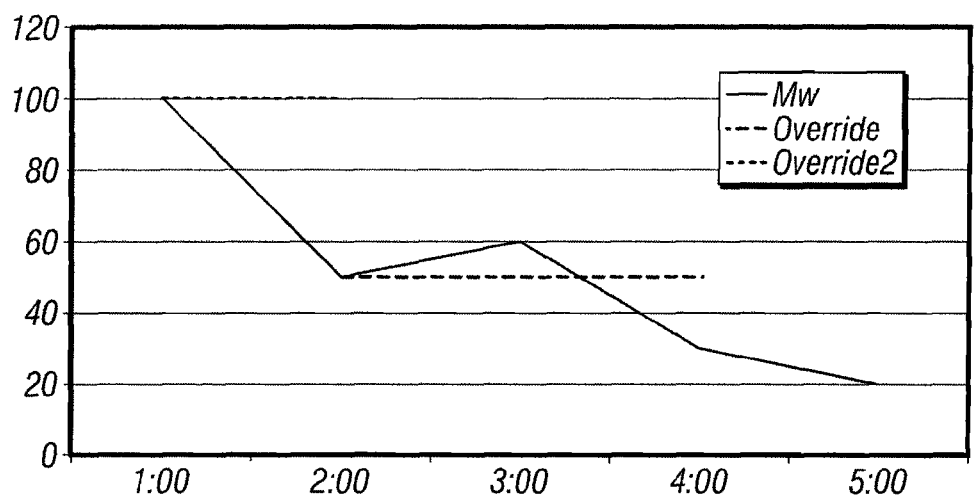
FIG. 14 (Con't)

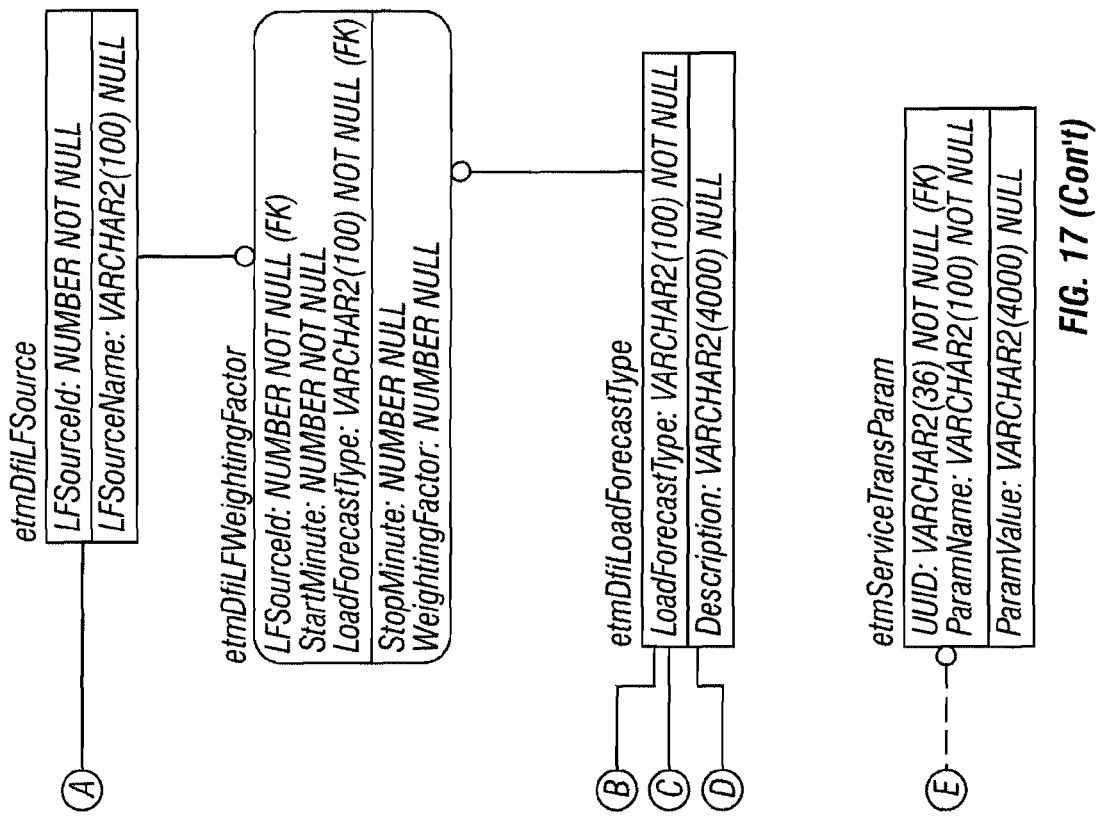
FIG. 17 (Con't)

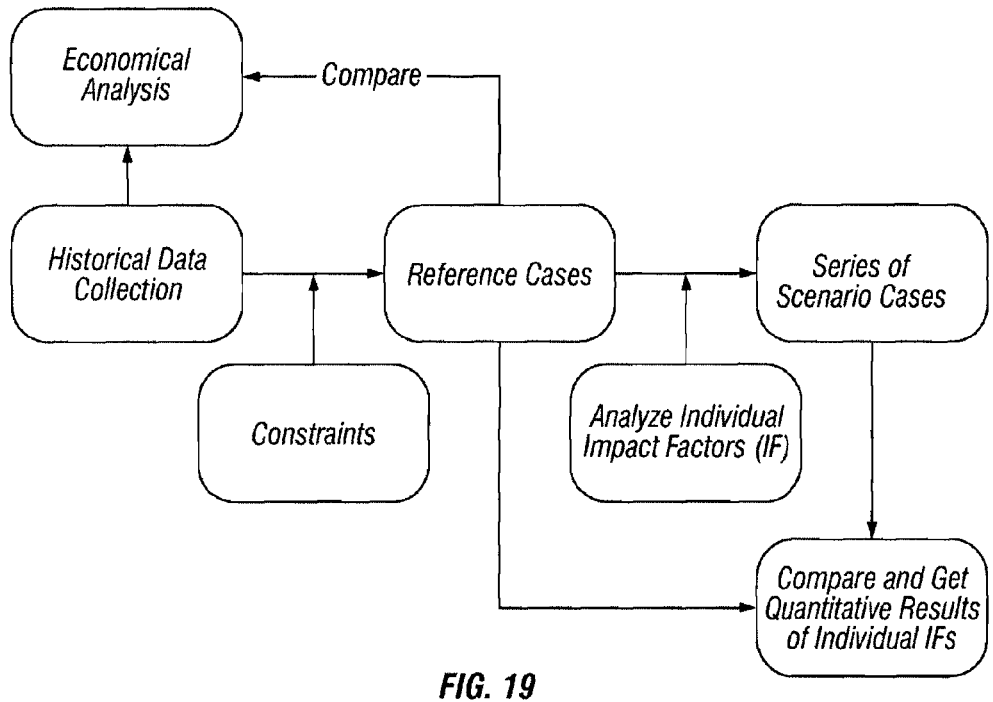

FIG. 19 etmAFA_ProductionCase

| Interval: DATE NOT NULL |
|---|
| ProductionCaseId: NUMBER NULL<br>SEProductionCaseId: NUMBER NULL<br>NetModelName: VARCHAR2(50) NULL<br>CtgModelName: VARCHAR2(50) NULL<br>FixedCT: NUMBER(1) NULL<br>LookAhead: NUMBER NULL | etmAFA_ActualASResource

| Interval: DATE NOT NULL<br>MRId: VARCHAR2(50) NOT NULL<br>ASType: VARCHAR2(20) NOT NULL |
|---|
| ResourceType: VARCHAR2(20) NULL (IE1.1)<br>MW: NUMBER(8,1) NULL | etmAFA_ActualTransaction

| Interval: DATE NOT NULL<br>TransactionName: VARCHAR2(50) NOT NULL |
|---|
| MW: NUMBER(8,1) NULL | etmAFA_ActualLoad

| Interval: DATE NOT NULL<br>AreaName: VARCHAR2(50) NOT NULL |
|---|
| MW: NUMBER(8,1) NOT NULL | etmAFA_ActualResource

| Interval: DATE NOT NULL<br>MRId: VARCHAR2(50) NOT NULL |
|---|
| ResourceType: VARCHAR2(20) NULL (IE1.1)<br>ScheduleId: VARCHAR2(50) NULL<br>Status: NUMBER(1) NULL<br>MW: NUMBER(8,1) NULL | etmAFA_ActualPAR

| Interval: DATE NOT NULL<br>ParName: VARCHAR2(30) NOT NULL |
|---|
| Angle: NUMBER NULL |

FIG. 20

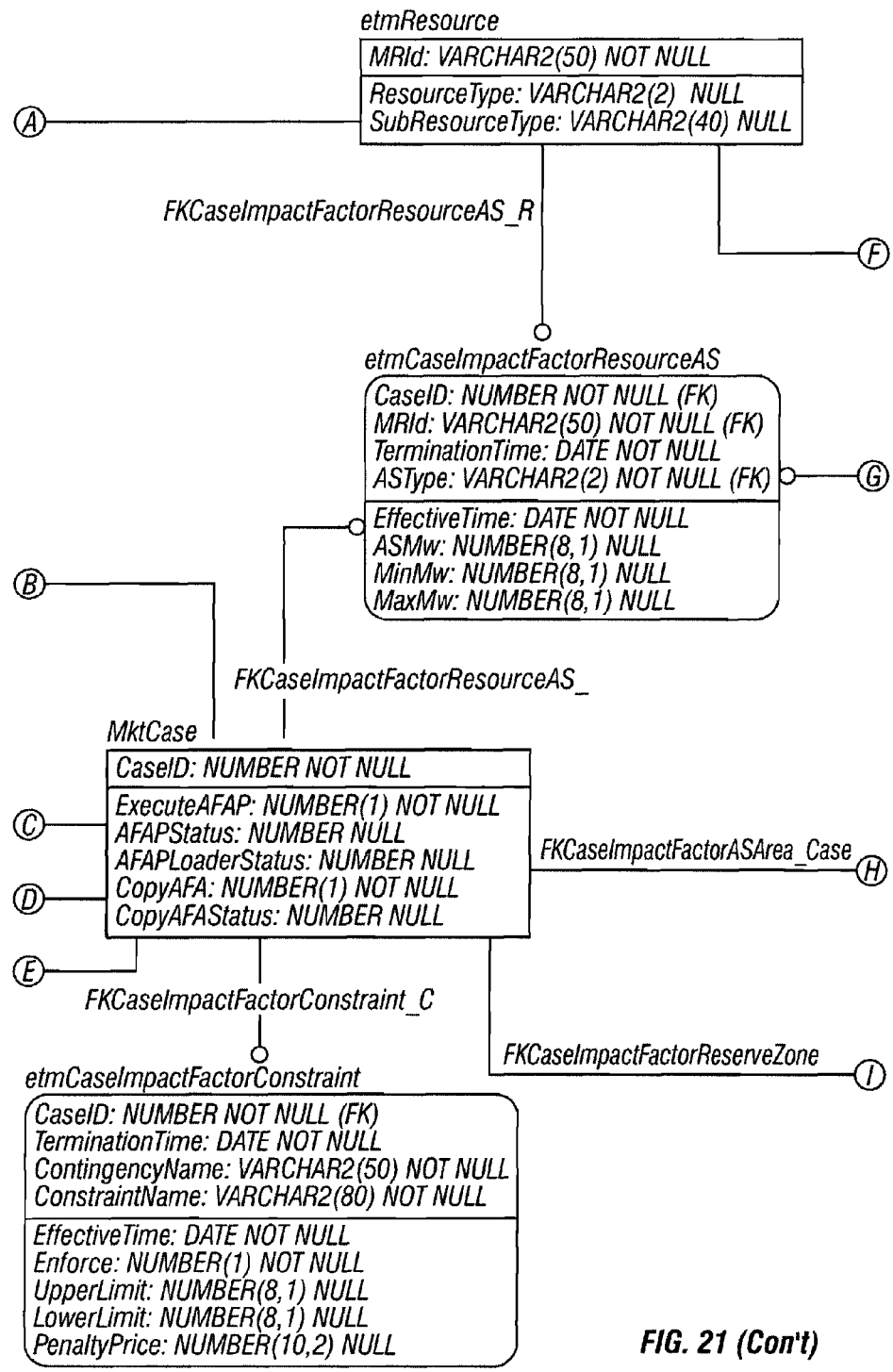
FIG. 21 (Con't)

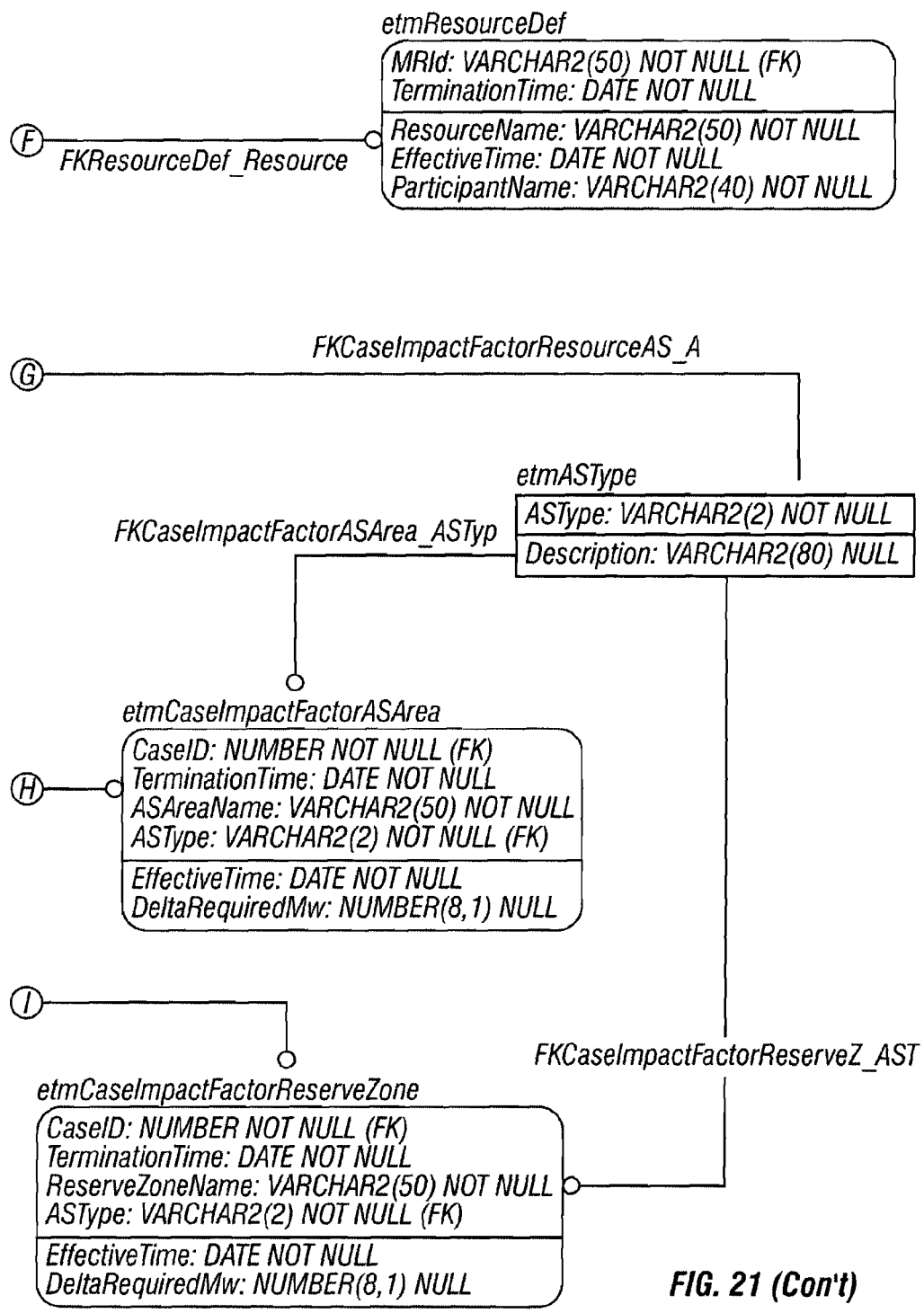
FIG. 21 (Con't)

METHOD FOR INTEGRATING INDIVIDUAL LOAD FORECASTS INTO A COMPOSITE LOAD FORECAST TO PRESENT A COMPREHENSIVE SYNCHRONIZED AND HARMONIZED LOAD FORECAST

BACKGROUND

1. Field of the Invention

The present invention relates generally to load forecast and more particularly to methods for integrating individual load forecasts into a composite load forecast to present a comprehensive, synchronized and harmonized load forecast.

2. Description of the Related Art

With respect to the electric power grid, expensive peak power—electric power delivered during periods of peak demand—can cost substantially more than off-peak power. The electric power grid itself has become increasingly unreliable and antiquated, as evidenced by frequent large-scale power outages. Grid instability wastes energy, both directly and indirectly, for example, by encouraging power consumers to install inefficient forms of backup generation.

Clean forms of energy generation, such as wind and solar, suffer from intermittency. Hence, grid operators are reluctant to rely heavily on these sources, making it difficult to move away from standard, typically carbon-intensive forms of electricity.

The electric power grid contains limited inherent facility for storing electrical energy. Electricity must be generated in a balanced fashion to meet uncertain demand, which often results in either over or under commitment or dispatch of generation, hence system inefficiency, system insecurity and power failures.

Distributed electric resources, en masse can provide a significant resource for addressing the above problems. However, current power services infrastructure lacks provisioning and flexibility that are required for aggregating a large number of small-scale resources (e.g., electric vehicle batteries) to meet medium- and large-scale needs of power services.

Classical dispatch of energy, (i) is cost based with centralized generation, (ii) is passive with static demand, (iii) has inaccurate parameters, (iv) has manual re-dispatch to relieve grid security violations, (v) uses ad-hoc forward scheduling that is disconnected from real time dispatch, (vi) designed only for rather normally inter-connected system operation and (vii) is limited in forensic analysis.

Thus, significant opportunities for improvement exist in the electrical sector. Real-time balancing of generation and load can be realized with reduced cost and environmental impact. More economical, reliable electrical power can be provided at times of peak demand. Power services, such as regulation and spinning' reserves, can be provided to electricity markets to stabilize the grid and provide a significant economic opportunity. Technologies can be enabled to provide broader use of intermittent power sources, such as wind and solar.

There is a need for methods and system tools that merge different load forecasts for power grid centers. There is a further need for methods and system tools that integrate individual load forecasts are into a composite load forecast to present a comprehensive, synchronized and harmonized load forecast. There is a further need for methods and system tools to merge different load forecasts for power grid centers that allows an operator to review input load forecasts and modify load forecasts with an override capability. There is another need for need for methods and system tools that merge different load forecasts for power grid centers and improved load forecasts are provided over different time horizons.

SUMMARY

An object of the present invention is to provide methods that merge different load forecasts for power grid centers.

Another object of the present invention is to provide methods that integrate individual load forecasts are into a composite load forecast to present a comprehensive, synchronized and harmonized load forecast.

A further object of the present invention is to provide methods to merge different load forecasts for power grid centers that allow an operator to review input load forecasts and modify load forecasts with an override capability.

Yet another object of the present invention is to provide methods that merge different load forecasts for power grid centers and improved load forecasts are provided over different time horizons.

Still another object of the present invention is to provide methods that merge different load forecasts for power grid centers where load forecast requests from different clients are served with consistent load forecast data.

Another object of the present invention is to provide methods that merge different load forecasts for power grid centers that has an operator interface to a plurality of load forecast engines and configured to streamline with a reduction of repetitive manual entries.

Yet another object of the present invention is to provide methods that merge different load forecasts for power grid centers that permits an operator to view individual load forecasts and a composite load forecast and perform an operator override selected from at least one of, scaling, adding, setting and linear transformation.

A further object of the present invention is to provide methods that merge different load forecasts for power grid centers that synthesizes a composite load profile for any given scheduling study period.

Still another object of the present invention is to provide methods that merge different load forecasts for power grid centers with boundary processing that includes at least one of priority and averaging.

In one embodiment of the present invention, a method is provided for merging different load forecasts for power grid centers. Area load forecasts are accepted from load forecast engines. A relational database saves load forecast engine data. A comprehensive operating plan integrates individual load forecasts into a composite load forecast to present a comprehensive, synchronized and harmonized load forecast.

In another embodiment of the present invention, a method merges different load forecasts for power grid centers and accepts area load forecasts from load forecast engines that are integrated within a common service framework. A relational data base saves load forecast engine data. A comprehensive operating plan integrates individual load forecasts into a composite load forecast to present a comprehensive, synchronized and harmonized load forecast.

In another embodiment of the present invention, a method merges different load forecasts for power grid centers and accepts area load forecasts from load forecast engines. Load forecast requests are served from different clients with consistent load forecast data. Individual load forecasts are integrated into a composite load forecast to present a comprehensive, synchronized and harmonized load forecast.

In another embodiment of the present invention, a method merges different load forecasts for power grid centers and accepts area load forecasts from load forecast engines. A relational data base saves load forecast engine data. A comprehensive operating plan integrates individual load forecasts into a composite load forecast to present a comprehensive, synchronized and harmonized load forecast. At least one of scaling, adding, setting and linear transformation is performed.

BRIEF DESCRIPTION OF THE DRAWINGS

FIG. 11 illustrates one embodiment of a load forecast area tree for a demand forecast integrator.

FIG. 12 is a graph that illustrates load forecast construction for a single load forecast area for a demand forecast integrator.

FIG. 19 illustrates one embodiment of perfect dispatch that can be used with AFA in one embodiment of the present invention.

FIG. 20 illustrates one embodiment of new schema for historical data that can be used with AFA in one embodiment of the present invention.

FIG. 24 illustrates a list of read only summary displays for market operator interface (MOI) solutions in one embodiment of the present invention.

FIG. 26 illustrates an embodiment of the present invention of case comparison.

FIG. 29 illustrates an embodiment of the present invention for creating and editing mappings with setting query procedure parameters stored in a database.

FIGS. 30 and 31 one embodiment of the present invention for creating and editing mappings where the last step is saving the mapping or/and run export.

DETAILED DESCRIPTION

Figure 1:
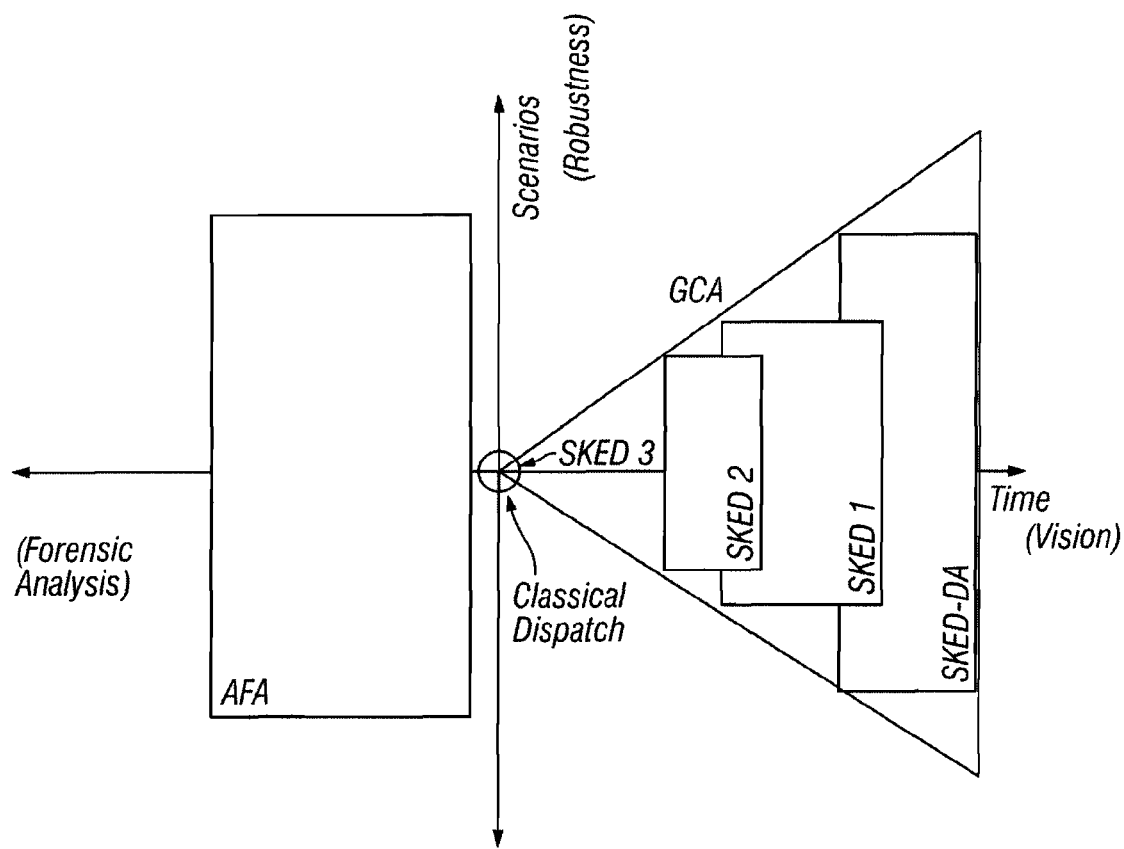
FIG. 1 illustrates one embodiment of a dispatch system of the present invention illustrating time and scenario dimensions.

The following terms and acronyms are used in this specification:

CXF—Apache CXF is an open source services framework. CXF helps you build and develop services using frontend programming APIs, JAXB—Java Architecture for XML Binding (JAXB) allows Java developers to map Java classes to XML representations Hibernate—A powerful, high performance object/relational persistence and query service.

Spring Framework—container: configuration of application components and lifecycle management of Java objects WSDL (web services description language) is an XML format for describing network services as a set of endpoints operating on messages containing either document-oriented or procedure-oriented information.

In one embodiment of the present invention a method is provided for merging different load forecasts for power grid centers. Area load forecasts are accepted from load forecast engines. A relational database saves load forecast engine data. A comprehensive operating plan (COP) integrates individual load forecasts into a composite load forecast to present a comprehensive, synchronized and harmonized load forecast.

In another embodiment of the present invention, a method merges different load forecasts for power grid centers and accepts area load forecasts from load forecast engines that are integrated within a common service framework. A relational data base saves load forecast engine data. A comprehensive operating plan integrates individual load forecasts into a composite load forecast to present a comprehensive, synchronized and harmonized load forecast.

In another embodiment of the present invention, a method merges different load forecasts for power grid centers and accepts area load forecasts from load forecast engines. Load forecast requests are served from different clients with consistent load forecast data. Individual load forecasts are integrated into a composite load forecast to present a comprehensive, synchronized and harmonized load forecast.

In another embodiment of the present invention, a method merges different load forecasts for power grid centers and accepts area load forecasts from load forecast engines. A relational data base saves load forecast engine data. A comprehensive operating plan integrates individual load forecasts into a composite load forecast to present a comprehensive, synchronized and harmonized load forecast. At least one of scaling, adding, setting and linear transformation is performed.

In one embodiment, the present invention provides an energy system tool for dispatchers in power grid control systems that is suitable for renewable resources and the demand response. Outputs of many of the renewable resources do not follow traditional generation/load correlation but have strong dependencies on weather conditions, which from a system prospective are posing new challenges associated with the monitoring and controllability of the demand-supply balance. As distributed generations, demand response and renewable energy resources become significant portions of overall system installed capacity, a smarter system tool for dispatchers in power grid control systems for generation resources is required to cope with the new uncertainties being introduced by the new resources.

In one embodiment, the energy system tool for dispatchers in power grid control systems of the present invention is provided that copes with the increasing uncertainties introduced by distributed energy resources and provides a better holistic and forward-looking view of system conditions and generation patterns to enable system operators to make better decisions. Such features are deemed critical for the success of efficient power system operations in the near future.

In one embodiment of the present invention, an energy system tool for dispatchers in power grid control systems is provided that is suitable for uncertainties associated with renewal energy resources and demand response in order to create a better predictive model. In one embodiment, the system tool for dispatchers in power grid control systems of the present invention provides improved modeling of transmission constraints, better modeling of resource characteristics such as capacity limits and ramp rates, more accurate demand forecasting and the like. In another embodiment, the energy system tool for dispatchers in power grid control systems of the present invention addresses the robustness of dispatch solutions. Optimality or even feasibility of dispatch solutions can be very sensitive to system uncertainties.

In one embodiment of the present invention, a method is provided that enables dispatchers in power grid control centers to manage changes by applying multi-interval dispatch. A SKED engine, and a comprehensive operating plan are used. Multiple system parameter scenarios are coordinated. Each SKED engine is capable of providing at least one of, scheduling, dispatch and commitment.

In another embodiment of the present invention, a method provides dispatchers in power grid control centers a capability to manage changes using multi-interval dispatch. A multi-stage resource engine SKED, and a comprehensive operating plan are provided. The SKED engine includes at least SKED1, SKED2, and SKED3 to address scheduling proposes of different time frame. Multiple system parameter scenarios are coordinated.

When compared to the classical dispatch which only deals with a particular scenario for a single time point, the present invention addresses a spectrum of scenarios for a broad time range. Scenario analysis assesses the sensitivity or robustness of resource commitment/dispatch solutions with respect to scenario perturbation. However, the expansion in time and scenarios for the present invention makes the problem of the present invention itself fairly challenging from both a computational perspective and a user interface presentation perspective. Not only the general control application and after the fact analysis need to handle multiple time interval analysis which is computationally more demanding, but also there is significant challenge to effectively present multi-dimensional resultant data to system operators without overwhelming them. FIG. 1 schematically describes how applications of the system tool for dispatchers in power grid control systems of the present invention span the space of time and scenarios.

In one embodiment, the present invention provides an energy system tool for dispatchers in power grid control systems that is suitable for renewable resources and the demand response. Outputs of many of the renewable resources do not follow traditional generation/load correlation but have strong dependencies on weather conditions, which from a system prospective are posing new challenges associated with the monitoring and controllability of the demand-supply balance. As distributed generations, demand response and renewable energy resources become significant portions of overall system installed capacity, a smarter system tool for dispatchers in power grid control systems for generation resources is required to cope with the new uncertainties being introduced by the new resources.

In one embodiment, the energy system tool for dispatchers in power grid control systems of the present invention is provided that copes with the increasing uncertainties introduced by distributed energy resources and provides a better holistic and forward-looking view of system conditions and generation patterns to enable system operators to make better decisions. Such features are deemed critical for the success of efficient power system operations in the near future.

In one embodiment of the present invention, an energy system tool for dispatchers in power grid control systems is provided that is suitable for uncertainties associated with renewal energy resources and demand response in order to create a better predictive model. In one embodiment, the system tool for dispatchers in power grid control systems of the present invention provides improved modeling of transmission constraints, better modeling of resource characteristics such as capacity limits and ramp rates, more accurate demand forecasting and the like. In another embodiment, the energy system tool for dispatchers in power grid control systems of the present invention addresses the robustness of dispatch solutions. Optimality or even feasibility of dispatch solutions can be very sensitive to system uncertainties.

The system tool for dispatchers in power grid control systems of the present invention can provide one or more of the following, (i) extension for price-based, distributed, less predictable resources, (ii) active, dynamic demand, (iii) modeling parameter adaptation, (iv) congestion management with security constrained optimization, (v) continuum from forward scheduling to real-time dispatch, (vi) extension for dynamic, multi-island operation in emergency and restoration, (vii) after-the-fact analysis for performance matrices, root-cause impacts and process re-engineering and the like.

In one embodiment, the system tool of the present invention provides multi-stage engines, including but not limited to SKED 1,2 and 3 engines, the comprehensive operating plan, adaptive model management and the like. Each SKED engine performs at least of, scheduling, commitment of resources, and dispatch of resources, depending on the application. Each SKED engine can be a mixed integer programming/linear programming based optimization application which includes both unit commitment and unit dispatch functions. Unit commitment is the process of preparing a unit to generate at some point in the future usually taken into consideration of the various unit characteristics including time and cost factors.

Each SKED engine can be easily configured to perform scheduling processes with different heart beats and different look-ahead time. The multi-stage resource scheduling, SKED engine, process is security constrained unit commitment and economic dispatch sequences with different look-ahead periods, which as a non-limiting example can be 6 hours, 2 hours and 20 minutes, updating resource schedules at different cycle frequencies (e.g. 5 min, 15 min or hourly). The results of each stage form progressively refined regions that guide the dispatching decision space of the subsequent stages. Various SKED engine cycles are coordinated through a comprehensive operating plan, as more fully explained hereafter.

In one embodiment, the present invention provides a general control application which enhances an operators' decision making process under changing system conditions, including but not limited to, load, generation, interchanges, transmission constraints and the like, in near real-time. The general control application to enhance an operators' decision making process under changing system condition, load, generation, interchanges, transmission constraints, the like, is in near real-time or at real time. The general control application is composed of several distinct elements.

The general control application is an application designed to provide dispatchers in large power grid control centers with the capability to manage changes in load, generation, interchange and transmission security constraints simultaneously on a intra-day and near real-time operational basis. The general control application uses least-cost security-constrained economic scheduling and dispatch algorithms with resource commitment capability to perform analysis of the desired generation dispatch. With the latest state estimation solution as the starting point and transmission constraint data from the energy management system, general control application optimization engines, the SKED engine, will look ahead at different time frames to forecast system conditions and alter generation patterns within those timeframes. The SKED engines coordinate with the comprehensive operating plan. A constraint means one or more resources called on by the operator for managing the congestion that occurs with a lack or dimension of a transmission ability.

A general control application SKED engine function is a series of multi-stage scheduling processes. The results of each stage form progressively refined regions that guide the dispatching contour of the subsequent stage. By having a time-profiled representation for each stage, and then systematically linking adjoining stages into a series of consistently refined schedules, the general control application provides realistic dispatch and pricing signals for resources to follow.

In one embodiment, the general control application is built on a modular and flexible system architecture. Different SKED engine processes can be correlated and need not replay on each other. Orchestration between an individual engine (SKEDi) can be managed by the comprehensive operating plan. This embodiment provides low-risk, cost-effective business process evolution. Additionally, this embodiment also ensures high availability for the mission critical real-time general control application SKED engine functions. Failure of any one or more SKED engine components causes smooth degradation of, instead of abrupt service interruptions to, real-time dispatch instructions.

As a non-limiting example, a configuration for the general control application can include three SKED engine sequences. SKED1 can provide the system operator with intra-day incremental resource, including generators and demand side responses, commitment/de-commitment schedules based on day-ahead unit commitment decision to manage forecasted upcoming peak and valley demands and interchange schedules while satisfying transmission security constraints and reserve capacity requirements.

The general control application can be utilized to provide dispatchers in large power grid control centers with the capability to manage changes in load, generation, interchange and transmission security constraints simultaneously on a intra-day and near real-time operational basis. The general control application uses least-cost security-constrained economic scheduling and dispatch algorithms with resource commitment capability to perform analysis of the desired generation dispatch. State estimator is computer software to estimate the quasi-steady state of the power system. With the latest state estimator solution as the starting point and transmission constraint data from the energy management system, general control application optimization engines, a SKED engine, looks ahead at different time frames to forecast system conditions and alter generation patterns within those timeframes.

In one embodiment, the key components of general control application include: security constrained economic dispatch—SKED engines 1, 2, 3 and orchestrator and memory. In one embodiment, three SKED engine sequences have different business objectives and different look-ahead periods. SKED1 is envisioned to perform the "day of" commitment akin to the day ahead market/reliability commitment function, taking into account somewhat real-time and projected system conditions. SKED 2 will position the steam units at the appropriate time to allow for various other units (combustion turbine's and hydro) to startup or shutdown. Guided by SKED 2, SKED 3 provides more accurate unit dispatch trajectory for next, as a non-limiting example 15-20 minutes, with more accurate forecasting inputs.

The orchestrator and memory can be envisioned as an intelligent dispatch management system. In one embodiment, orchestrator and memory permits the general control application to be both scalable and flexible, and adaptable to business rule changes and/or creation of new components within the general control application ("plug-n-play"). The orchestrator and memory component can take information from all general control application components and provide cohesive dispatch solutions allowing for operational decisions to be both timely and cost-effective.

Figure 2:
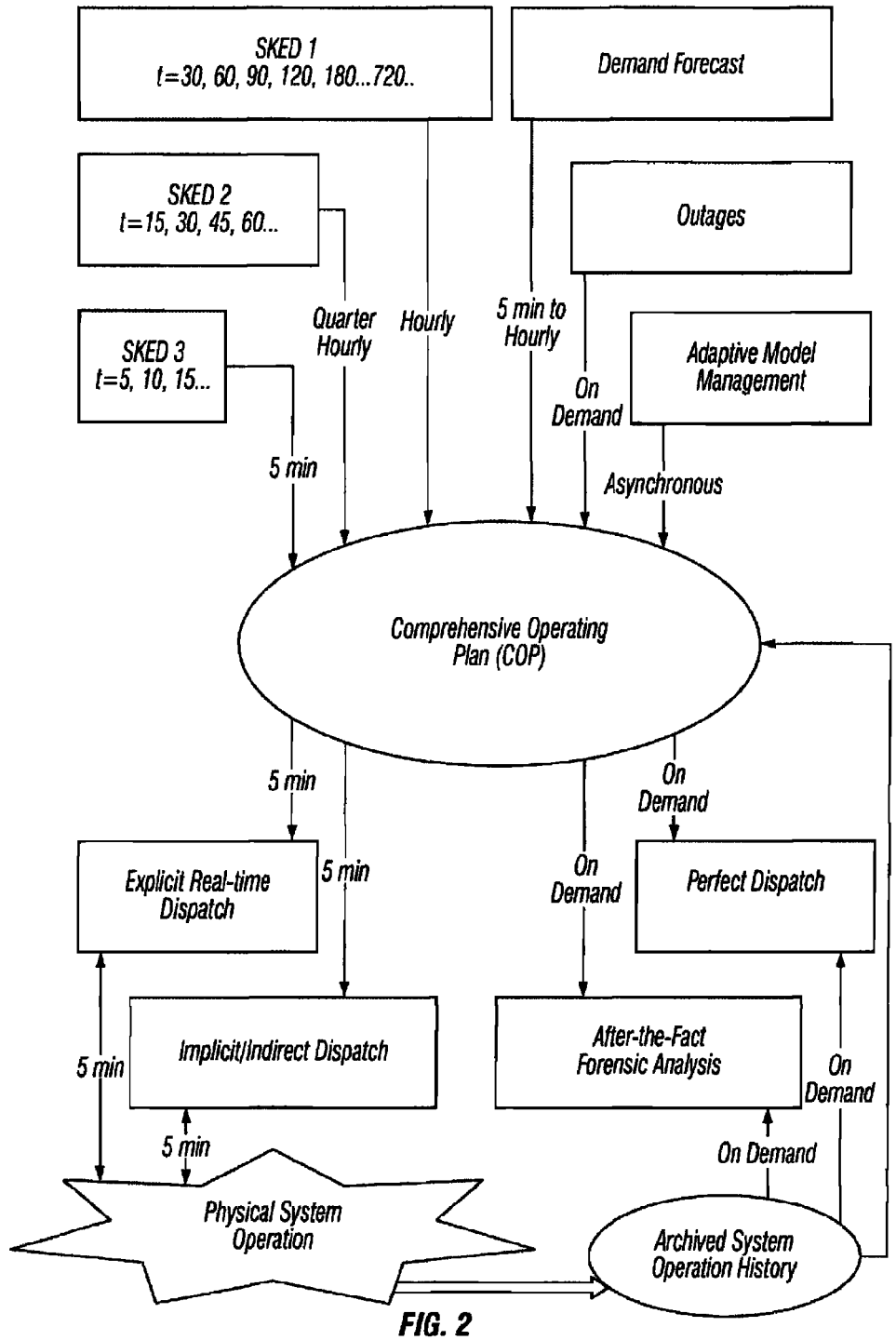
FIG. 2 illustrates one embodiment of the present invention with day ahead generation scheduling with coordination via plans.

In one embodiment, the general control application provides day-ahead generation scheduling with coordination via plans, as illustrated in FIG. 2. In one embodiment, the general control application product of the present invention includes: a market clearing engine which combines both unit commitment and unit dispatch, that can be configured as SKED1, 2, 3, . . . , I, a comprehensive operating plan which coordinates input/solution between different SKEDs and allow easy implementation of a future SKEDi, a NET based market operator interface that supports operators to obtain system situation awareness and to make proper decisions and the like. The market operator interface is the user interface for the market operators to operate the electricity market.

Figure 3:
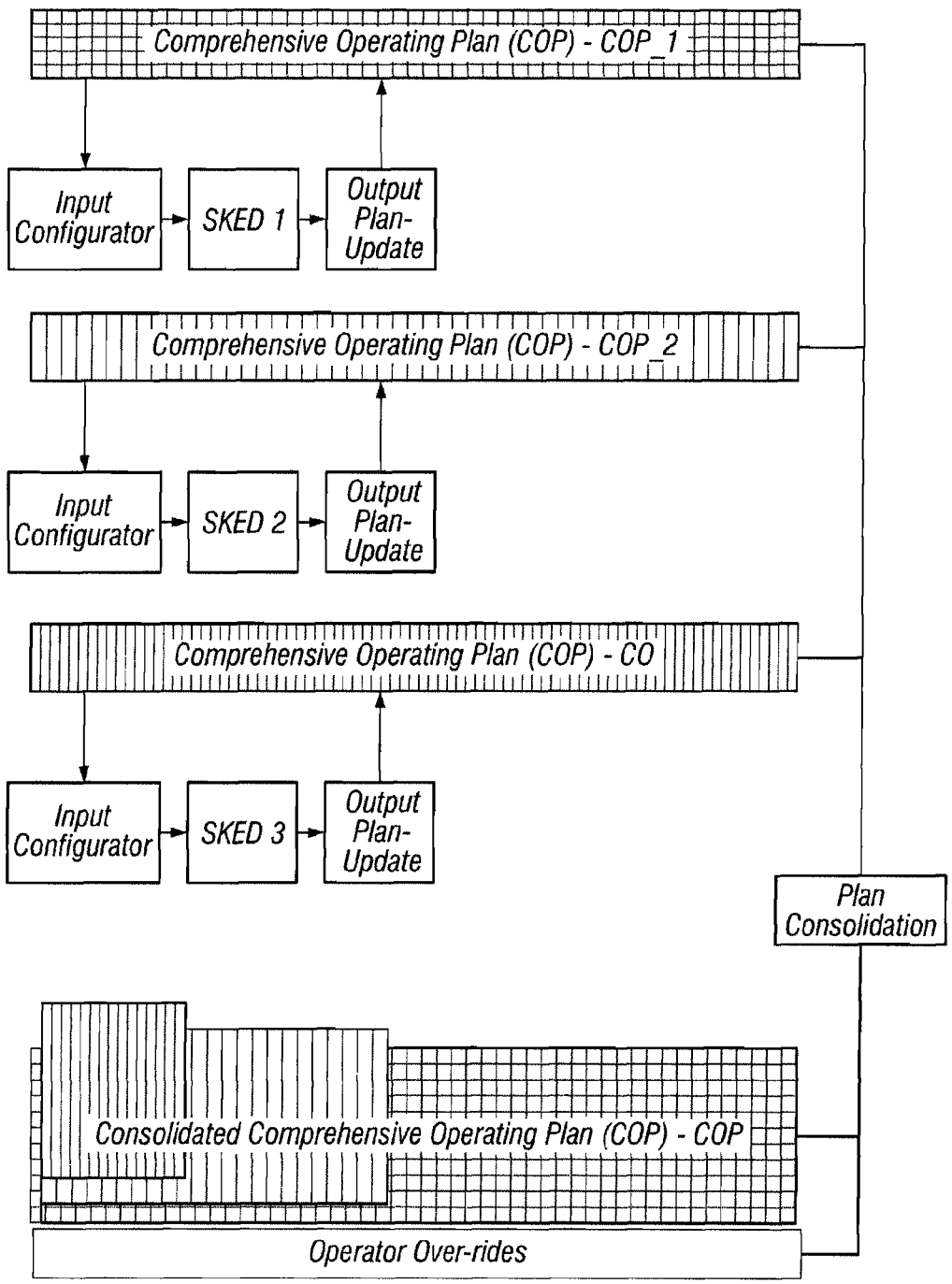
FIG. 3 illustrates one embodiment of an energy system tool for dispatchers in power grid control systems of the present invention illustrating the coordination of multi-stage resource scheduling dispatch and commitment function engines, hereafter, SKED engines with a comprehensive operating plan (COP).

In one embodiment, the performance requirement from the general control application comes from real-time or look-ahead business process needs, illustrated in FIG. 3. As a non-limiting example, at the minimum, SKED2 run time will not exceed 5 minutes with a typical 2-hour SKED2 case duration which has 15-minute intervals for the first hour and 30-minute intervals for the second hour.

In one embodiment, the business requirements for the general control application, include a resource model for supporting existing resource model, including price based model and fuel model.

As a non-limiting example, model resource block loading can include one or more of, (i) model combined cycle units and pumped storage units in the same way as they are modeled in the existing system. For combined cycle units, all the three existing models, including steam factor based model, composite model and component unit model can be supported. Pumped Storage units can be modeled as fixed schedules, (ii) Support hydro resource schedules on the plant and individual resource level, (iii) Support megawatt dependent directional (Up and Down) ramp-rates. For the each interval the average ramp rates are calculated based on the current state estimator generation level and the maximum/minimum level achievable in the corresponding interval duration, (iv) demand side resource with shutdown cost and multi-segment energy bid curves, (v) resource Static/daily/Interval model parameters, order of precedence, time period of validity, eligibility to participate in different ancillary services products, (vii) resource control modes: integration of physical model (e.g. notification time) and User actions (e.g. startup/shutdown acknowledgements), (viii) Support multiple sets of interval based resource operating limits (potentially with different penalty costs), e.g., economic high/low limits, regulation high/low limits, emergency high/low limits envelope high/low limits (Envelope limits are calculated based on the resource's megawatt dispatch for the last interval in the latest COPt), (ix) Support interval based virtual interchange transaction models, (x) Support emission model as objective or constraints, and the like.

Model energy transactions can be as a fixed megawatt schedule or dispatchable transactions. Transmission constraint impact of incremental changes in transaction dispatches with respect to the current real time transaction schedules can be modeled as incremental injections at the interface nodes.

Model energy transactions can be as individual transactions or as forecasted net interchanges between control center of a power grid control system, and other control areas. With user configurability, transmission constraint impact of net interchange transaction schedules can be modeled by way of example, (i) via appropriate scaling of external generations; (ii) by applying incremental injection changes at the corresponding interface nodes, and the like In one embodiment, transmission losses are modeled. There can be some model transmission security constraints, including but not limited to, alleviate overload constraints, simultaneous feasibility test constraints and watch list constraints. Constraint the right hand side and penalty cost for alleviate overload constraints can be interval dependent. Constraint the right hand side bias can be calculated for watchlist alleviate overload constraints. Multiple segment can be modeled based penalty functions. Activation of any transmission constraints can be controlled by the operator. Transmission grid topology can come from state estimator, planned outages, unplanned outages and the like.

In various embodiments, the comprehensive operating plan includes a central repository of various scheduling data to and from a certain class of power system applications. The comprehensive operating plan presents a comprehensive, synchronized and more harmonized view of scheduling data to various applications related to power system operations. The class of scheduling data of interest can include the following: (1) a resource megawatt schedule; (2) a demand forecast; (3) an outage schedule; (4) a transaction and interchange schedule; (5) a transmission constraint limit schedule; (6) a reserve and regulation requirement schedule; (7) a resource characteristics schedule, and the like.

The comprehensive operating plan is the repository of all operating plans in a multi-stage decision process. Each SKEDi in the decision process generates a set of schedules that are reflected in its corresponding initial (COPi). The aggregated results from the multi-stage decision process are captured in the total comprehensive operating plan (COPt), which is the consolidated outcome of the individual COPi's. SKED engines and the comprehensive operating plan coordination are illustrated in FIG. 3.

Figure 4:
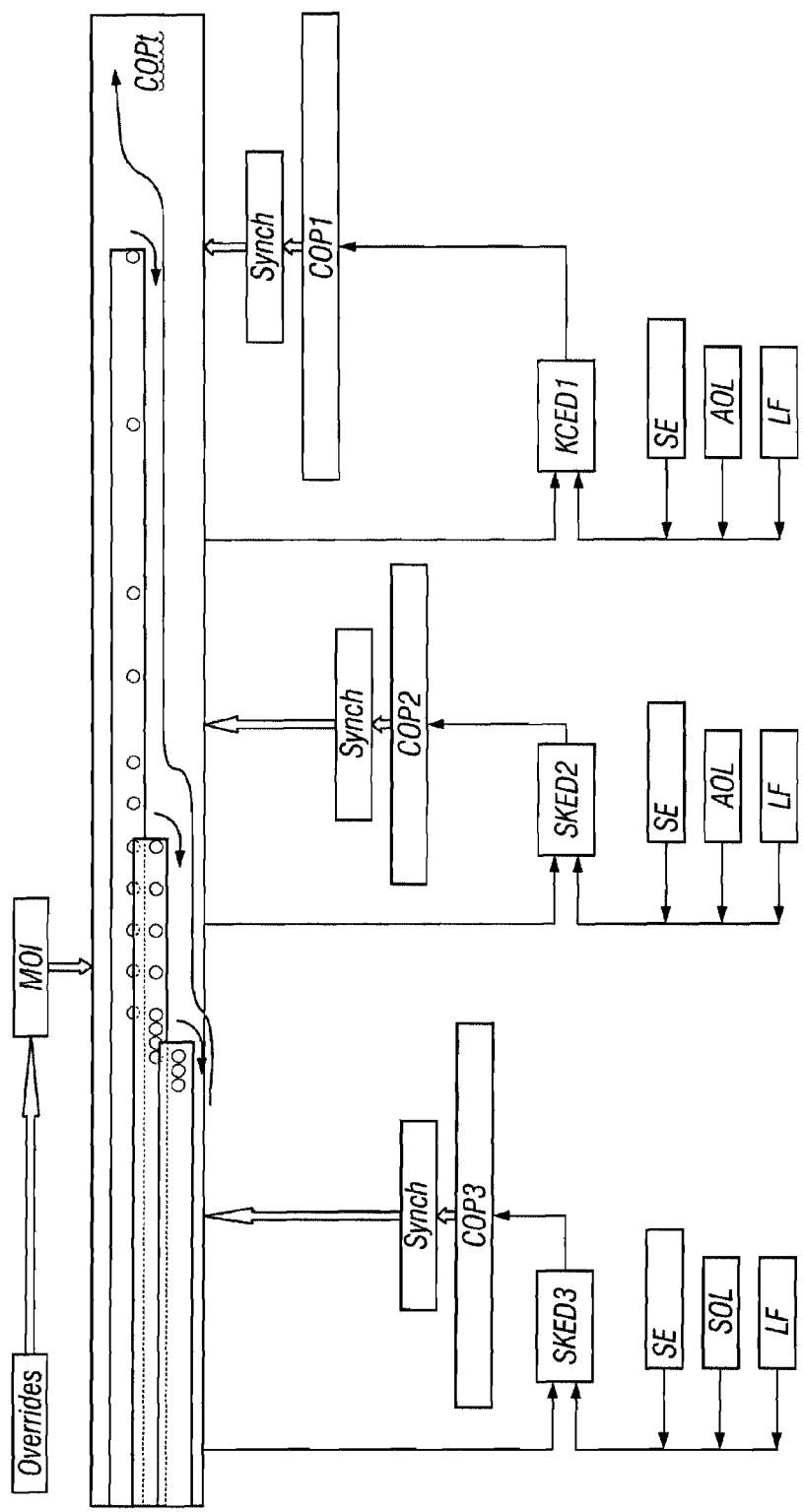
FIG. 4 illustrates one embodiment of the present invention with a multi-stage SKED overview for multi-stage scheduling processes.

In one embodiment, the system tool for dispatchers in power grid control systems of the present invention can include, individual scheduling application engines: input, output and internal optimization processing, and the like. Data structures hold the comprehensive operating plans, including but not limited to resource plans, and the interactions between comprehensive operating plans and SKED engine applications are illustrated in FIG. 4. The FIG. 4 embodiment includes the following benefits: (1) Modular SKED: SKEDi can be coordinated using subordinate COPi's which can be synchronized into the overall COPt. This removes the need for individual SKED engine applications to communicate with each other directly. (2) SKED's may be added, removed and/or modified with minimal impact on the other SKEDs and comprehensive operating plans. This intrinsic flexibility enables low-risk, cost-effective business process evolution. It also ensures high availability for the mission critical real-time general control application SKED engine functions. Failure of any one or more SKED engine components will cause smooth degradation of, instead of abrupt service interruptions to, real-time dispatch instructions. The comprehensive operating plan input to each SKEDi comes from the overall COPt, which is the level that operators interact with. All operator overrides to the comprehensive operating plan can be captured and included as input to SKEDi's.

The comprehensive operating plan contains quantities, as a non-limiting example megawatt generation level, being scheduled over different operating Intervals. Operator interaction can be typically with COPt. In one embodiment, initialization of the comprehensive operating plan for each operating day begins with the day-ahead schedule, which is based on the day ahead marketing financial schedules and then updated with reliability commitment results. Before any SKEDi is run in the current day of operation, the overall COPt is initialized with the day-ahead schedules. When COPt is suitably initialized, it can be used to generate input data for SKED1, SKED2 and SKED3. Results of SKEDi's are then used to update their respective subordinate COPi, which will cause COPt to be updated, and thus the overall iterative process continues.

In one embodiment of the present invention, the comprehensive operating plan requirements can be as follows: (1) Each SKED engine has its own comprehensive operating plan; COPi will only be populated by approved SKEDi solution; (2) COPt can be a comprehensive plan to support decision making by operators; (3) COPt can be initialized from approved day-ahead schedule; (4) Information content in COPt can be displayed in a comprehensive operating plan user interface at least one or more of, resource, resource type, control zone/area, company, and system level; 5) COPt exports input data for SKEDi, however, SKEDi can survive with missing/incomplete COPt data (e.g. undefined commitment in the comprehensive operating plan), the latest available COPt can be always used for the SKED2 runs and (6) Inconsistencies between COPi and COPt are identified and resolved.

Any energy (megawatt hour) quantity in the comprehensive operating plan is understood to be expressed in terms of a constant power megawatt level over the duration of the scheduling interval. As a non-limiting example, the scheduling intervals can be, 100 megawatts×15 minutes can be shown the quantity 100 instead of 25, even though the actual energy is 25 mwh.

The comprehensive operating plan can contain comprehensive summary information. Summary information can be rollups from a raw data at a lower level, including but not limited to resource level, according to some pre-defined system structures.

Figure 5:
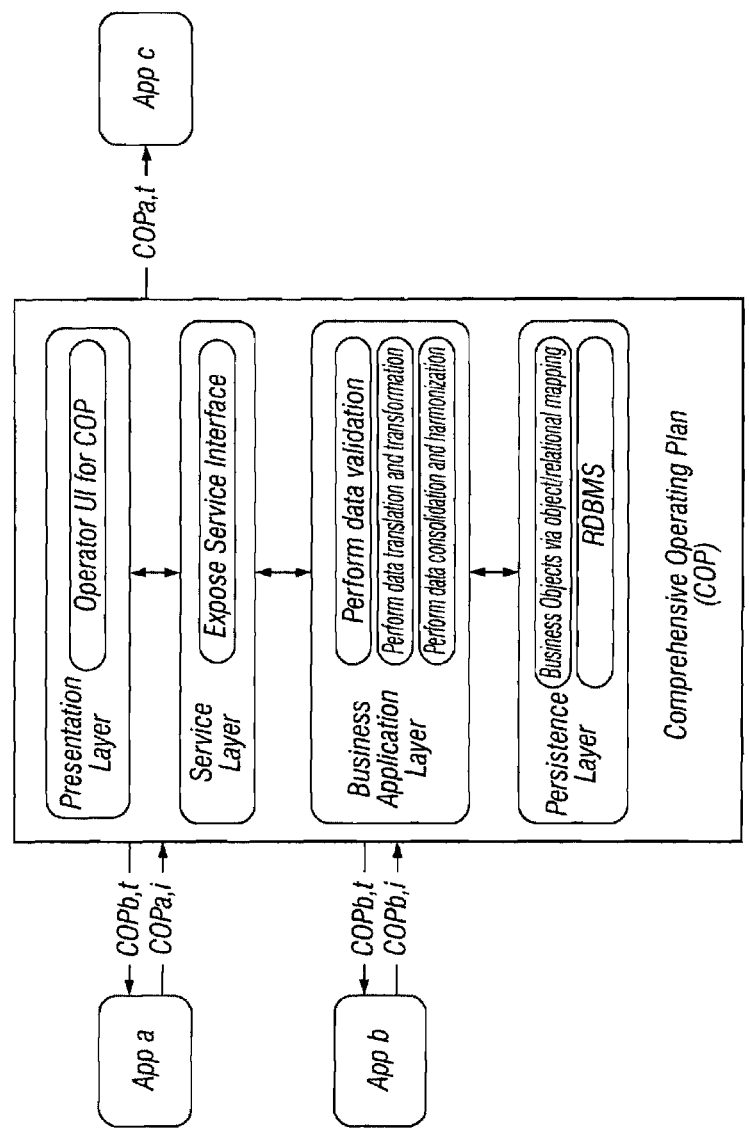
FIG. 5 illustrates one embodiment of a comprehensive operating plan used with the present invention.

The comprehensive operating plan can have a presentation layer or a set of operator user interfaces to support system operator decision making. However, it does not intend to replace but supplement user interfaces of individual scheduling applications. The comprehensive operating plan can have a service layer to facilitate the interaction with external power system applications or data sources. The comprehensive operating plan also can have a business application layer that performs validation, translation, transformation, consolidation and harmonization of various asynchronized scheduling data. Lastly, the comprehensive operating plan can have a persistence data layer for storing key scheduling data related to power system operations as illustrated in FIG. 5.

The comprehensive operating plan contains individual resource level and comprehensive summary information. A summary can be rollups from the resource level or stored in a database. The comprehensive operating plan can also include system level information including but not limited to a demand forecast, reserve requirements and the like. Contents of COPi do not have to be identical but must allow for explicit translation/transformation between each COPi and COPt. As a non-limiting example, the schedule time-line can be as follows: variable time duration (minimum 5 minutes, typical 5 to 60 minutes); monotonically non-decreasing; each n+1 interval is an integer multiple of the previous interval n. (e.g. 5, 5, 5, 5, 15, 15, 30, 30 . . . ). Each interval is associated with an absolute start/end time and supports DST and multiple time zones.

COPt contains the current operating plan used to guide SKED engine solutions. It can be initialized with the results from the day ahead and reliability cases and then updated based upon accepted SKED engine solutions. Dispatchers may override values stored in COPt.

Figure 6:
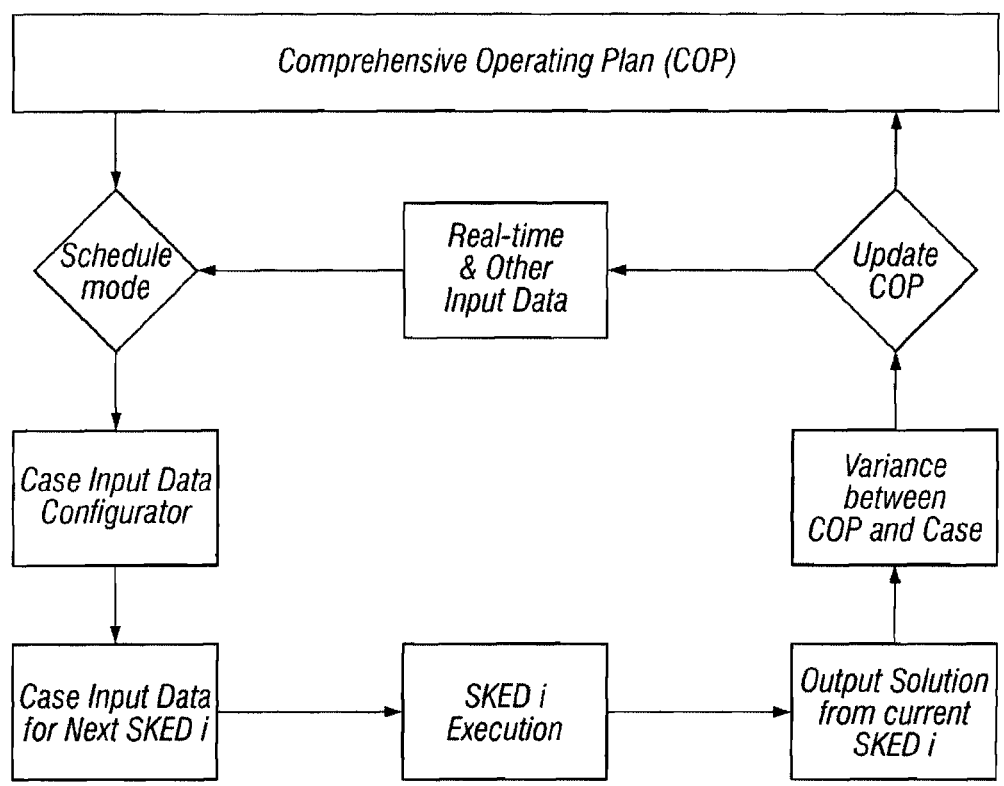
FIG. 6 illustrates the coordination between a SKED engine and the comprehensive operating plan.

FIG. 6 illustrates the coordination between SKED engines and the comprehensive operating plan.

For the comprehensive operating plan initialization, the data for COPt can be populated in a sequential process from an hourly resolution for day-ahead results up to the 5 minute intervals from a SKED3 execution. The sequence for COPt initialization can be as follows. COPt can be initialized from day ahead resulting in hourly intervals to be established for the next operating day. Reliability commitment results and other real-time manual commitment decisions may be used to update the COPt via dispatcher manual entries via some market operator's user interface.

SKED2 executes and solves multiple scenarios. The dispatcher reviews the results and may accept the solution for a scenario. The acceptance process will populate the COP2 and COPt values based on the selected scenario. A scenario may be accepted as long as it does not contain any intervals that are in the past. COPt can be updated for the intervals that have not already been updated based on a SKED3 solution. The COPt intervals can transition, as a non-limiting example, from hourly to the 15 and 30 minute interval duration of the SKED2 solution.

SKED3 executes in automatic mode and if the solution passes the validation check it can be automatically accepted and used to populate the COP3 values as well as the values in COPt. The COPt intervals will transition to the 5 minute interval duration of the SKED3 solution.

The comprehensive operating plan can be used for SKEDi execution. COPt can be the source of all operating plan data for every execution of SKED.

Manual overrides can be applied against COPt. Overrides can be captured and maintained such that if they are removed, COPt will revert to the last value set by a SKED engine execution. Operators can be responsible to ensure validity of the overrides.

In general, limited validation can be performed during the override process; to verify the impacts of the overrides on the resultant comprehensive operating plan, it would be necessary to re-execute appropriate SKED's. Impact of operator overrides on resource modes, which are modes for operations for generating resources or demand resources, which: an operator may directly specify resource modes (by resource/product/time intervals). An operator may not override dispatch megawatt base points of a unit.

With reference to resource modes, for each resource in each scheduling interval, resource modes can be used to specify whether current COPt quantity, such as megawatt dispatch, commitment status, ancillary services contributions, and the like, can be fixed or adjustable, or used with appropriate level of inertia. Resource modes can be determined based upon a combination of unit modeling parameters, including but not limited to notification time, business rules, as a non-limiting example no steam unit commitment change in SKED2, current unit status such as a combustion turbine has been called, operator overrides, and the like.

Resource modes may be time-varying, where the time is measured relative to the current time, which as a non-limiting example can be a fixed commitment within 2 hours of real-time, flexible commit beyond two hours. For the given SKED engine the following can be provided: (1) the units may have different modes for different target intervals; (2) boundary/envelope determination; (3) megawatt dispatch range at the final interval of SKEDi; (4) energy consumption reserved for later intervals; (5) maximum number of available starts/stops taking into account reservations for future intervals; (6) an operating band for energy schedule, for each interval; (7) operating band for regulation schedule for each interval, and the like.

A case solution of SKEDi can be uploaded to the comprehensive operating plan. Support for this case solution of SKEDi can include the following: highlight solutions summaries; identification of important changes to the COPt due to this SKEDi solution; comments on case solution (such as why a particular case is accepted or not); special concerns with the case that may require operator overrides later, and the like; identification of important changes in inputs; accepted case solution can be uploaded to COPi in its entirety, such as in one embodiment there is no partial case loading in general and no override on case solutions; and the like. If there are fields in COPi that are not explicitly contained in the case solution files, then the Importer will need to furnish the information, assuming the information can be assembled from the case solution data.

COPt can be updated when a new COPi is accepted. Accepted solutions update the data set of matching intervals in COPt as long as the solutions are for the same SKED, or for a higher SKED engine (e.g. SKED3 replaces SKED2 but SKED2 will not replace SKED3). COPt has, conceptually, several layers where each layer can be associated with a COPi. Each data item in COPt has a source COPi. Each COPi can be assigned a priority which determines if it can replace an existing source for COPt.

COPt can be updated with dispatch management tool. No matter where the decision originates including but not limited to intra-Day reliability assessment, SKED1, ancillary services market clearing and the like. Ancillary services are those functions performed by electrical generating, transmission, system-control, and distribution system equipment and people to support the basic services of generating capacity, energy supply, and power delivery. The electricity market to support the procurement of such ancillary services is an ancillary services market.

A dispatch management tool is a place for the operator to call on/off a unit, assuming that all calls via phone are captured by dispatch management tool. A dispatch management tool entry can automatically trigger the update of COPt in accordance with the notification time, min up/down time of a unit.

COPt can be updated with a state estimator. As a non-limiting example, resource status and the minimum and maximum megawatt can be captured by a 5 minute interval in COPt. The comprehensive operating plan data can be saved for each SKED engine (e.g. SKED2, SKED3) as well as a final coordinated set (COPt). In one embodiment, dispatcher overrides of the comprehensive operating plan can only be allowed on COPt.

As a non-limiting example, the comprehensive operating plan information can be available with variable intervals, as a non-limiting example, 5, 15, 30, 60 and the like. Comprehensive operating plan information can include but not limited to the following items: (1) interval specific; qualification times; (2) the regional transmission organization load forecast; (3) the regional transmission organization Interchange; (4) bias megawatt; (5) caseID; (6) operating condition including but not limited to emergency, spin event, and the like; (6) number of resources committed and de-committed; (7) resource specific data; (8) dispatch megawatt; (9) limits that include economic, envelope and the like; (9) ramp rates; (10) commitment status and reason codes; (11) reserve assignment; (12) regulation assignment; (13) scarcity pricing unit; (15) resource schedule cost or price for the interval; (16) qualifications; (17) initial conditions; (18) locational marginal prices/marginal costs; (19) pre-ramping units; (20) constraint specific data; (21) constraint type such as simultaneous feasibility test or alleviate overload, flow gate, and the like; (22) monitored or enforced or relaxed; constraint limits including but not limited to, facility limits, target control limits and the like; (23) constraint flows such as state estimator flows, dispatch based flows; (24) marginal values and limits of modeling constraints; and the like.

The comprehensive operating plan can be used to build a unified scheduling framework, which coordinates between a series of resource scheduling processes in modern grid control centers. The unified scheduling framework is a framework to unify different resource scheduling and commitment functions. These scheduling processes range from annual planning to real-time dispatch. As a non-limiting example, a control center of a power grid control system is used to illustrate how different scheduling processes are integrated together via the comprehensive operating plan.

Figure 7:
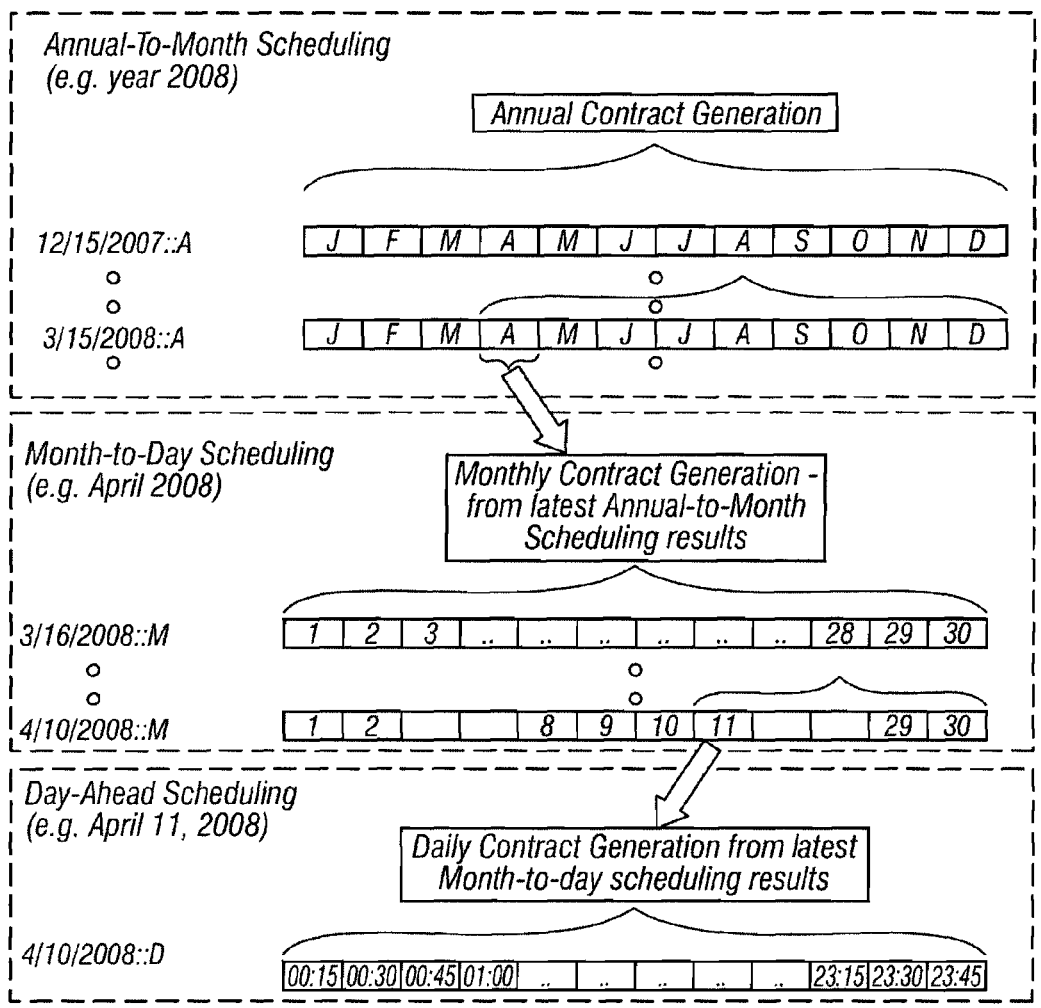
FIG. 7 illustrates one embodiment of a control center and generation scheduling coordination.

In one embodiment, a control center of a power grid control system, generation scheduling system can include the following major processes, (i) rolling forward scheduling monthly contract generation based on annual contracts, (ii) rolling forward scheduling daily contract generation based on monthly contracts, (iii) day-ahead quarter-hourly generation schedule, (iv) rolling forward intra-day the general control application SKEDs and the like These scheduling processes are can be correlated to each other. FIG. 7 demonstrates the main data flow from annual generation scheduling all the way into day ahead scheduling.

The data communication can be through an extended comprehensive operating plan as described in this non-limiting example. In this non-limiting example, the process starts with annual generation contracts signed between control center of a power grid control system, and the generation plants in its footprint, as a non-limiting example contracts for 2008. The control center of a power grid control system determines each unit's monthly generation energy target by scheduling the units to meet their plant annual contracts and satisfying transmission security constraints. This process is repeated each month for the remaining of the year to refine the monthly energy targets and emission quota, which can be stored in the comprehensive operating plan.

The monthly scheduling process takes monthly energy targets from the comprehensive operating plan and determine plant daily energy target while respect transmission security. This process repeats each day for the remaining days in the month in order to refine the plant daily energy and emission quota, which can be stored in the comprehensive operating plan. The control center of a power grid control system, which can have security constrained day-ahead scheduling processes, can use the daily energy target in the comprehensive operating plan to enforce daily maximum energy constraint and produce an optimized unit commitment decision. The day-ahead commitment decision is stored in the comprehensive operating plan.

Coming into the operating day, the control center of a power grid control system, runs general control application SKED engines to adjust fast units' commitment and produce unit dispatch based on the day-ahead commitment from the COP.

Figure 8:
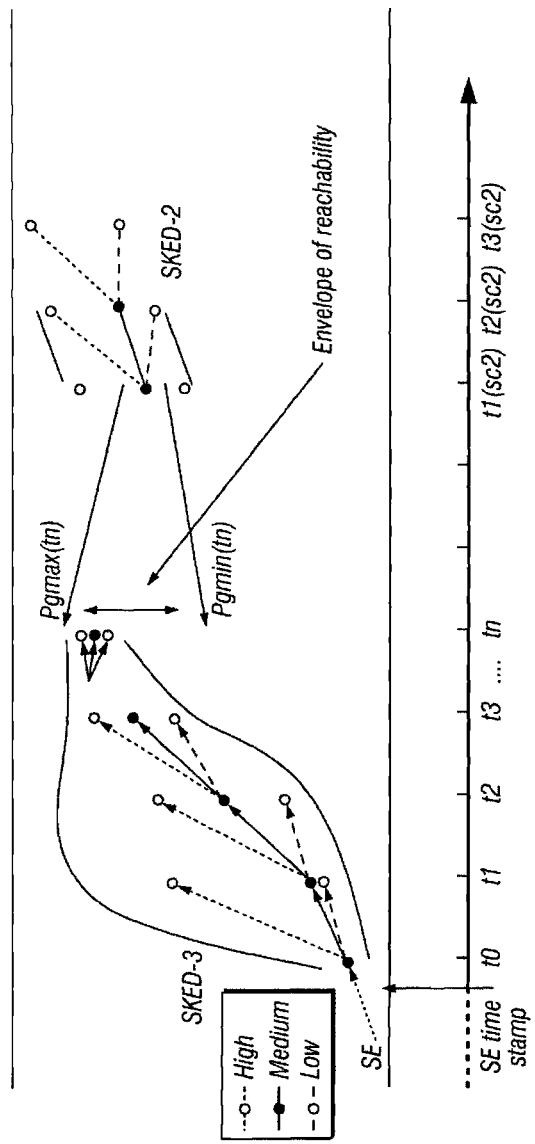
FIG. 8 illustrates one embodiment of SKED2 and SKED3 coordination.

The comprehensive operating plan control center of a power grid control system, can thus integrate its multiple generation scheduling processes into a unified scheduling system, which significantly streamlines the business process and improve the efficiency, as illustrated in FIG. 8.

SKED1 is a mixed integer programming based application. As a non-limiting example, it can be configured to execute for a look-ahead window of 6-8 hours with viable interval durations, e.g., 15-minute intervals for the $1^{st}$ hour and hourly intervals for the rest of study period.

As a non-limiting example, SKED2 can look 1-2 hour ahead with 15-minute intervals. Based on the latest system load and reserve requirements, interchange schedules and security constraints, SKED2 will commit additional qualified fast start resources as needed and fine-tune the commitment status of qualified fast start resources committed by SKED1. SKED2 produces dispatch contours and provides resource ramping envelopes for SKED3 to follow. As illustrated in FIG. 8, the envelope of reachability creates solution coupling effect across scheduling functions of SKED2 and SKED3. SKED3 can be a dispatch tool which calculates the financially binding base points of the next five-minute dispatch interval and advisory base-points of the next several intervals for each resource, as a non-limiting example, 5 min, 10 min, 15 min, and the like).

SKED3 can also calculate ex-ante real-time locational marginal prices for the financial binding interval and advisory price signals for the rest of study intervals. SKED3 is a multi-interval co-optimization linear programming problem. Therefore, it could pre-ramp a resource for the need of load following and real-time transmission congestion management.

In one embodiment, a SKED engine formulation can be generalized as described hereafter. The SKED engine objective function can include one or more of the following cost items, (i) resource startup/shutdown cost and no-load cost, (ii) resource incremental energy cost, (iii) transaction cost, (iv) ancillary services (i.e., regulation and reserves) procurement cost and the like.

Each SKED engine can include one or more of the following constraints in SKED engine formulation, (i) load balancing, (ii) ancillary services requirements, (iii) resource capacity, (iv) resource ramp rate, (v) resource temporal constraints (minimum-run time, minimum-down time and the like, (vi) maximum number of startup/shutdown, (vii) daily energy constraints, (viii) emission, (ix) transmission security, and the like.

In one embodiment, a system tool for dispatchers in power grid control systems of the present invention supports multi-interval security-constrained commitment and economic dispatch as time-coupled co-optimization for SKEDi. SKED 2 can support interval based resource availability and operation mode. The resource qualification logic for SKED2 is: (1) With the assumption that the period between execution starting point and target time of first interval covers the execution time and case approval time: (2) Resources available for economics: startup time (choice to include notification time) and minimum run time should equal to or less than respective qualification time parameters defined for commitment. Qualification time parameters are the threshold parameters associated with time, such as startup time, as part of qualification rules. Each interval of SKED2 can see the same qualification time length, so that eligible resources won't be over-restricted in far intervals. (3) Resources available for economics that have significant impact on transmission constraints: startup time, such as choice to include notification time, and minimum run time should be equal to or less than the respective qualification time parameters defined for committing resources that have effective impact on a non-system interface transmission constraint. The qualification time parameters for resources brought on for constraint control can be different from those of economics-brought-on resources. "Called on for constraints" can continue to be determined in two steps 1) initially based on resources' shift factor greater than a user-defined thresholds and 2) then re-qualified based on the binding status of the effected constraints and the user-defined min-run and startup time parameter thresholds and the resource's shift factor. The resource's shift factor represents the change in flow on a transmission corridor to an incremental injection at a resource's electrical bus.

SKED2's commitment capability can be limited by its qualification time parameters only. SKED2 should focus on the resources that can be qualified in its domain. Any resources that do not meet the qualification rules can follow the commitment schedules in the latest COPt, which may come from the day-ahead schedule or SKED1.

As a non-limiting example, a two-hour min-run time resource should be allowed to be committed for the last hour of a two hour SKED2 run. The boundary issue cannot be avoided and can be resolved upon COPt update upon User approval of the resource commitment and in the following SKED engine runs.

Decommitment can apply to online resources per user defined type that are not flagged as must-run and not include other qualification rules. Similarly, boundary commitment conditions need to be considered, e.g., a resource that will have met its min-run-time after the first hour of the second-hour SKED2 study period may be decommitted for the last hour.

"Emergency" resources are not qualified for SKED2 commitment. Qualification parameters can be defined for different SKEDs. Support mixed integer programming based unit commitment functions for SKED2 eligible resources include but are not limited to, resource startup/shutdown models and the like. Daily maximum startup and minimumUp/minimum-Down constraints are respected.

The enforcement of reserve requirements at ancillary services area and reserve zone levels can be needed when the reserve zone constraints are bound from time to time in a selected ancillary services market clearing. If an individual resource ancillary services assignment is available, then these individual assignments are respected in SKED2. An ancillary services area is an area in which ancillary services are provided by resources within the area.

In one embodiment, each SKED engine can support flexible study interval configuration, including but not limited to case start/end time and case execution frequency, with variable time steps. As a non-limiting example, the variable time steps can be, a 15-minute interval for the first hour, a 30-minute interval for the second hour and the like. As a non-limiting example, target intervals can be anchored to the 5 minute clock cycle, and the like. SKED 2 sequence execution can be configured to be either automated case execution or manual case execution. Each SKED engine can support multiple study scenarios for high, medium, and low load forecast values. Each SKED engine can support interval dependent function configuration.

In one embodiment, enforcement of forward envelope bounding can be configurable for an SKED case. Resource qualification parameters can be configurable for each type of SKED for economic and transmission control commitment separately. The qualification parameters include, but are not limited to, resource type and startup, option to include notification time, minimum run-time and the like.

In one embodiment, the coordination among SKED engines can be through COPt.

The next interval's dispatch megawatt range, following the last interval of the current SKED i solution time horizon, in COPt may be used to calculate envelope for SKED i+1 's dispatchable resources. A global flag can be used to switch off the envelope function.

For SKED1 commitment decisions in COPt, which may be overridden by operators, that can be acknowledged by operator, SKED2 can honor them. SKED2 is able to fine-tune the start ups for qualified resources by sliding them forward. Start up notification time and the outage status within the current SKED2 time frame need to be considered during the decision making. With the assumption that the start up has been decided and made in COPt, SKED2 does not consider the related start up cost. The difference between the SKED1 calculated start up costs and actually start up costs due to cold/intermediate/hot start up status change can be make-whole. SKED2 is able to shut down the qualified resources as needed if their min run time limits have been met In one embodiment, SKED 2 has data interfaces with the following system components: (1) day-ahead schedule to initialize COPt resource commitment status. (2) COPt. Via COP2, SKED 2 to provide COPt with resource schedule updates and dispatch megawatt. SKED2 will also receive resource schedule updates from COPt for future intervals. (3) state estimation and real-time contingency analysis. SKED2 to obtain real-time network topology and real-time generation/load megawatt values from state estimator. Real-time transmission constraints can come from real time contingency analysis. State estimation may also provide real-time bus load distribution factors for SKED engines. (4) outage schedule. scheduled transmission outages are available for SKED2 to determine network topology of each SKED2 interval. (5) load forecast.

One example of a business process sequence of the process begins with initialization. COPt can be initially populated with the day ahead marketing and reliability assessment commitments. For SKED2, the units' initial status (on/off) and megawatt level can be obtained from a state estimator. The first interval duration can be equal to the first interval target time (interval ending time) minus the study kick off time. For SKED2. the state estimator topology can be used for all intervals.

The following information can be directly obtained or derived from energy management system: (1) resource's real-time status (on/off); (2) resource's output megawatt; (3) time resource has been running or shutdown; (4) accumulated number of startups during current day; (5) transmission equipment's real-time status (in/out).

Figure 9:
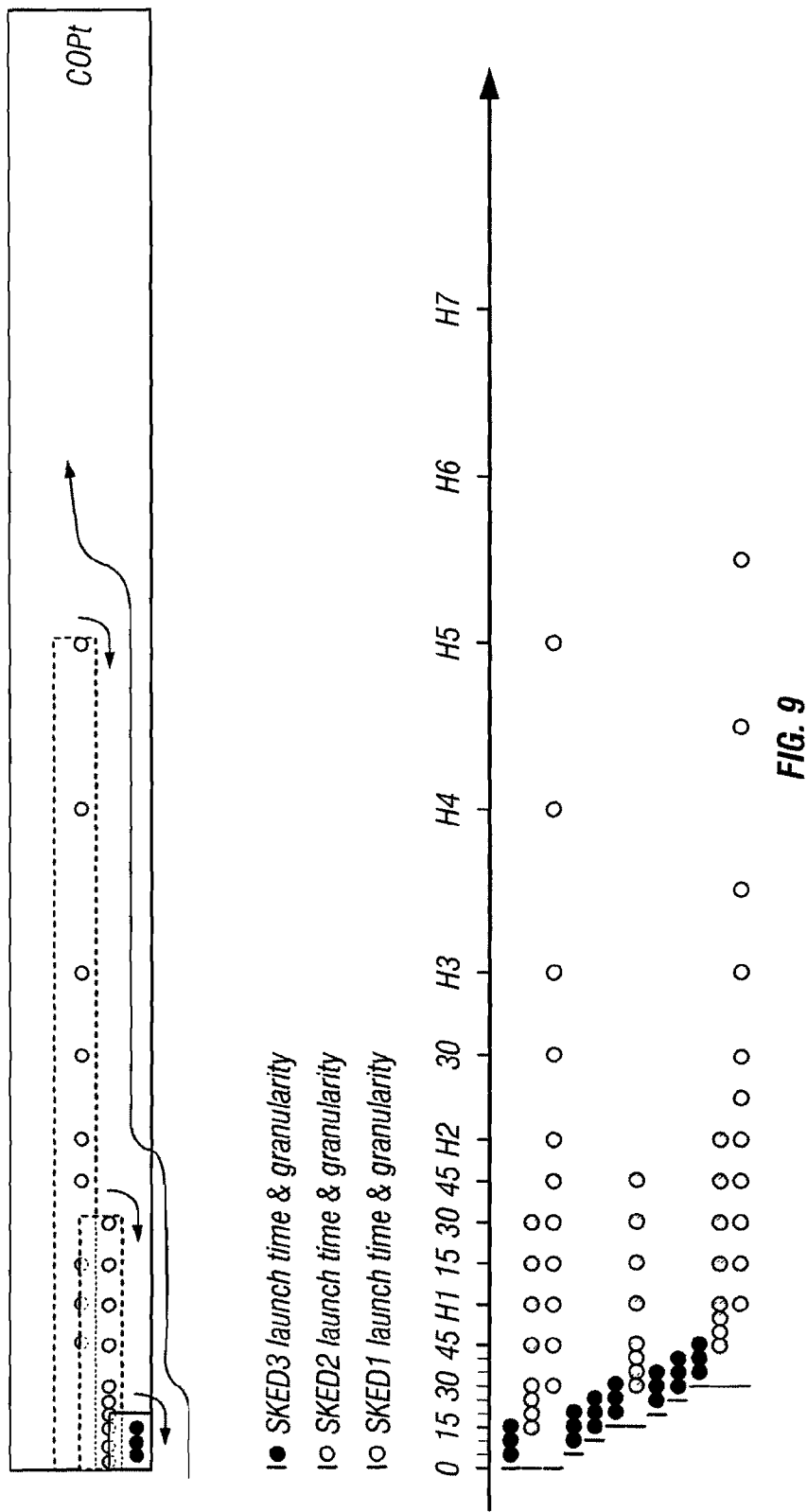
FIG. 9 is a graph that illustrates a SKED execution timeline.

FIG. 9 illustrates the sequence of execution of SKED2, showing its granularity, launch time, period covered and frequency (SKED1 and 3 are also shown for comparison purposes).

As a non-limiting example, in one embodiment, three steps are in each SKED engine study, (i) case creation, (ii) case execution and (iii) case approval. For SKED2, each step can be either auto or manual. The automation of case creation and case execution can be coupled together, as a non-limiting example if the case execution is auto, the case creation is also auto.

In auto execution mode, the study is performed based on a time schedule. When the case is created, the configuration parameters, manual overrides, can be initialized from a case template and the execution is followed immediately after the initiation is completed. The user can modify the entries in the template; the modification can become effective on the next scheduled execution and will continue effective until next modification or termination time expires. In auto approval mode, once the case execution is completed and solution is uploaded to the market database, the approval process will proceed subject to pre-defined condition checks and the comprehensive operating plan is updated upon case approval.

In manual execution mode, the user manually creates the case. The case can be initiated from a previous case, or from the template. User will have opportunity to perform additional manual override before executing the case. With manual approval mode, user will have opportunity to examine the solution but user cannot alter the solution. If necessary, user can make additional overrides and re-execute the case. The user needs to manually initiate the approval process.

In one embodiment, for SKED2, envelope limits can be calculated for the last SKED2 interval based on the dispatch megawatt of the nearest future interval from SKED1 and dispatch ramp rate.

An energy system tool for dispatchers in power grid control systems can use a ramp-rate model. For each interval the average ramp rates can be calculated based on the current state estimator generation level and the maximum/minimum level achievable in the corresponding interval duration.

SKED2 can support the following resource control modes: commitment: fixed; committable (for economics or for transmission); decommittable; slidable, energy: fixed; dispatchable; block loading; regulation: fixed; dispatchable (may include part self scheduled); spinning: fixed; dispatchable (may include part self scheduled) and the like. For SKED2, the definition of the control mode for a given resource can consider the resource characteristics, including but not limited to, type, start up time, notification time, minimum up time, resource's shift factors, decisions taken by other processes, e.g. a combustion turbine has been called on by the operator, SKED1 has recommended to commit a combustion turbine, ancillary services clearing has assigned regulation/spinning reserves to a given combustion turbine, and the like. Ancillary services assignments can be honored by SKED2. That is, as a non-limiting example, for offline combustion turbines provide spinning, it can be committed by SKED2 as long as it can provide the assigned amount of spinning reserve. Operator commitment overrides can be treated as fixed.

In one embodiment of the transactions model the following can be provided, fixed transactions by schedules, dispatchable transactions, emergency interchange schedule and the like.

In one embodiment of the transmission model, Identified unscheduled outages are made by comparing real-time state estimator against scheduled outages and are presented to the operator on the market operator interface for review and inclusion to the next SKED engine execution. Model transmission security constraints can include alleviate overload constraints, watchlist constraints, simultaneous feasibility test constraints and the like. Constraint the right hand side and penalty cost for alleviate overload and flow-gate constraints can be interval dependent in SKED.

Load forecasts can be provided for each of the SKED2 intervals on the control area basis. Bus loads with each control area can be determined based on the control area load forecast and the bus load distribution factors. User can have the ability to vary the control area based bias which is not related to intervals.

The bus load distribution factors may be determined based on the latest state estimator bus loads or based on a static load model.

In one embodiment the objective of SKED2 is to minimize the price-weighted value of energy bids/offers cleared over the study period, while satisfying the specified security constraints. Operating cost components—start up/shut down, no load cost and incremental energy cost; penalty terms—to penalize the constraint violations; Constraints; Generation/Demand Side Response; Capacity constraints—economic, regulation, control, and spinning (min and max); Temporal constraints—start-up/shut-down/economic dispatch ramp rates (use nominal economic dispatch ramp rate for start up/shut down ramping), min run/down times, max # of starts; Block loading; Transmission; Constraints—The resource's shift factor based linear combination of net megawatt injections; load balance constraints—injections and withdrawals; ancillary services requirements constraints for intervals with no solution spinning/regulation reserve constraints at ancillary services area (and reserve zone) level(s) can be enforced; Controls (variables)—commitment decisions for qualified combustion turbines, megawatt cleared, constraint violations; Time coupling—SKED2 is a time coupled economic dispatch over the study horizon. The introduction of the time dimension into the dispatch formulation, as compared to a single interval sequential solution, provides economic (pre-ramping) as well as strategic value (profile of generation instructions).

In one embodiment, SKED2 provides solutions for three demand scenarios: medium, high and low. The solutions can be, except for the common state estimator initial conditions, totally independent.

Another embodiment of the present invention is an adaptive model management as shown in FIG. 5 and includes adaptive constraint management which a general term to represent a process or management subsystem for transmission constraint in an adaptive fashion.

Adaptive constraint management intelligently preprocesses transmission constraints based on historical and current system conditions, load forecasts, and other key parameters. It predicts potential transmission constraints and allows smoother transmission constraint binding.

The resource "profiles" may contain parameters such as ramp rates, operating bands, predicted response per megawatt of requested change, operating limits and the like.

In some embodiments, the demand system of the present invention includes a demand forecast integrator that provides centrally managed demand forecast information. In one embodiment, demand forecast integrator has one or more of the following high-level requirements: flexibility in accepting load forecasts from different engines; standard, but extendable software for merging load forecasts from different load forecast engines; supporting operator load forecast overrides; using industry standards, such as XML for input and output data; using Web services as the primary interface means; physical persistence layer that supports auditing, archiving and historical data (for perfect dispatch applications); a graphical user interface, and the like.

In some embodiments, the demand forecast integrator supports the input, management, and output of load forecast data. The demand forecast integrator does not itself perform load forecasting itself, but does provide one or more of the following: a programmatic interface that will accept area load forecasts from external load forecast engines; a user interface that will allow an operator to review input load forecasts and to modify load forecasts via an override capability an ability to merge multiple load forecasts that cover the same time range to form a composite load forecast; a programmatic interface that will allow consuming applications to query for load forecasts covering a range of areas, intervals, and time ranges; a persistence store to hold load forecast data, and the like In some embodiments, load forecast represents a load forecast engine as well as a repository of load forecasts for Habitat applications. Load forecast and demand forecast integrator can cooperate in that load forecast can be a provider of load forecast to demand forecast integrator, while demand forecast integrator can merge load forecasts from load forecast and other 3rd party engines.

Figure 10:
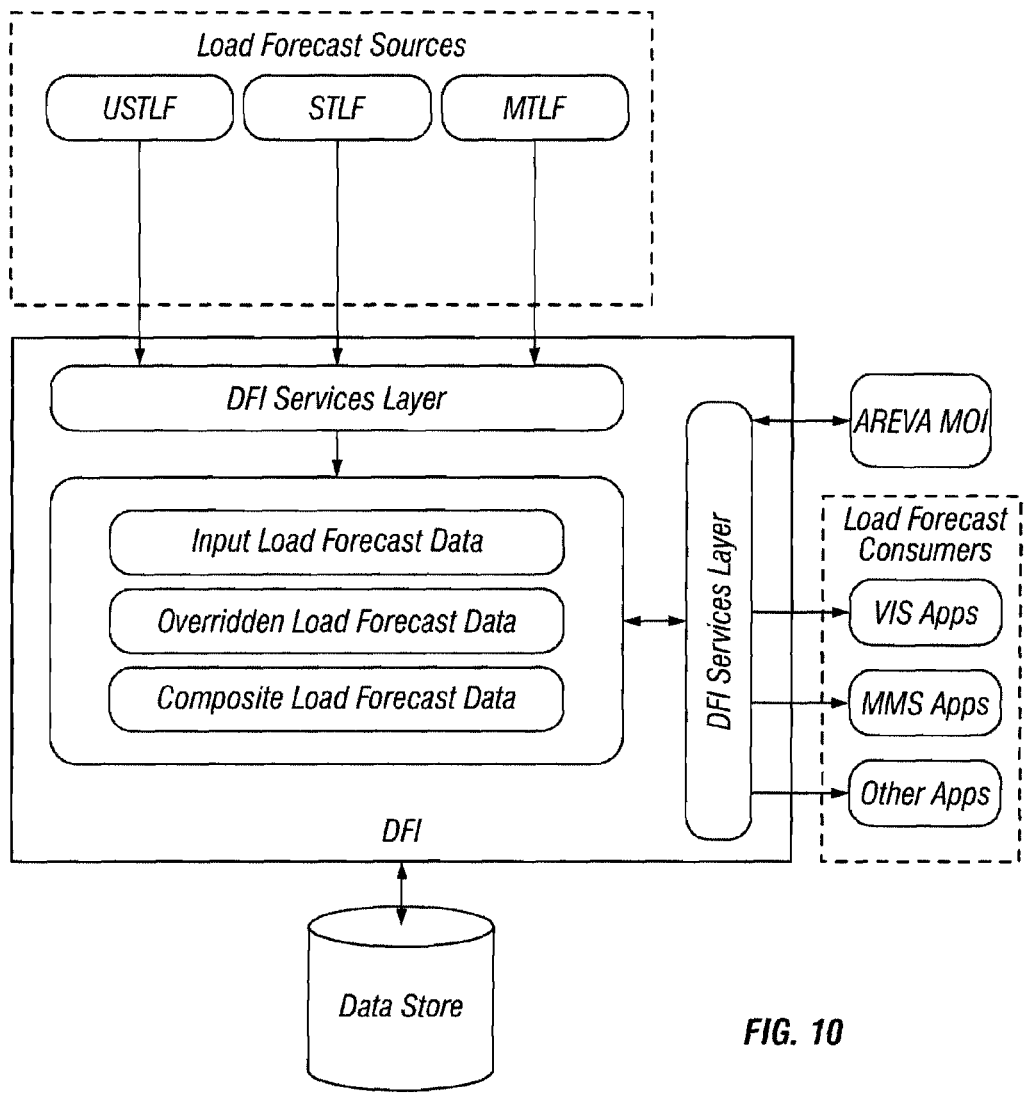
FIG. 10 illustrates one embodiment of a component architecture and data flow for a demand forecast integrator of the present invention.

FIG. 10 illustrates one embodiment of a component architecture and data flow for the demand forecast integrator in a sample implementation.

In some embodiments, the load forecast sources in FIG. 10 provide load forecasts that can be produced at varying frequencies. As a non-limiting example, sample frequencies can be: ultra short which can be every minute; short (every 5 minutes), and medium term (every hour). The load forecast results managed by these external engines can be periodically sent to the demand forecast integrator by a variety of means, including but not limited to web service calls. Either the existing engines can be modified to make these calls or an adapter can be created to facilitate the web service calls.

The primary building blocks for the demand forecast integrator are the load forecast area (load forecast A), load forecast associated with a load forecast A, and load forecast source (load forecast S) which submits load forecast for load forecast A. In some embodiments, load forecast can be modeled in a tree structure so that load forecast for a high-level load forecast A may be derived from subordinate load forecast As' load forecast. FIG. 11 shows a collection of "leaf node" load forecast As (in red circles) and a two aggregate level load forecast.

In some embodiments, load forecast can be modeled as a series of (time, megawatt) values and linear interpolation can be used to determine the load forecast for a given time. There is no limitation to the distance between two consecutive load forecast times for a given load forecast A and load forecast S. For a given load forecast A, multiple load forecast S can submit load forecast S that may cover common time intervals. Demand forecast integrator may have an ability to merge multiple overlapping load forecast S to form a composite load forecast that reflects modeled weighting factors associated with each submitted load forecast. FIG. 12 shows an example of load forecast construction for a single load forecast area.

In some embodiments, the following objects can be modeled in the demand forecast integrator data store and used or generated by the demand forecast integrator application: load forecast area; load forecast area hierarchy, which is effectively dated, that is, the parent-child relationship in the load forecast hierarchy may vary with time; load forecast A hierarchy scaling factor is included in each load forecast A, which can be used to calculate load forecast at the aggregate levels; "leaf" load forecast areas, which belong to one and only one aggregate load forecast A; "Aggregate" load forecast areas; load forecast sources, which include weighting factors for submitted load forecasts. Here, weighting factors are defined as profiles relative to the current time; load forecast by source; load forecast override; for composite load forecast only; composite load forecast; historical composite load forecast and override, and the like.

In some embodiments, load forecast may have a varying time distance between two consecutive data points. The values of a load forecast curve represent a specific data type. For example, the values may be megawatt, peak megawatt, or megawatt h. A given curve contains values of just one type, the type being specified as part of a submission. The list of supported load forecast type is configurable and implementation for different load forecast types may vary. For example, when a load forecast engine was outaged for an extended period of time, no load forecast is available from that load forecast engine for a period of time.

In some embodiments, the demand forecast integrator may provide a callable interface with one or more of the following characteristics: SOAP (simple object access protocol) over HTTP web services; a published WSDL; operations that allow a load forecast source to submit load forecasts for load forecast areas, and the like. Each submittal can have the following properties: name of the load forecast source; name of the load forecast area (only leaf-level load forecast A areas are permitted for submissions) or group of load forecast A's; a set of timepoint/megawatt pairs to specify the load forecast and by load forecast A if multiple load forecast A's can be submitted in one operation; classification of submittal type (megawatt, megawatt/hour, peak megawatt, and the like) can be needed; a timestamp of the load forecast that can be used to prevent overwriting more current data with late-arriving stale data; operations that allow an operator of the market operator interface to submit load forecast overrides; operations that allow a load forecast consumer to query for the following (all need to support optional filtering by time of submission and/or effective time): load forecasts by load forecast source; load forecasts by load forecast area (leaf or aggregate levels); load forecasts in user-provided or source-data driven time steps, and the like. Time steps may be provided in one of a number of ways: a single number or vector of time steps; overridden load forecasts can be flagged in the query response; composite load forecasts with override; historical composite load forecasts with override as of a user-provided time; and the like. As a non-limiting example, administering the load forecast A, load forecast hierarchy, load forecast S weighting factors, and the like, can be done via the market operator interface.

In some embodiments, the demand forecast integrator uses a pluggable approach to authentication and authorization. The authentication and authorization requirements can be often dictated by the deployment environment, and demand forecast integrator needs to be capable of operating in a secure environment. This can be accomplished by designing interface classes for the authentication and authorization subsystems and providing appropriate implementations dictated by the deployment environment. demand forecast integrator can provide an "out of the box" implementation for authentication and authorization, but the design must allow for other implementations to be plugged in as required.

As an example, a given deployment may call for authenticating a user/password combination against active directory and enforcing authorization checks at each web service operation based on a role assigned to the authenticated user. The modeling and administration needed to support this scenario can be likely to be done by a corporate IT group. To be deployed in this environment, demand forecast integrator would have to load a custom implementation for the authentication and authorization interface that accesses the active directory and the authorization data store that can be used.

Such an "out of the box" implementation provided by the demand forecast integrator is suitable for running within a trusted environment that restricts access to only those client machines that can run on the same LAN and behind a firewall. Such an implementation can automatically authenticate any client that attempts to communicate with demand forecast integrator via the web service interface. Every authenticated user can be permitted to execute all operations supported by the web service interface.

In some embodiments, the demand forecast integrator application maintains a transactional data store to hold submitted and calculated data and one or more of the following rules may apply: submitted data (i.e. load forecasts and overrides) is stored at the time it can be submitted; each submission has an associated transaction ID; each query that results in a composite load forecast being created is stored at the time it occurs and it has an associated transaction ID. The demand forecast integrator application accesses necessary model data including but not limited to load forecast areas, sources, area hierarchy, and the like, from the data store but it need not be maintained by the demand forecast integrator application. Population of model data is achieved through an external interface; the demand forecast integrator application accesses necessary historical data in response to queries on historical composite load forecasts and overrides. Population of the historical data store is not performed by the demand forecast integrator application. Persistence technology, such as a relational database management system, supports standard approach to auditing, rollback, flexible extension and the like.

In some embodiments, the method of calculating the composite load forecast may be re-implemented with different algorithm to suit different customer needs. Over time, the demand forecast integrator contains a series of composite load forecast construction methods that can be configured to match project needs. These construction methods can be configured during implementation and need not be dynamic user choices. The set of load forecast values that can be processed by demand forecast integrator may be extended in the future. In one embodiment the demand forecast integrator is relational database management system neutral.

In some embodiments, the demand forecast integrator produces composite load forecasts for load forecast areas taking into account overrides and submitted load forecasts. One or more of the following rules may apply: the composite load forecast covers the time interval and load forecast; a specified in a query can be submitted by a demand forecast integrator consumer (which also includes the market operator interface), and the like. When multiple load forecasts for a load forecast A cover the same time interval, the resultant composite load forecast can apply modeled weighting factors for each load forecast based on the load forecast source. As a non-limiting example, the composite load forecast for time interval t0-t1 can be a weighted average of the values provided by ultra-short-term load forecast, short-term load forecast, mid-term load forecast, and the like.

The weighting factor for each load forecast can be, (i) an attribute associated with each load forecast source; (ii) overrides can be applied to the composite load forecast produced in the above step; (iii) a composite for aggregate load forecast can be supported; (iv) a composite load forecast for a user-given time step size can be supported, and the like. Interpolation may be required to provide composite load forecast in the user-given time step size; smoothing at transitional boundaries from one load forecast (such as a 5-minute load forecast) to another (such as an hourly load forecast) and be achieved through manual fine-tuning of the load forecast source weighting factor profile.

Figure 13:
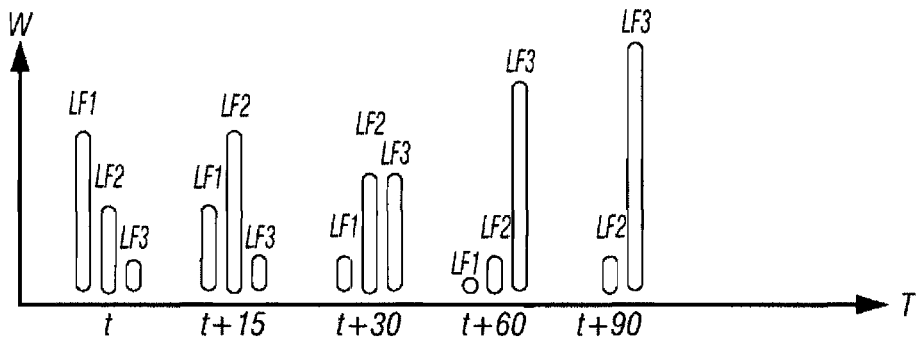
FIG. 13 is a graph illustrating load forecast source weighting factors that can be used with a demand forecast integrator of the present invention.

In some embodiments, load forecast source weighting factors can be used to calculate the composite load forecast. These factors define the weight of a load forecast source over a series of relative times. FIG. 13 illustrates how three load forecast S weights vary over a 90-minutes period. In this example, load forecast 1 can be the most accurate forecast for the short term forecast, load forecast 3 provide the most accurate forecast for the long term and load forecast 2 is in-between.

Aggregate load forecast areas can be those having one or more child load forecast as in the load forecast A hierarchy tree defined in the demand forecast integrator. In one embodiment, a load forecast cannot be submitted for aggregate load forecast As. However, a load forecast for an aggregate load forecast As can be calculated as follows: (i) each load forecast A can be associated with a scaling factor, If it can be not provided, it is assumed to be 1; (ii) a load forecast of an aggregate load forecast A can be the sum of the scaled load forecast of its immediate child load forecast As; distribution factors need not be supported by the demand forecast integrator, i.e., the demand forecast integrator need not have the ability to calculate the load forecast of a child load forecast A from the load forecast of an aggregate load forecast.

Figure 14:
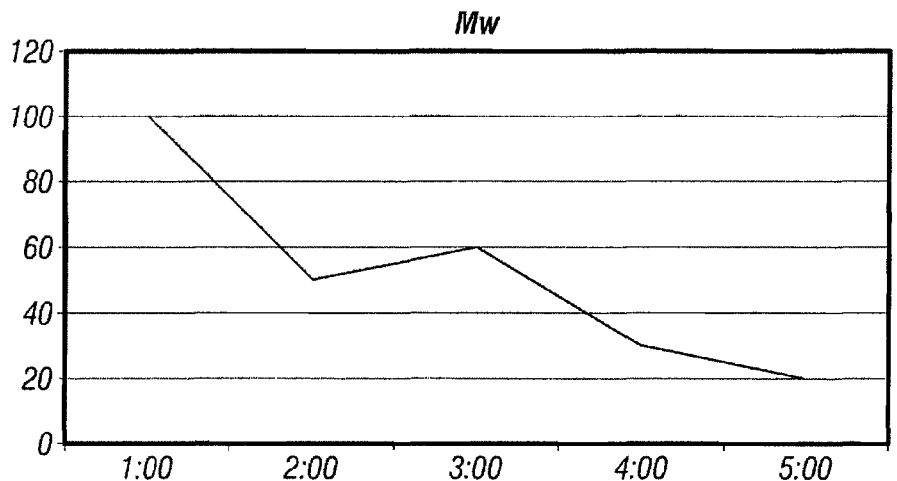
FIG. 14 graphically illustrates a use case for load forecast override considerations for a demand forecast integrator in one embodiment of the present invention.

In some embodiments, the following business rules can be applied to load forecast overrides: (i) an override can be inclusive in starting point and exclusive in ending point; (ii) a new override will take precedence over old override(s) if they have overlap in time axis; (iii) no smooth can be applied to overrides, and the like. A use case, which is a description of a system's behavior as it responds to a request that originates from outside of that system, is illustrated in FIG. 14.

When the load forecast area hierarchy changes, one or more of the following may occur: (i) the set of load forecast A's which belong to an aggregate load forecast A changes; (ii) a leaf load forecast A may become an aggregate and vice versa; (iii) a new load forecast A can be added to the hierarchy; (iv) an old load forecast A can be removed from the hierarchy; (v) a load forecast A hierarchy transition can be handled in the demand forecast integrator as follows: load forecast submission validation does not depend on the load forecast A hierarchy, as long as the specified load forecast A is a valid entry; (vi) a composite load forecast can be built according to the load forecast A hierarchy, and the like. If the target time range of the composite load forecast spans over two load forecast A hierarchies, the resulting composite load forecast reflect the two hierarchies accordingly.

Example 1

Use Case No 1

Submitting Load Forecast

This example illustrates adding new load forecast to one or more load forecast areas for the respective load forecast source. The trigger is load forecast engine 1 which submits a new load forecast. The demand forecast integrator validates the submitted information: valid load forecast source, valid leaf-level load forecast area, properly formed load forecast data points. demand forecast integrator overlays new load forecast on top of existing load forecast for load forecast engine 1. Assuming that the submitted load forecast's minimum and maximum time are $T_{min}$ and $T_{max}$, all previous input from load forecast engine 1 within $T_{min}$ and $T_{max}$ inclusively can be deleted. Demand forecast integrator responds with a success message. As a post condition, load forecast from load forecast engine 1 is updated in demand forecast integrator. This example illustrates how new submittals contain better load forecast than the previous ones.

Example 2

Use Case No 2

Submitting Load Forecast Overrides

This example illustrates adding load forecast override for one or more load forecast areas. In this example, the trigger occurs when an operator entered and saved load forecast override for a load forecast A. The market operator interface submits the overrides to the demand forecast integrator. demand forecast integrator validates the submitted information: valid load forecast source, valid leaf-level load forecast area, properly formed load forecast override data and the like. The demand forecast integrator adds the override values for the load forecast A. Assuming that the submitted override runs from T1 to T2, all previous override within T1 and T2 is removed. The submittal may include multiple set of overrides with non-adjacent time periods for the same load forecast A. Demand forecast integrator responds with a success message. The result is that demand forecast integrator contains additional overrides for the load forecast A.

Example 3

Use Case No 3

Requesting Composite Load Forecast for the Market Operator Interface

This example illustrates obtaining a composite load forecast for the market operator interface. The trigger event is when the operator displays the composite load forecast for a specified time range. The market operator interface submits a request for the composite load forecast for the requested time range and load forecast A. The demand forecast integrator validates the submitted information which includes validating: (i) the load forecast source; (ii) the leaf-level load forecast area; (iv) from and to times; (v) time step, and the like.

The demand forecast integrator constructs the composite load forecast or the demand forecast integrator retrieves the composite load forecast depending on the implementation. The demand forecast integrator responds with the composite load forecast, including overrides. The market operator interface displays the composite load forecast and overrides in a graphical format. The returned information can contain the composite load forecast before and after application of override.

Figure 15:
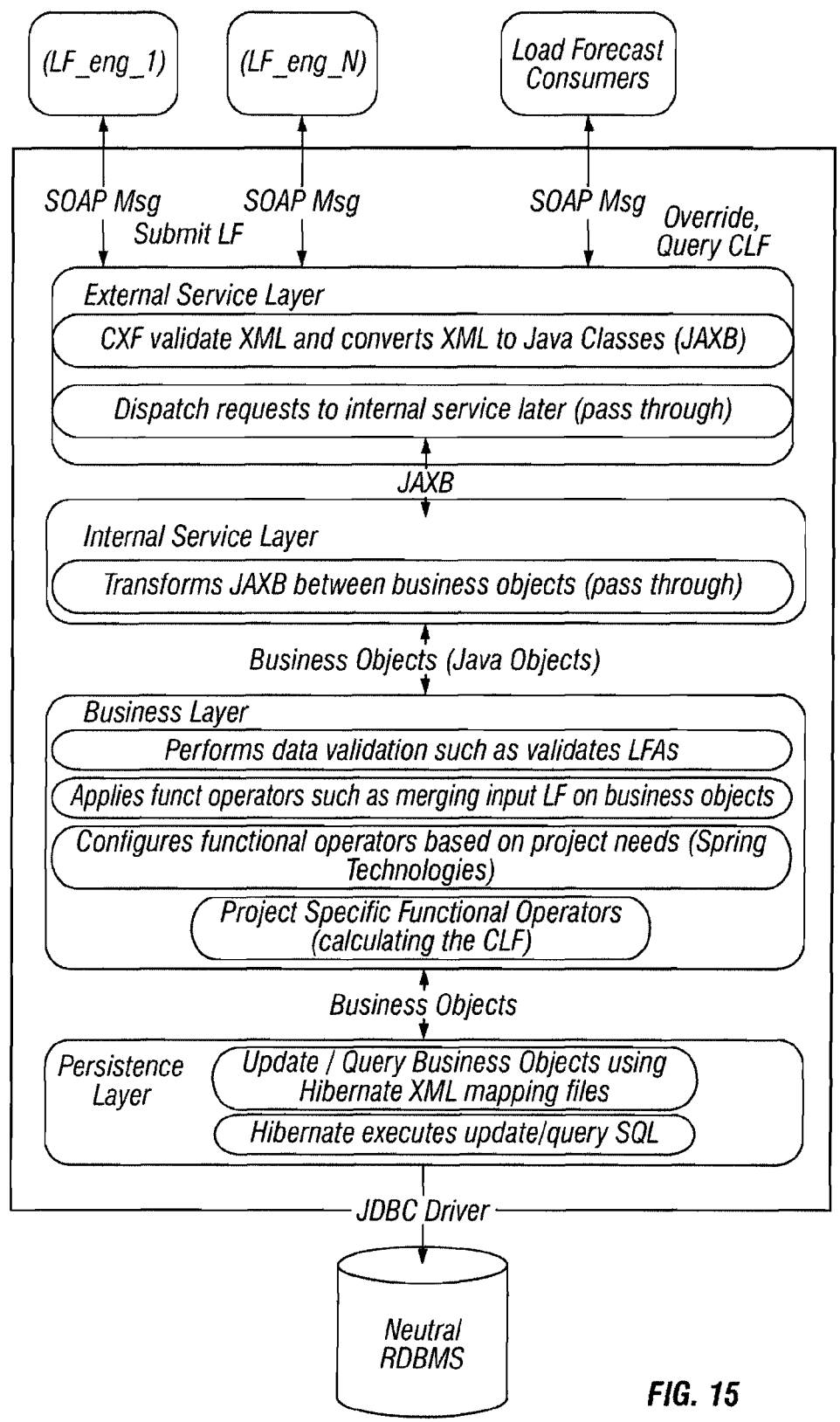
FIG. 15 illustrates one embodiment of a demand forecast integrator software architecture that can be used with the present invention.

FIG. 15 illustrates one embodiment of the demand forecast integrator software architecture. The demand forecast integrator has external clients that can be load forecast engines or consumers. Multiple load forecast engines may submit load forecast periodically to the demand forecast integrator as frequent as every few minutes. Consumers may query composite load forecasts and override load forecasts randomly. External clients can be responsible for creating and submitting soap messages based on the demand forecast integrator XML message schema and WSDL. The XML schema and WSDL can be published to external clients.

An external service layer can be provided. In some embodiments, multi-threaded CXF web service listeners can be serving the requests. CXF is responsible for XML validation and converting soap messages to JAXB.

An implementation of WSDL operations serves the requests and dispatches the requests to internal service layers for data transformation.

In some embodiments, transaction id can be generated in an internal service layer. This transaction id is stored in and accessed from a thread context within the thread that processes the request. Data transformation to business objects can be required if the JAXB does not provide good representation for functional operations such as merging load forecasts.

A business layer can be provided that implements all functional requirements such as merging and overriding. Business objects can be defined to support functional requirements. A set of functional operation interfaces is defined to operate these business objects.

Figure 16:
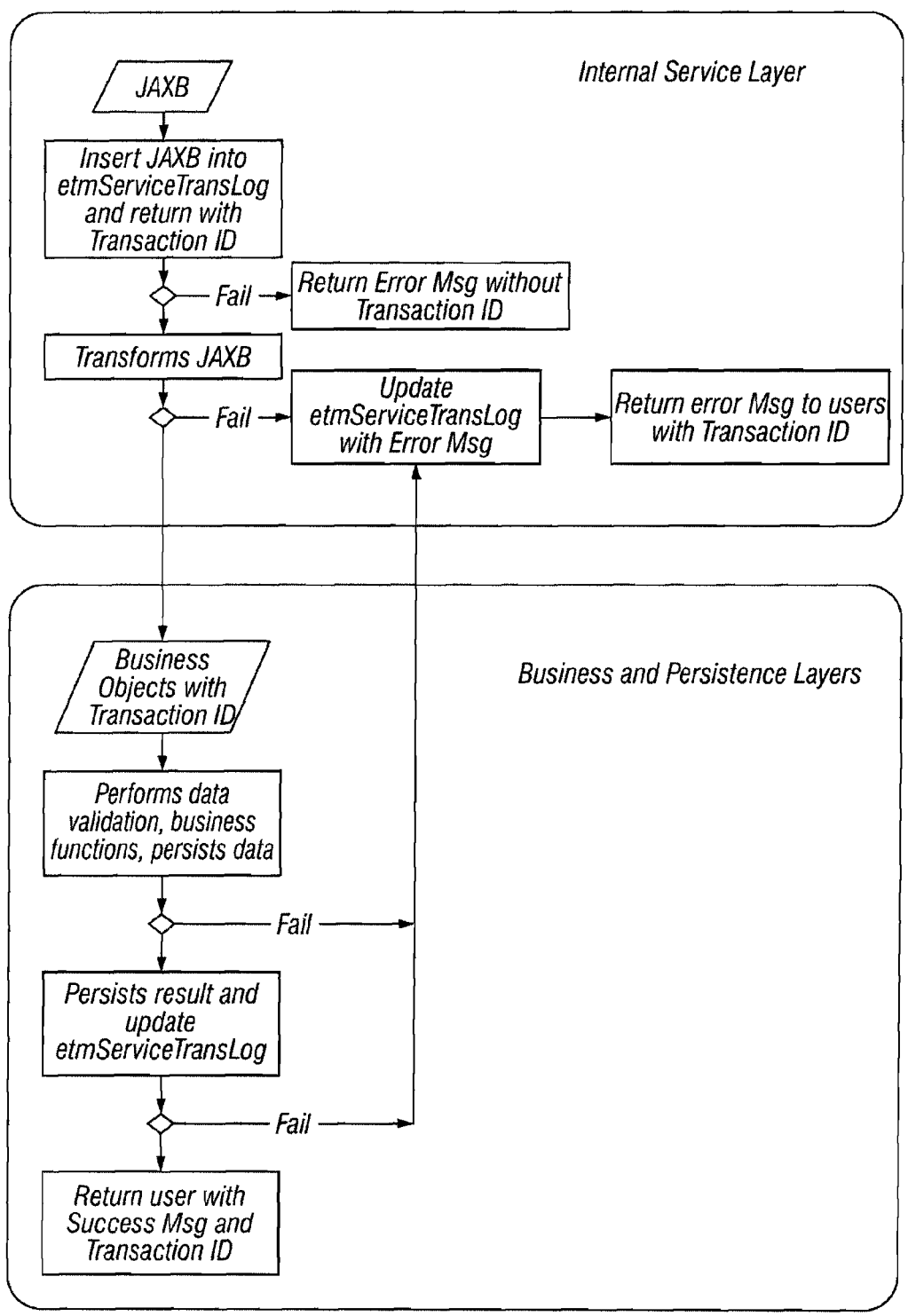
FIG. 16 illustrates an example of structure of an internal service layer of a demand forecast integrator in one embodiment of the present invention.

A persistence layer can be provided. In some embodiments, business objects can be mapped to a relational database management system table using hibernate XML mapping files. One example of structure of an internal service layer is illustrated in FIG. 16.

In one embodiment, all internal service implementation classes implement a base class that takes care of transaction management. The internal service implementation class can implement an execute method that can wrap around the whole request within the thread process.

Figure 17:
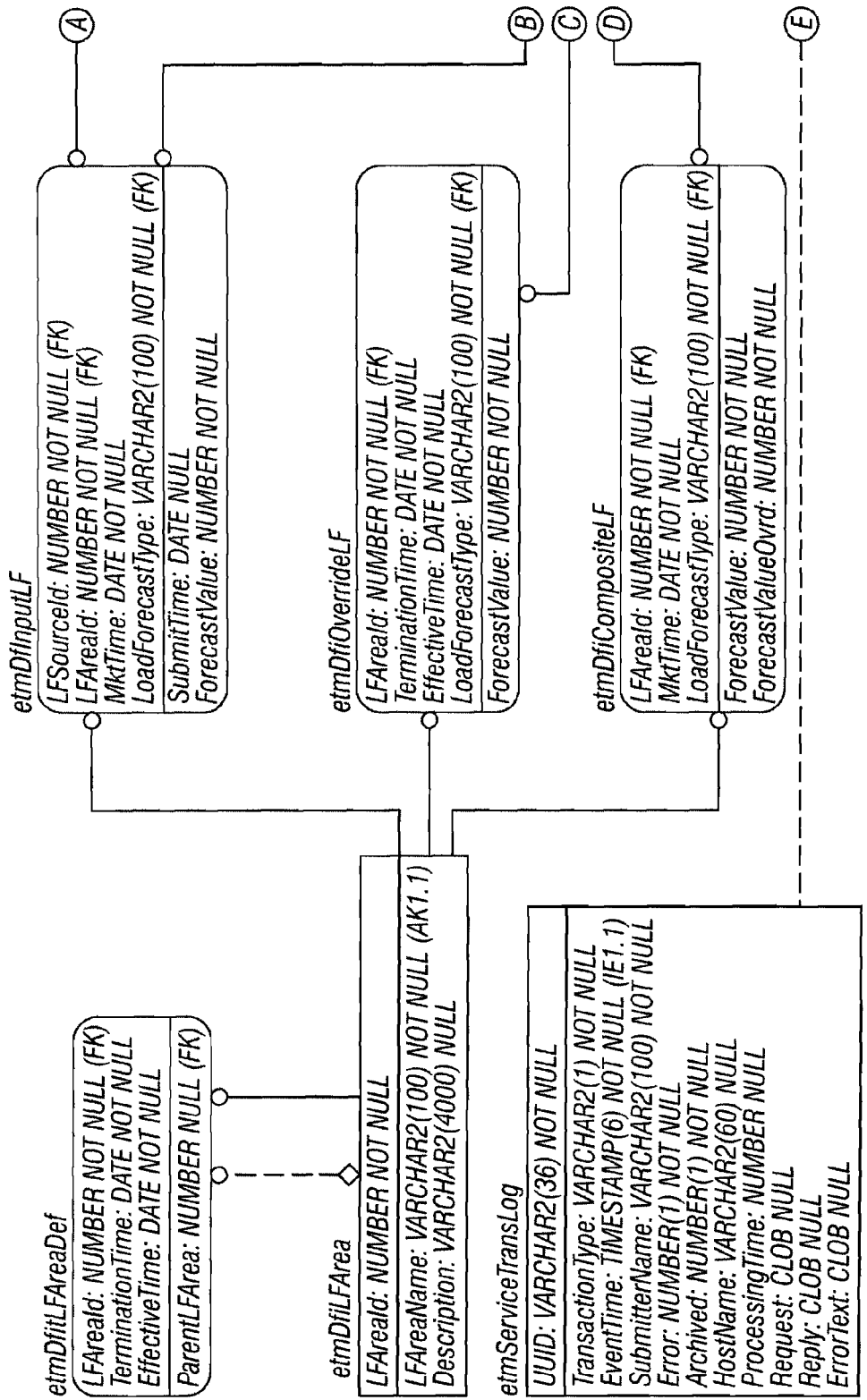
FIG. 17 illustrates one embodiment of a demand forecast integrator physical data layer that can be used with the present invention.

FIG. 17 depicts an example of the demand forecast integrator physical data layer. Operator manual overrides can be allowed to change the demand forecast integrator results. Those overrides are submitted to the demand forecast integrator, and have impacts on all new cases and case repopulation. An override should stay until it's manually deleted. In this way, overrides consistency could be preserved within the entire system.

Another core function of the system tool for dispatchers in power grid control systems of the present invention is after-the fact analysis. After the fact analysis aims at providing a framework to conduct forensic analysis. After the fact analysis is a decision-support tool to evaluate operational and financial performance, assess impacts due to historical or potentially new system events and/or conditions, and seek changes as necessary.

Figure 18:
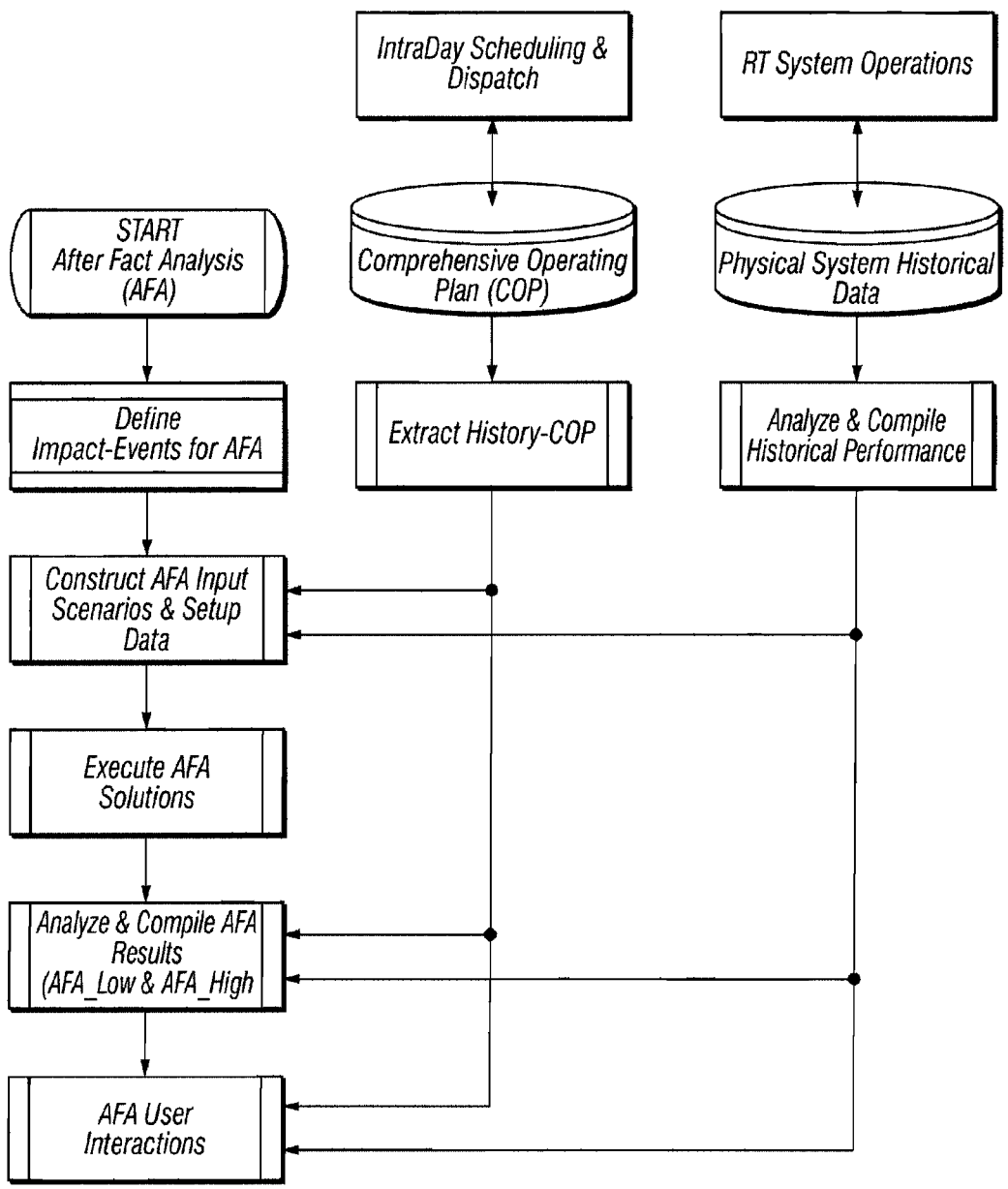
FIG. 18 illustrates a functional block diagram of an after the face analysis tool (AFA) of the present invention.

After the fact analysis is a product for systematic analysis of past events and practices, and is illustrated in FIG. 18. It can be used to establish quantitative assessments of how do specific events and practices affect system performance. A key characteristic of after the fact analysis can be the use of actual system operational data, which helps establish a suitable level of credibility and practicality of the after the fact analysis analytical results. After the fact analysis can be designed to support many different types of analysis within a consistent framework. Different types of analysis can be implemented as different types of use-cases. In fact, after the fact analysis can be a class of use-cases that focus on "Day-After" analysis of the performance of actual system dispatch results, including the impacts of specific events. It will be appreciated that after the fact analysis can be for a time period other than a day after. After the fact analysis could be built on any existing market systems and be considered as an add-on off-line "Day-After" analysis tool. The discussion below focuses on the design for perfect dispatch, illustrated in FIG. 19, as it exists within the overall after the fact analysis framework.

After the fact analysis is a comprehensive business solution used in an off-line, after-the-fact environment to study the real-time dispatch performance of any previous day within the data retention period. Requirements for after the fact analysis are defined by the use-cases in terms of their engineering business functional capabilities, and specific levels of integrated data interfaces and user interfaces. Requirements that can be common to multiple use-cases are presented before the individual use-cases requirements.

One of the business objectives of after the fact analysis is to assess the performance of system dispatch by comparing performance metrics for actual dispatch results with metrics for reference case dispatch results. Performance metrics can be a set of quantitative metrics that reflect system efficiency and security concerns. By way of illustration, and without limitation, using total production cost as a metric for efficiency, after the fact analysis can calculate the cost associated with actual dispatch and compares it against the cost associated with the reference dispatch.

Another business objective of after the fact analysis is to analyze performance impacts associated with specific operating events, e.g. excessive deviations of tie-line flows from the scheduled levels. By simulating specific events and calculating their quantitative impacts on system performance, the after the fact analysis should generate information that could help identify reasons that contribute to the performance gap between actual system operation and an idealized reference condition. It is important that the impacts for each event be clearly identified, and that multiple events may be analyzed within a given after the fact analysis study. To ensure clarity in interpreting the impacts of each event, the after the fact analysis can simulate each event individually, and calculate its impacts with respect to appropriate Performance metrics. The performance metrics can then be compared with the Reference Case and actual system operation history.

The expected results from each after the fact analysis study include one or more of: re-constructed actual system operation history from recorded real-time data; re-construction of recorded real-time data does not rely on results from any optimization application security constrained unit commitment (SCUC), which is a process to perform unit commitment subjected to transmission constraints in a power system. In one embodiment, after the fact analysis includes recorded real-time data with the following data for each time period over the after the fact analysis study interval, actual: load; unit output; unit commitment status for each scheduling interval; network topology; constraint flows and the like.

In some embodiments, after the fact analysis uses the same optimization dispatch engine as the scheduling functions. It solves the commonly-known security constrained economic dispatch (SCED) problem, which can be the general optimization framework applicable to various scheduling tasks.

The definition and creation of reference case dispatch results is based on specific business rules, such as use actual demand instead of forecast demand, and in general requires solving optimization applications (e.g. SCUC/SCED). Different use-case types can have different rules for construction reference case dispatch results. One or more scenario results from the set of specific events associate each after the fact analysis study. Each scenario contains specific changes to input data for the reference case dispatch results case (e.g. increase reserve requirement by 100 megawatt over the reference case dispatch results reserve requirement). In general, each scenario requires solving optimization applications (e.g. SCUC/SCED).

Different use-case types can have different types of scenario results, which may include one or more of: performance metrics calculated for recorded real-time data, reference case dispatch results, and each scenario; appropriate summary and drill-down details for each performance metrics; comparison of different cases including but not limited to, recorded real-time data, reference case dispatch results, scenario and the like. History of system/resource operations can be captured via standard data-recording functions and can be made available to after the fact analysis. After the fact analysis does not perform general purpose real-time data recording.

After the fact analysis provides a tool that collects appropriate historical data from the archived market cases that include state estimator and alleviate overload files to construct recorded real-time data.

After the fact analysis studies are conducted with extensive use of pre-defined default configurations and data settings, and automated data gathering. To further simplify after the fact analysis usage, different types of after the fact analysis use-cases are constructed to support different default configurations and settings. Use-cases can be implemented as study modes in market database. A user selects specific use-case when running an after the fact analysis study. Each after the fact analysis study can be identified by a user-defined name and includes set of input & output data consistent with the use-case (i.e. study mode) type it belongs to. Input data to after the fact analysis includes one or more of: recorded real-time data is abstracted from recorded operation, as described earlier; reference case dispatch results data includes data from consolidated operating plan, which can be a set of tables in market database third-party data sources, such as actual unit ramping performance, and miscellaneous user-entries; scenario data includes impact factors specified by the user and may in the future also include data from third-party data sources.

After the fact analysis can utilize a transmission security model. After the fact analysis results can be subject to transmission security constraints. The set of transmission constraints can be as defined in the market database/the comprehensive operating plan. In addition, after the fact analysis may be configured, if necessary, to interface with simultaneous feasibility test to identify constraint violations beyond those initially contained in the market database/the comprehensive operating plan.

Output data from after the fact analysis includes one or more of: re-constructed recorded real-time data and performance metrics; reference case dispatch results and performance metrics; scenario results and performance metrics for each and every scenario defined for the study. There are various factors that have impacts on after the fact analysis system operations. For each scenario in an after the fact analysis study, the user may define a specific set of impact factors that collectively represent a specific event or a set of events.

In one embodiment, the after the fact analysis system needs to perform at least the following major core functions: interacting with captured historical data; enabling users to define studies including reference and scenarios; conducting batch studies and comparisons of history, reference, and multiple scenarios; analytical modules: optimization engines, security analysis; the market operator interface to set up study cases and to evaluate study results and the like.

To compare what has been taken place in the study day, after the fact analysis collaborates with various systems that capture and record power system operations data in real-time. This data may include but is not limited to system performance data such as load, frequency, tie-line error, reserve margin; decision data such as dispatch instructions, unit call on/call off; and system events such as topology changes, constraint violations, other disturbances.

The principal category of captured power system data of after the fact analysis is the data preserved in state estimator and alleviate overload files such as: unit commitment status; unit outputs (active and reactive); active and reactive bus loads; active and reactive branch flows, and; active and reactive constraint flows.

State estimator data can be preserved in archived market solutions (SKED2/general control application) and can be extracted from the archived cases, consolidated and made available to after the fact analysis by the after the fact analysis pre-processor. An after the fact analysis pre-processor can be implemented as a scheduled job in a market database that runs in early morning hours to extract the actual operational data and make it available for subsequent after the fact analysis studies.

In addition to state estimator and alleviate overload data, several types of data can be stored in the market database and sourced from archived files as well. While this data can be exported to after the fact analysis from market database via the standard exporter mechanism, it can be pre-processed by the after the fact analysis pre-processor in order to improve the performance of after the fact analysis studies. This data includes but is not limited to: load forecast; regulation reserve requirements; operating reserve requirements; unit megawatt schedules; unit megawatt limits; demand resource schedules; security constraints; scheduled outages; transmission security constraints; scheduled Net Interchange and the like.

In some embodiments, each after the fact analysis study can be associated with a specific after the fact analysis use-case (i.e. after the fact analysis study can be implemented as case or set of cases in the market database whose study Mode corresponds to the after the fact analysis use-case). Many study datasets may be involved in a daily after the fact analysis-Low study. Each dataset can be associated with the day and can be uniquely identified by study name (e.g. after the fact analysis-Low_yyyy-mm-dd_studyname. Each study contains multiple scenarios: recorded real-time data, for actual History, reference case dispatch results, for reference, scenario, for Impact scenarios, and the like. Each scenario can contain one or more impact-factor models. Performance metrics are evaluated and compared for each scenario.

The data structures required for an after the fact analysis study include but are not limited to: (1) Study (use-case) type, which defines the type of study being conducted, with each use-case having a set of analyst-configurable parameters with default data values. (2) Study control, which defines the run time parameters such as duration of the study. (3) Reference case, which defines the input data set required for constructing the reference case, such as whether actual or nominal reserve requirements can be used, as well as configurable parameter for executing the reference case such as an option for allowing re-commitment. (4) Scenario case, where each study can have one or more scenario cases. Each scenario can be an impact analysis of the combined effect of a collection of impact data items against the reference case. Other than having the common reference case, each scenario can be independent of any other scenarios. (5) Impact factor data items, which are operating parameters that may impact the system performance, such as tie-line schedule, unit ramp rate, reserve requirements. For each data item, user can enter either the absolute value or the deviation from the reference case. Multiple impact-items may be grouped into named-templates for convenient re-use in other studies. (6) Performance metrics, which are default data items that compares the result of each scenario case verse the reference case, such as production cost, reserve capacity, and the like.

In one embodiment, three functional modules are related to the execution of an off-line study case. The business logic for these functional modules primarily resides in the market database. As a non-limiting example, separate queues can be deployed to avoid adversely affect the on-line scheduling functions, and to ensure appropriate performance for after the fact analysis.

The first module is a construct input data module which prepares all the input data for the study. A user analysis defines the study. This module then: (1) collects all the data that represents the actual dispatch performance; (2) prepares the input data for constructing the reference case; (3) gathers the impact data items to construct the scenario cases, and the like. For efficient purpose, the impact data items for a scenario can be exported as a "delta file" such as deviations from the reference case data, and the like.

In addition to the existing market database-based mechanism for exporting data to analytical engines for studies, that is exporter application and views, a dedicated after the fact analysis pre-processor application can be used for collecting operational and other input data for after the fact analysis from archived case files. This data pre-processing can be scheduled to run before daily after the fact analysis-Low study. It can be implemented as a new after the fact analysis_PREP study mode in the market database.

The second module is a batch execution module, where the reference case and the scenario cases can be grouped as a batch. An after the fact analysis-Low study may also include only the reference case. From the analytical module standpoint, they are separate dispatch cases. In the database, they can be linked together for processing and comparison. Multiple scenarios and reference case can be executed in parallel.

The third module is a compile study results module which consists of database procedures that can be linked to new after the fact analysis displays in the market operator interface. Based on the batch information (i.e. case data) and the performance metrics defined for the study, this module processes the case solutions and performs the automatic case comparison to provide impact analysis results.

A scenario designed to simulate the effects of short term demand forecast errors, for example, may include changes to impact factors representing regulation requirements and operating reserve requirements. Each impact factor can be typically modeled by input data parameters. The effects of impact factors on system performance can be determined by solving each scenario with appropriate input data parameters that correspond to the impact factors.

The set of impact factors can be very comprehensive. Examples of impact factors include but are not limited to: (1)

system and area load changes; (2) zone and area regulation requirement changes; (3) zone and area reserve requirement changes; (4) unit limit and ramp rate changes; (5) unit commitment status change; (6) unit minimum UP and Down time changes; (6) security constraint change; schedule transaction megawatt and price changes; (7) constraint limit and contingency changes; (8) topology changes, and the like.

An optimization model can be utilized. In some embodiments, the results of reference case dispatch results and scenario's can be solutions from a SKED engine. The optimization model for each solution can be based on the formulation framework of a general control application problem and can be characterized by a commitment optimization that allows the resources to be recommitted, instead of forcing each resource to follow the actual commitment schedules over the after the fact analysis study interval.

Even when commitment is permitted, re-commitment can be performed only for units designed as eligible & available for re-commitment; dispatch optimization. This allows the resources to be permitted to be optimally re-dispatched for the after the fact analysis study interval. and can include: (1) The basic re-dispatch model can be based on the general control application SKED engine formulation, where all time-intervals can be optimized simultaneously as one multi-interval commitment problem; (2) In addition to the basic model, an alternative extension is provided that will solve the multi-interval re-dispatch problem as a series of single-interval dispatch. This alternate approach can use the solution dispatch megawatt at the end of each interval "t" as the interval as the initial condition for each interval "t+1", and allows re-dispatch for the 1+1" interval to be bound by the resource ramp rate the interval "t+1"; (3) Loss optimization allows for the loss minimization among those equipments designated in network model; (4) Use of a resource model, where in some embodiments, resources can be modeled based on the same information used in day-ahead and intra-day schedules, including but not limited to capacity & ramp rate limits, heat rate & fuel model, and the like. The basic model parameters can be contained in the market database, including the actual operator's input, overrides, and impact-factor changes for specific scenarios.

A system requirements model can be used for system parameters, such as demand forecast, reserve requirements, and the like, that is based on data in the comprehensive operating plan, and includes overrides and impact-factor changes for specific scenarios.

In some embodiments, changes to one or more of the following data value from the level used as input is applied to determine reference case dispatch results. Each scenario may contain multiple changes including but not limited to changes for: (1) Regulation requirements for reflecting effects of tie-line errors, deviations from nominal unit ramping performance, very-short-term load forecast errors, uncertainties in wind-generation; (2) Reserve requirements for reflecting effects of day-ahead and intra-day forecast error, uncertainties in wind-generation; (3) System and area load to reflect effects of day-ahead and intra-day forecast errors and uncertainties in distributed, non-observable generation; (4) Tie-line schedules to reflect changes to scheduled tie-line equanimities; (5) Scheduled transactions for changes to scheduled tie-line equanimities; (6) Unit megawatt limits, including units that have fixed megawatt schedules, and for reflecting effects of units not-following dispatch instructions, for providing voltage support, including but not limited to, minimum megawatt generation and must-run; (7) Unit Commitment status where users are able to change commitment statuses of selected units to reflect effects of day-ahead and intra-day forecast errors, providing voltage support; (8) Unit operational parameters such as up/down ramp rates, min up/down and initially on times, allowing a user to change these parameters to reflect actual conditions, such as after unplanned events, and to create 'what-if' scenarios; (9) Load resource operational parameters for uncertainties intrinsic in modeling of this type of resources; (10) Security constraint limits for changing operating conditions, errors in bus-load distribution factors, and the like.

With the present invention it is possible to calculate several performance metrics based on actual and/or calculated megawatt dispatch results. The set of performance metric's can include: economic operation; bid production cost; daily percent of perfect; bid production cost savings; startup cost for incrementally committed units; startup cost savings; percent savings; year to date (YTD) running average; megawatt purchase cost (based on contract price paid to generators for injecting power to the grid); fuel consumption; emission; losses; physical operation; total generation; regulation reserve capacity; operating reserve capacity; unit commitment schedule; unit megawatt output; grid security; megawatt loading levels for pre-defined constraints in the Watch List; constraint violations, and the like.

As a non-limiting example, the set of performance metrics described above can be organized as follows: area grouping: by control area, generating company, plant, unit fuel type (coal, gas, hydro, wind, nuclear, other), division (sub-area); time grouping: daily, study interval (future function, when the study Interval covers multiple days), and the like.

Example 4

Perfect Dispatch Use-Case 1

After the Fact Analysis—Low: Ideal Reference

The business objective in this example is to re-dispatch and/or re-commit results. This is used to a create reference case dispatch results condition which can be designed to show what can be the best (e.g. lowest cost) dispatch result that would be theoretically possible, even though these perfect system conditions, which can be input to the after the fact analysis, may not exists in the real physical system. This use-case can be named after the fact analysis-Low, where Low refers to the reference case dispatch results being the lowest cost ideal condition. From the low-cost reference, after the fact analysis-Low, each scenario, which simulates effects of impact factors, can be envisioned to produce cost-adders that would be added on top of the reference case dispatch results. The adders gradually fill from the bottom up and reduce the gap between recorded real-time data and after the fact analysis-Low reference case dispatch results.

The set of input data used for determining reference case dispatch results for after the fact analysis-Low is as follows: actual load; nominal/typical regulation requirement; nominal/typical reserve requirement; actual network topology; nominal (i.e. perfect) unit operating conditions: capacity and ramp limits, and the like. The actual commitment schedules from recorded real-time data can be used as the starting point for unit commitment. Incremental re-commitment of qualified units is allowed in after the fact analysis-Low when the actual unit plan does not meet load, regulation and reserve requirements. As a non-limiting example, the regulation and reserve requirements can be: a combustion turbine and/or steam based on qualification time; nuclear and hydro can be mostly self-scheduled, and the like.

Example 5

Perfect Dispatch Use-Case 2

After the Fact Analysis—High: Practical Reference

In this example, the business objective is to re-dispatch and/or re-commit results to create reference case dispatch results condition that shows incremental and/or decremental changes in performance metrics over the actual dispatch (recorded real-time data). The differences between recorded real-time data and reference case dispatch results, for this use-case, can be results of certain "not-so-perfect" factors that adversely affected the "actual dispatch". In contrast with the previous use case (after the fact analysis-Low), which uses a "lowest cost" reference dispatch, this use case uses a reference dispatch that is more practical than the ideal condition. This reference dispatch is relatively close to the actual recorded real-time data dispatch, and thus likely to have higher cost than the reference dispatch of after the fact analysis-Low use case. Hence the name after the fact analysis-High for its higher-than-lowest cost reference dispatch.

The set of input data used for determining reference case dispatch results for after the fact analysis-High can be as follows: actual load; regulation requirement that reflects actual conditions of the day (data values externally supplied to after the fact analysis); reserve requirement that reflects actual conditions of the day, which can be data values externally supplied to after the fact analysis; actual network topology; actual unit operating conditions for the day: capacity & ramp limits (data values externally supplied to after the fact analysis); actual Commitment schedules, and the like.

Any changes to the input data associated with specific impact factors are with respect to the input for reference case dispatch results for after the fact analysis-High. Hence, even for the same Impact Factor (e.g. reserve requirements), after the fact analysis-Low and after the fact analysis-High may have different input data values.

A relational database, which can be a market database, snapshot can be used with a snapshot capability available for capturing data from the comprehensive operating plan and other business services (e.g. load forecast and OI). The snapshot can be time-based or event-based. The user can configure the retention policy such as how many days of data to be retained in the production database. The study case results are also persistent in the database for the retention period. As a non-limiting example, the following data can be stored in the database; load forecast; regulation reserve requirements; operating reserve requirements; unit megawatt schedules; unit megawatt limits; scheduled outages; unscheduled outages as detected by the state estimator); transmission security constraints; bus load allocation schedules; the miscellaneous external data associated with actual system operations such as tie-line schedules; real-time tie-line schedule adjustments; fuel usage; emission production; real-time ramp rate from external functions, if available, that monitor & management ramp rate performance; real-time ancillary service requirement for each dispatch interval from a third party external ancillary service functions and the like.

In some embodiments, the SKED engine, acting as an optimization engine, can be designed to support comprehensive set of configuration options needed to meet different scheduling requirements. As a non-limiting example, some functional capabilities of the SKED engine include but are not limited to: (i) optimized resource commitment and dispatch scheduling with system, operational, and physical constraints; (2) system constraints; (3) energy demand; (4) regulation reserve; (5) operating reserve; (6) transmission security; (7) operational constraints; (9) transmission security; (10) energy; (11) minimum up/down times; (12) ramp rate limits; (13) operational bands around dispatch targets; (14) physical constraints; (15) maximum/minimum energy; (16) maximum/minimum regulation; (17) price and cost-based resource model; (18) price for energy and ancillary services; (19) cost based on a fuel, heat rate curve; (20) co-optimization for energy and multiple ancillary services; (21) constraint relaxation with segmented weighting of violation quantities; (22) a simultaneous feasibility test check can be provided at the end of after the fact analysis study as an option for network security validation; (23) iterative runs of simultaneous feasibility test with any optimization module may not be required; (24) a mixed integer programming-based optimization engine with advanced adaptation to scheduling functions; (25) performance metrics evaluation, and the like.

In some embodiments, the market operator interface case setup can follow the display design of the transmission evaluation application displays. The user can define reference and scenario cases and associations between them. The user is also able to define only one case as the reference case for the day. New display can be provided to facilitate entering of impact factor and scenario data.

In some embodiments, the results can be presented with a combination of graphical and tabular displays. Using the information of the batch and performance metrics defined for the study, the comparison results between the scenario cases and reference case can be automatically generated and presented in the pre-defined template. Conceptually, after the fact analysis results can be presented graphically by a family of curves, where each curve can be some performance metric which can be production cost, over different dispatch intervals, as a non-limiting example 48 in a day. This is described below using after the fact analysis-Low in the following example.

Example 6

In this example, curve 1 represents after the fact analysis/ with Low reference dispatch results, that is reference case dispatch results. Curve 2 includes results from scenario #1. Scenario #1 is characterized by extra regulation requirements to reflect the effects of a specific impact-factor, namely, tie-line error. Curve 3 illustrates the extra cost increase beyond reference case dispatch results. Curve 2 can be attributed to excessive tie-line errors. Curve 3 illustrates the results from scenario #2: Scenario #2 is characterized by generators not-following dispatch instructions, and can be modeled by additional regulation requirements beyond reference case dispatch results. Curve 4 shows the extra cost increased beyond reference case dispatch results that can be attributed to generator non-compliance. Curve 4 illustrates actual dispatch results from recorded real-time data.

In addition to the after the fact analysis specific displays above, generic case results displays can be used for viewing of after the fact analysis case results.

Because Excel is commonly used by the regional transmission organization engineers and analyst for comparison of scenario input data, study results and statistical analysis, the grid after the fact analysis displays in the market operator interface is implemented with this interoperability in mind with all market operator interface grids to be exported to Excel documents. Data can be copied and pasted directly between open Excel documents and display grids in the market operator interface.

In addition to data supporting data transfer between and Excel, the market operator interface can also support the export of data from the market database into existing spreadsheets (i.e. tools and reports) by providing a special display for the maintenance of mappings between stored procedures in the market database (that export data) and target objects in Excel.

In some embodiments, an after the fact analysis case for a day can be based on the day's actual approved production cases. The case file pre-processor can run as an automatic job at non-work hours (e.g., 2 am). The files needed for the previous day's after the fact analysis case can be ready when the after the fact analysis is executed.

In some embodiments, one after the fact analysis interval, including but not limited to 30 minutes and the like, can cover multiple source case intervals, including but not limited to 5-minute intervals used by SKED3 cases, or 15-minute intervals used by SKED2 cases. Each after the fact analysis interval can use the first interval data in the interval file of the source case with the same interval start time as the after the fact analysis interval. As a non-limiting example, an after the fact analysis interval 10:30 (10:30-11:00, assuming interval start time convention is used) can use the first interval data of the source case for interval starting 10:30 (i.e., the 10:30-10:35 interval for a SKED3 case, or the 10:30-10:45 interval for a SKED2 case). Pre-processor produces the interval file for after the fact analysis that contains the data for each after the fact analysis interval and there is one interval file produced by the pre-processor for a day. The pre-processor is designed to support different intervals, as a non-limiting example, 5, 15, 30 minutes and the like, by updating configuration settings and can be, as a non-limiting example, tested mainly with a 30 minute interval.

In some embodiments, schema structures are built to store historical data used by after the fact analysis as illustrated in FIG. 20. This information can be exported to the market clearing engine for running after the fact analysis cases. For performance and maintenance purposes, these new structures may be implemented in a separate schema from the market database.

Figure 21:
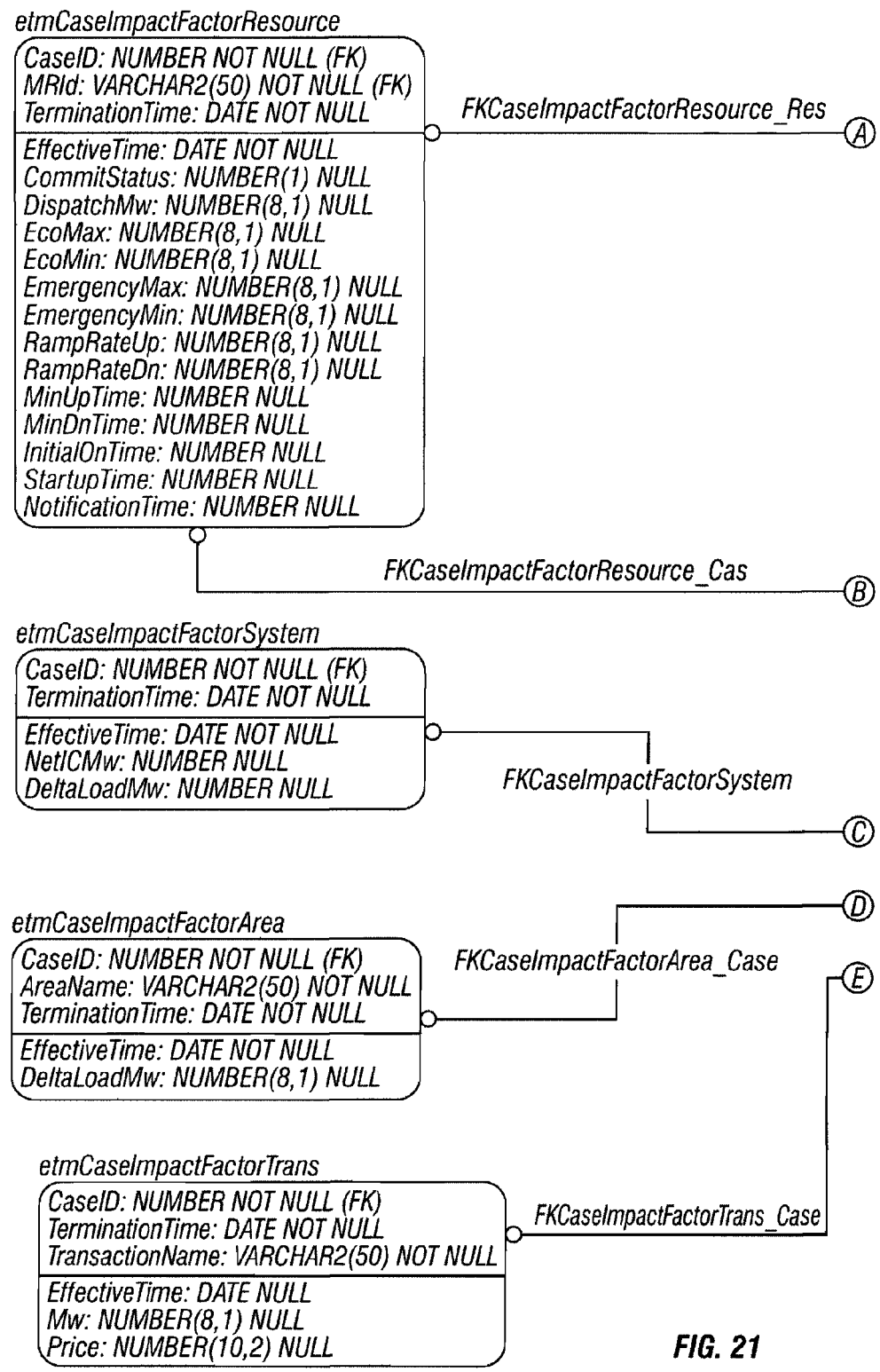
FIG. 21 illustrates the use of impact factors in one embodiment of AFA of the present invention.

In some embodiments, new market database schema objects are added to model impact factors which are input to the respective scenario cases. Impact factors can be perturbation to the input data of the case as illustrated in FIG. 21. Technically the impact factor structures can be very much akin to some of the existing case override structures in the market database. However, the new impact factor structures will provide more comprehensive perturbation capability than the existing case override structures. Inside the market clearing engine, the impact factors can be applied over the case overrides of the production cases.

In some embodiments, after the fact analysis market clearing engine can be based on a SKED engine. The function of case file and delta file reading is included. In addition to case files of the study intervals, after the fact analysis market clearing engine reads in actual system operation data. The major actual data items include: actual load; actual resource output; actual resource ancillary services dispatch; actual resource schedule; actual interchange/transaction and the like.

A market clearing engine may also read in impact factor data as needed for each scenario. This can include: load change; reserve requirement change; resource commitment change; resource energy dispatch megawatt or range change; resource ancillary services dispatch megawatt or range change; transaction megawatt change; security constraint change: enforcement/limit, and the like.

In some embodiments, after the fact analysis solution is based on two important assumptions: resources can be controlled to 100% of the facility rating; and all dispatchable generators will perform at 100% of their bid-in ramp rate.

In some embodiments, two-round execution logic is used, where the first round is for SCUC, based on which, the second round is to do sequential SCED by interval. In resource dispatch solving, interval t can be based on the solution of previous interval, i.e., interval t−1. The first interval can be based on state estimator. The two intervals can be bound by ramp rate limits. The mixed integer programming method can be used to solve the first round unit commitment model, the linear programming for the second round economic dispatch problem.

In some embodiments, in both SCUC and SCED, commitment and dispatch for energy and ancillary services dispatch can be handled in a co-optimization way. The following models can be included: power balance model; resource model; price model; cost-based model; dispatch range; ramp rate limits; maximum/minimum energy limits; commitment eligibility; minimum-up/minimum-down limits; maximum start up limits; ancillary services model, which includes ancillary services eligibility, ancillary services capacity, and regional requirements; transaction model; security constraint model, which supports multiple penalty segments; security constraint relaxation, where constraint relaxation logic can be included to avoid locational marginal price being contaminated by penalty price in the situation of constraint violations, and the like.

In some embodiments, market clearing engine provides files with power injections based on the dispatch solution, which allows simultaneous feasibility test checking for network security validation. In addition to existing resource commitment/dispatch and security constraint solutions, bid production costs of both actual operation solution and after the fact analysis solution can be calculated.

An after the fact analysis market clearing engine reads in input data for each study interval. The files can be extracted from production cases executed in study day, which can be usually the previous day or part of previous day for after the fact analysis by Preprocessor. For each after the fact analysis case, the input files can include: one daily file, which can be the daily file of any production case executed in the study day; one interval file, which can be aggregated based on the case interval files executed in the study day, and the like.

In some embodiments, the market operator interface provides a user interface of the following functions: collecting user input data including case parameters and impact factors; displaying summary result of performance metric; automating data population from database to predefined excel workbook which has data sheets and report sheets; creating report sheets in the excel workbook can be outside the scope of developing, and the like.

The after the fact analysis case control display looks similar to other case control display that supports case parameter inputs and; display case workflow status and messages.

Figure 22:
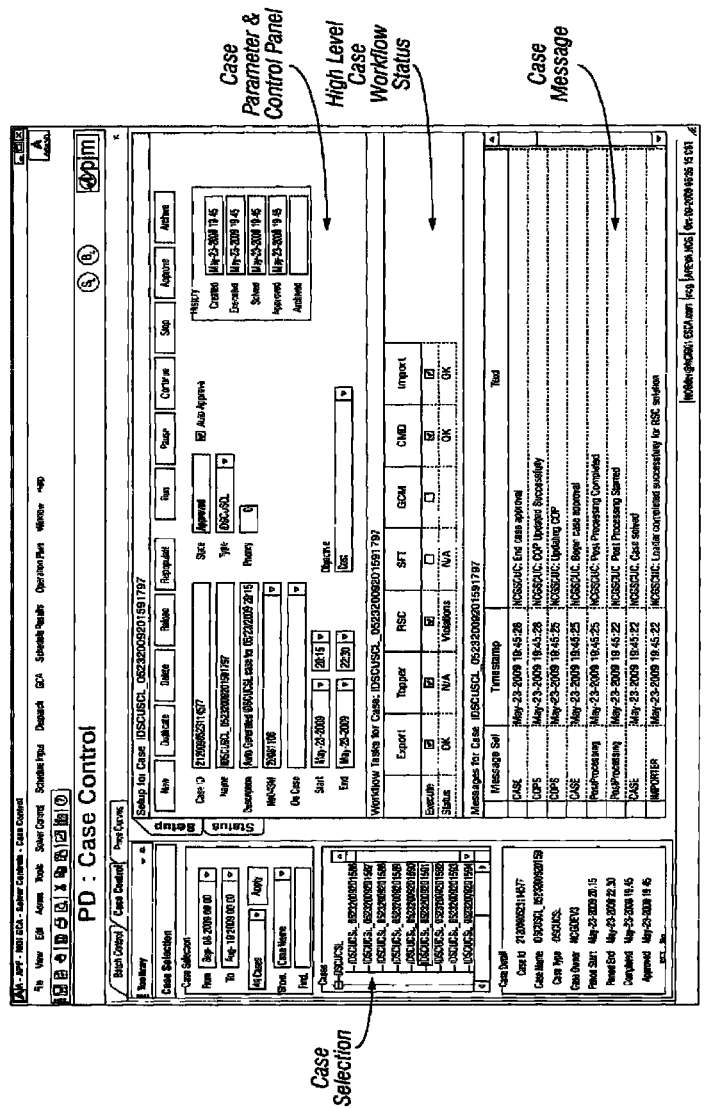
FIG. 22 illustrates a read only display of an embodiment of AFA case actual values and displays actual values for each AFA case.

The read-only display of after the fact analysis case actual values (scenario zero) can display actual values for each after the fact analysis case, illustrated in FIG. 22. This set of values act as the base for each after the fact analysis case. User friendly filters are on the left panel to filter the result returned.

Figure 23:
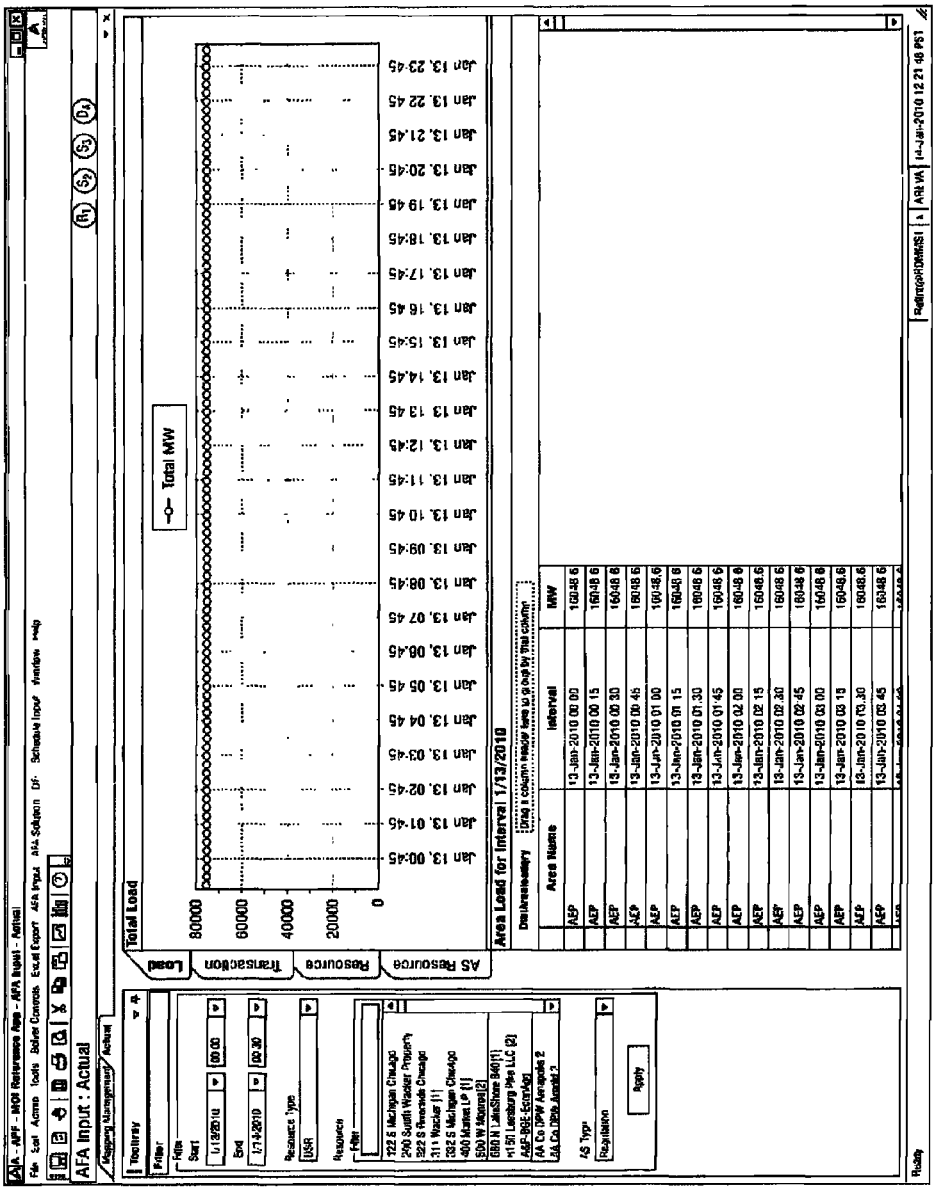
FIG. 23 illustrates an impact factor input display that supports inserting, updating and deleting impact factor delta values in AFA in one embodiment of the present invention.

The impact factor input display supports inserting, updating and deleting different impact factor delta values for scenarios as shown in FIG. 23. It supports resource, resource ancillary services, constraints, area, area ancillary services, system and transaction impact factors, and the like. Impact factors can be copied and pasted. Rows can be selected from one grid and copied and pasted on other same type of grid. Case Id and effective and termination times can be adjusted on the selected case.

Figure 24:
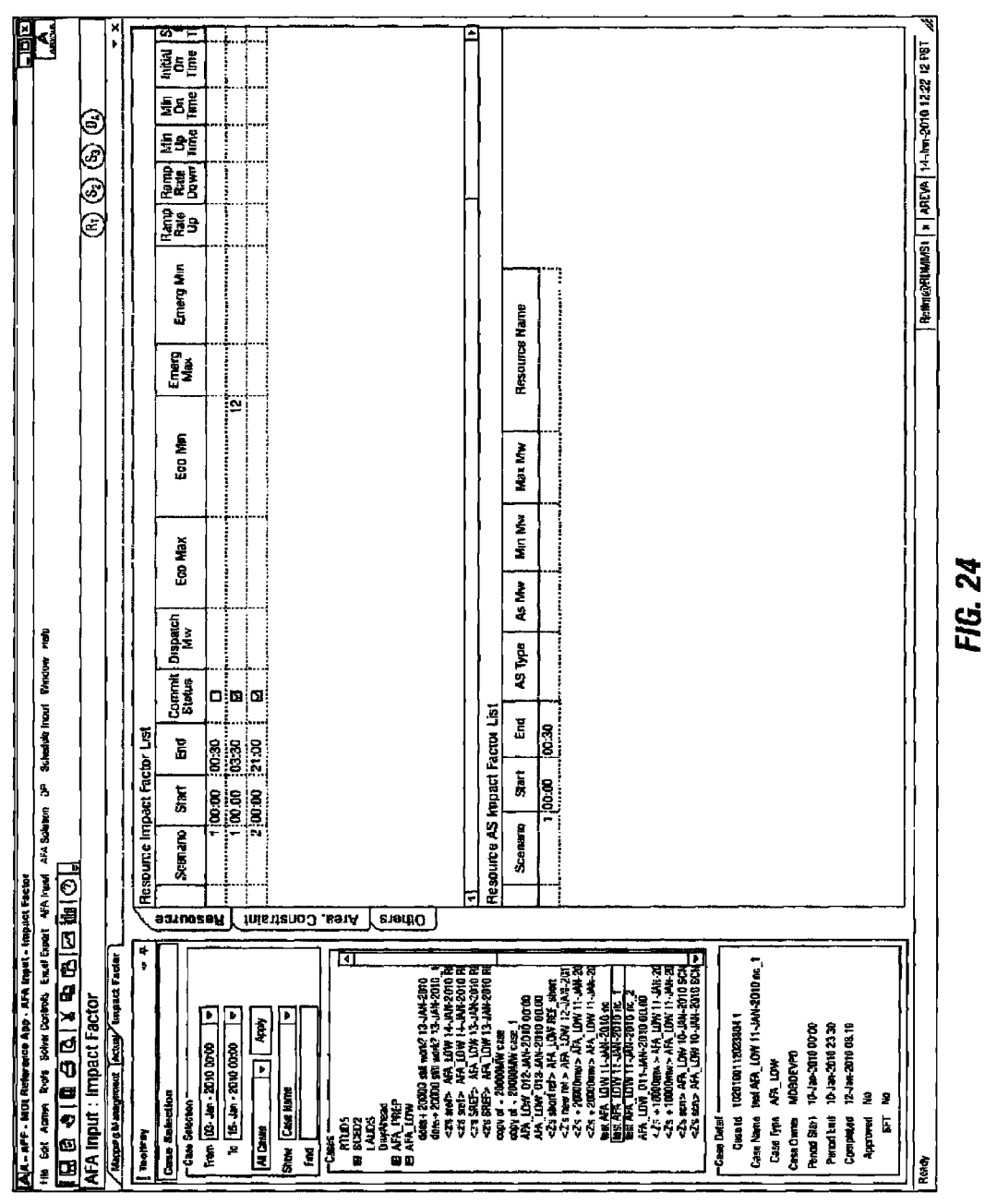
Figure 25:
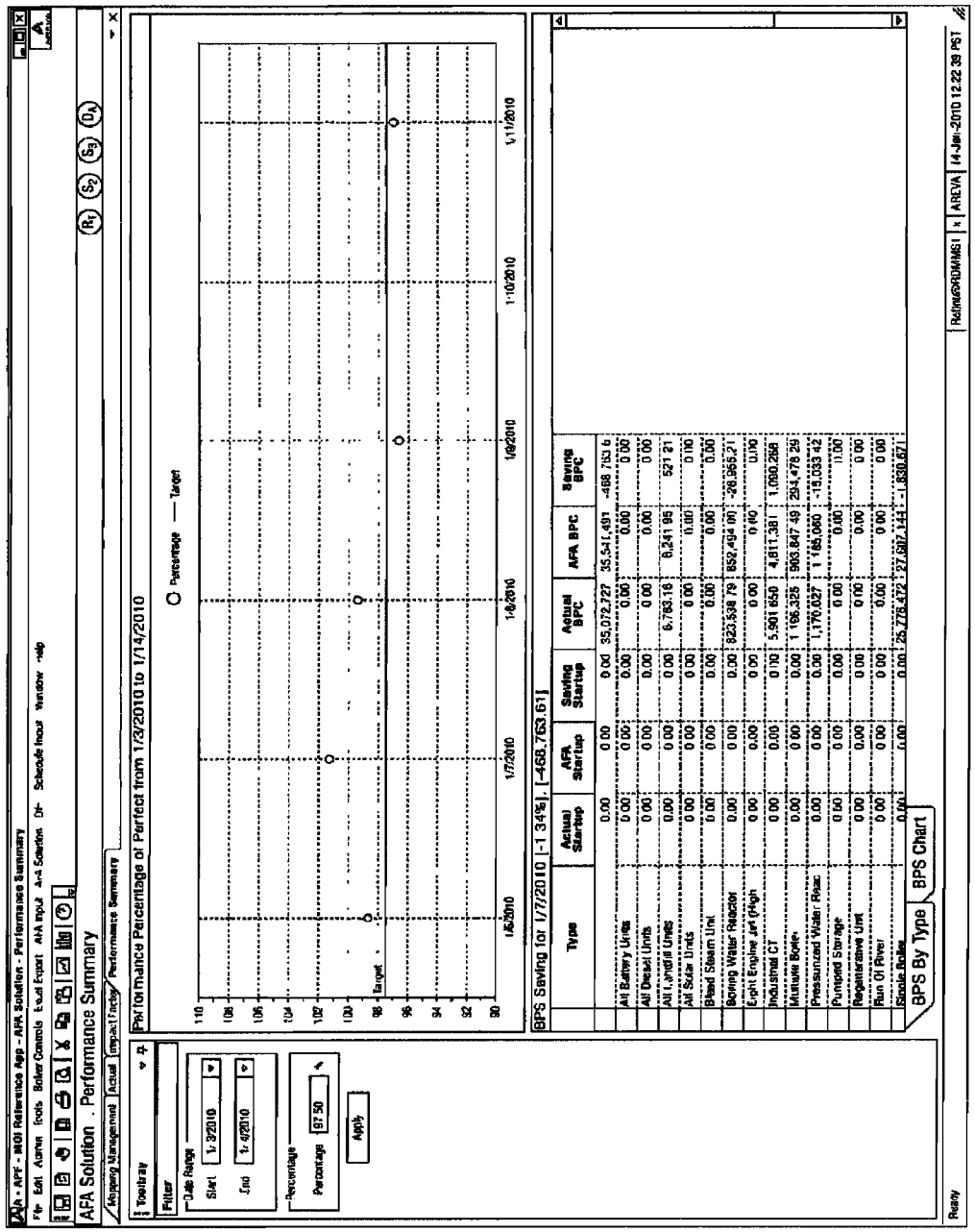
FIG. 25 illustrates a saving summary display to show top ten saving units and saving by types in one embodiment of the present invention.
Figure 26:
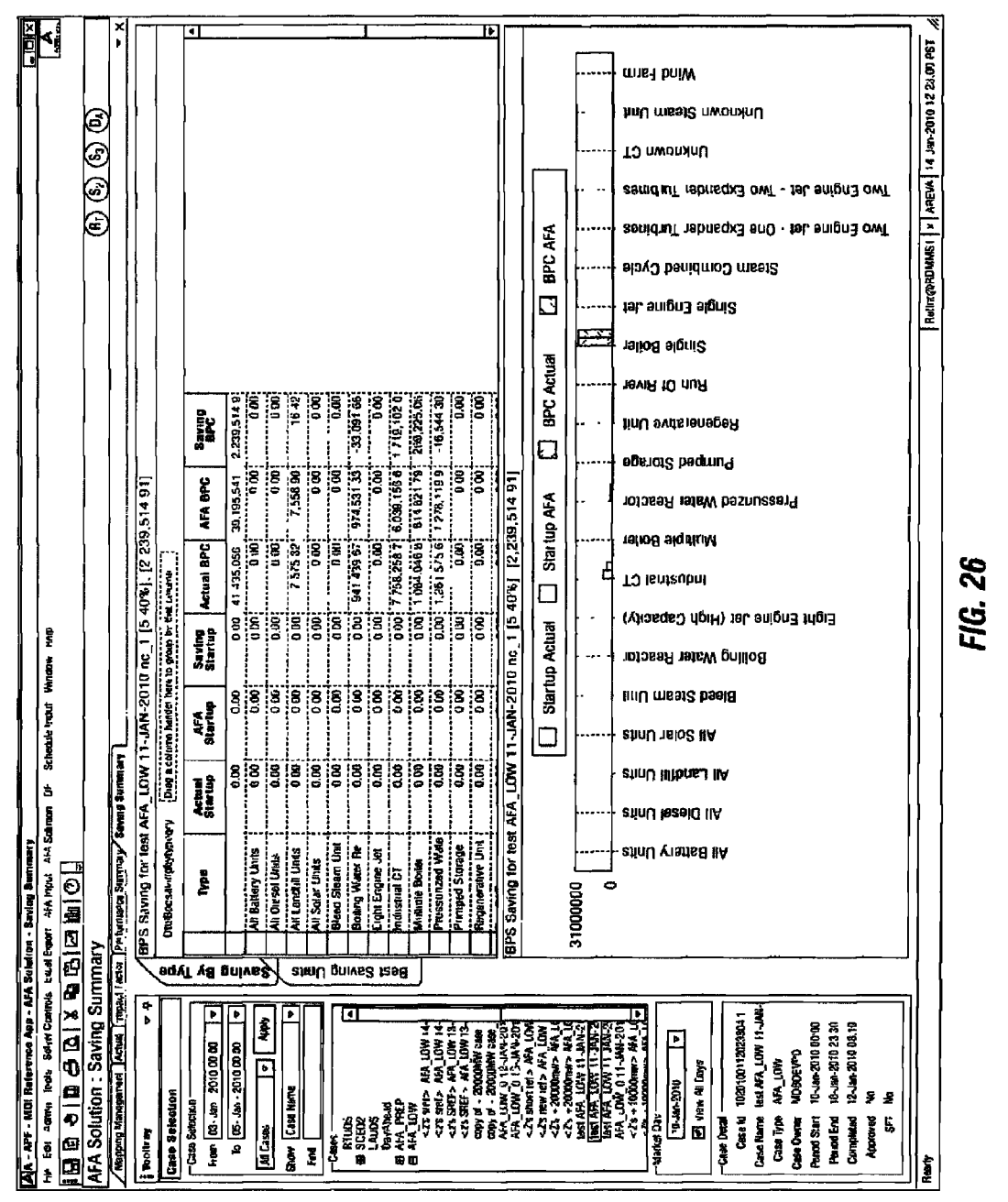
Figure 27:
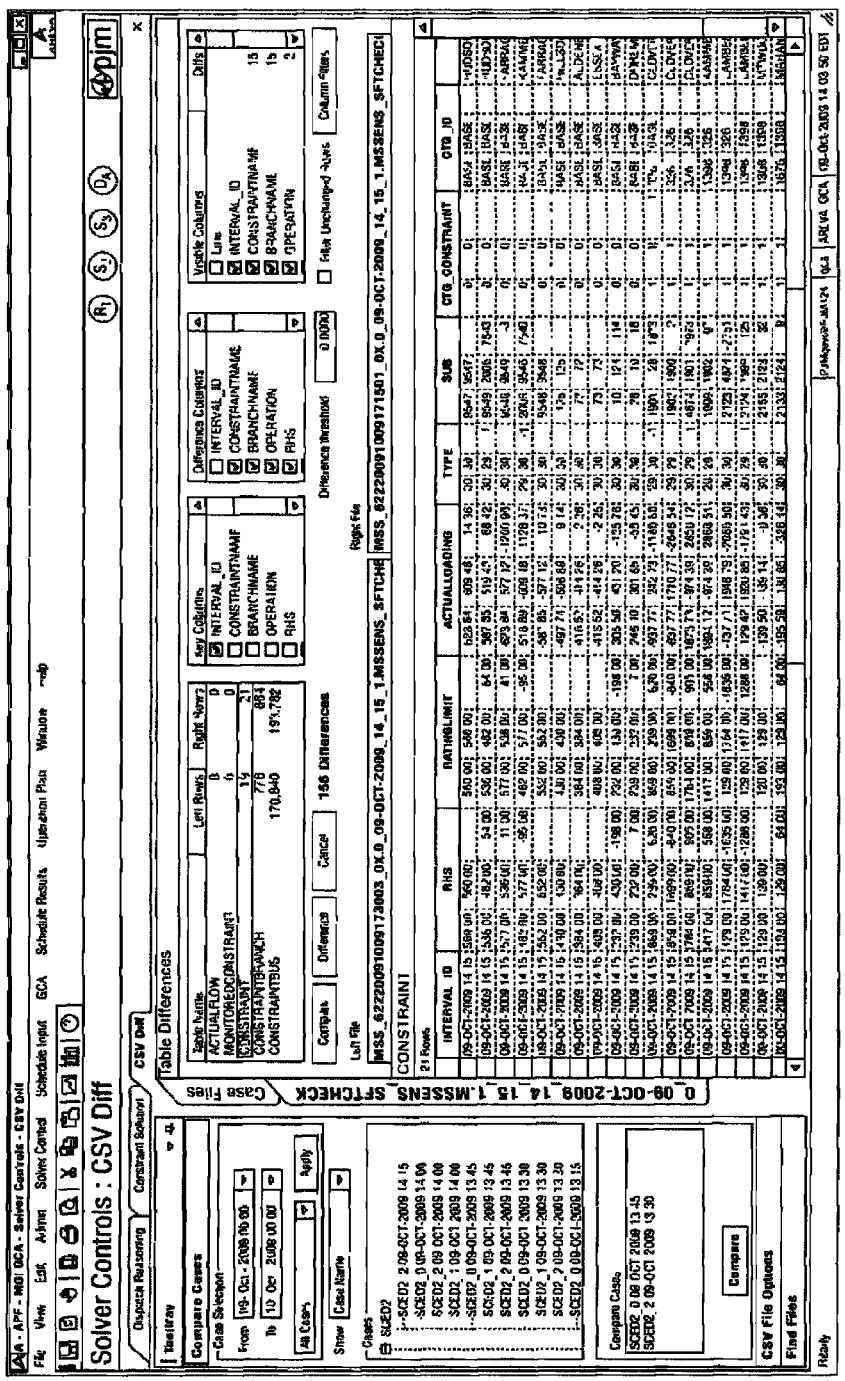
FIG. 27 illustrates another embodiment of the present invention of case comparison.

A list of read-only summary displays for s solutions can be provided, including but are not limited to: performance summary displays for approved cases; saving summary display to show top ten saving units and saving by types, and the like. CSV files, with comma-separated values, are used for the digital storage of data structured in a table of lists form, where each associated item, member in a group is in association with others also separated by the commas of its set used for the digital storage of data structured in a table of lists form. In some embodiments, case comparison can be performed to compare two CSV files based on two cases. FIG. 24 illustrates the market operator interface solution displays. FIG. 25 illustrates a saving summary display to show the top ten saving units and saving by types. FIGS. 26 and 27 illustrate case comparison can be performed to compare two CSV files based on two cases.

Figure 28:
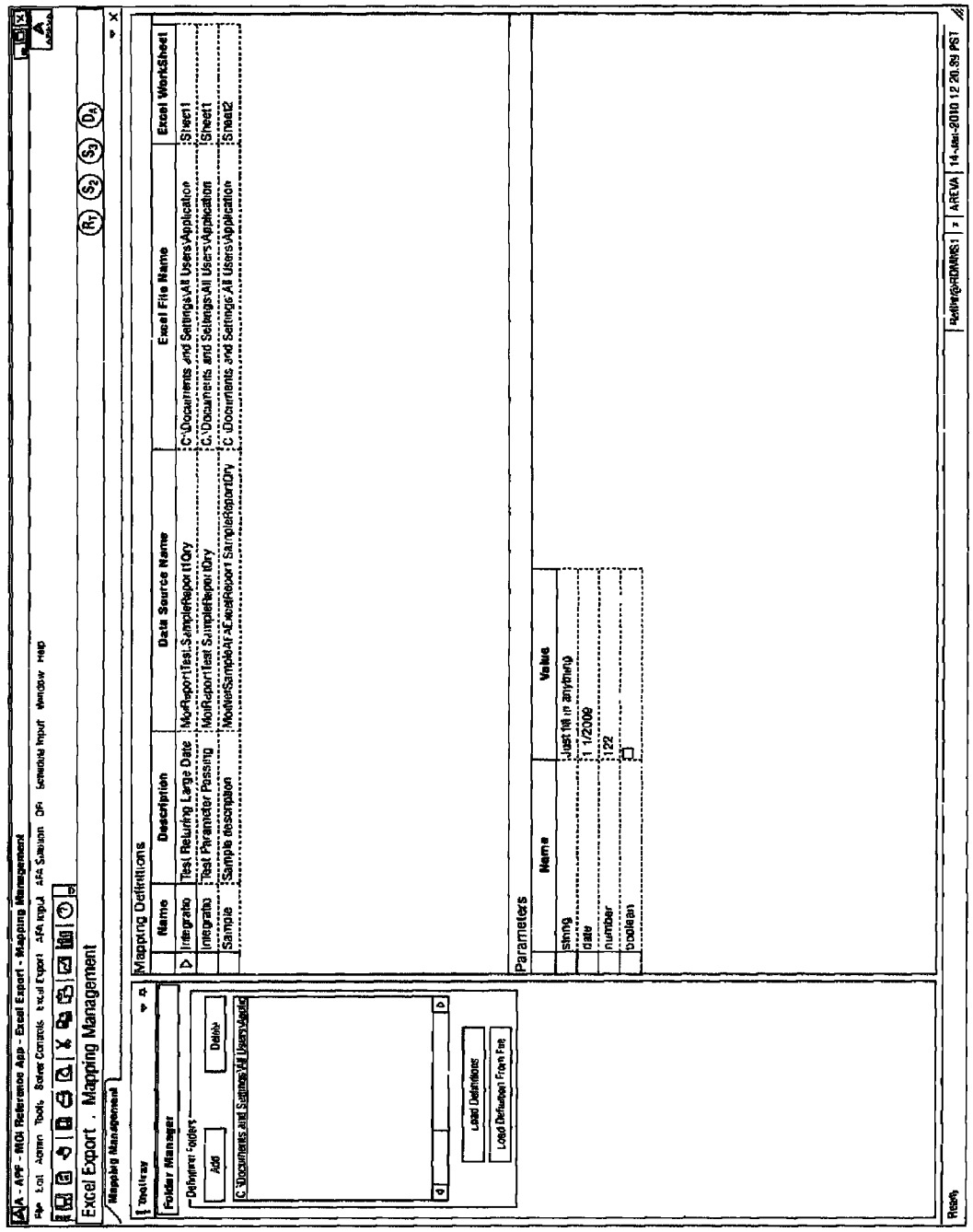
FIG. 28 illustrates an embodiment of the present invention creating and editing mappings.

As a non-limiting example, after the fact analysis can use Excel for reporting purposes. The market operator interface plays a role of defining the excel workbook, worksheet and data source mapping. A user can use the market operator interface to create report mappings and export data to Excel. The report mapping definition can be a file based achieve that can be part of installation and can also be defined by users during runtime. The report mapping definition files can be imported by users and pre-imported by the market operator interface. The data source name can be the name of stored procedure that returns report result data. The mapping defines the Excel workbook and a particular worksheet. The report query parameters are dependent on database query, stored procedure parameters. The data values can be user defined values such as case id, date and areas. The data values can be predefined key words such as current, latest, all and the like. Report mappings grid provides right click context menu run exports, illustrated in FIG. 28.

Figures 29, 30:
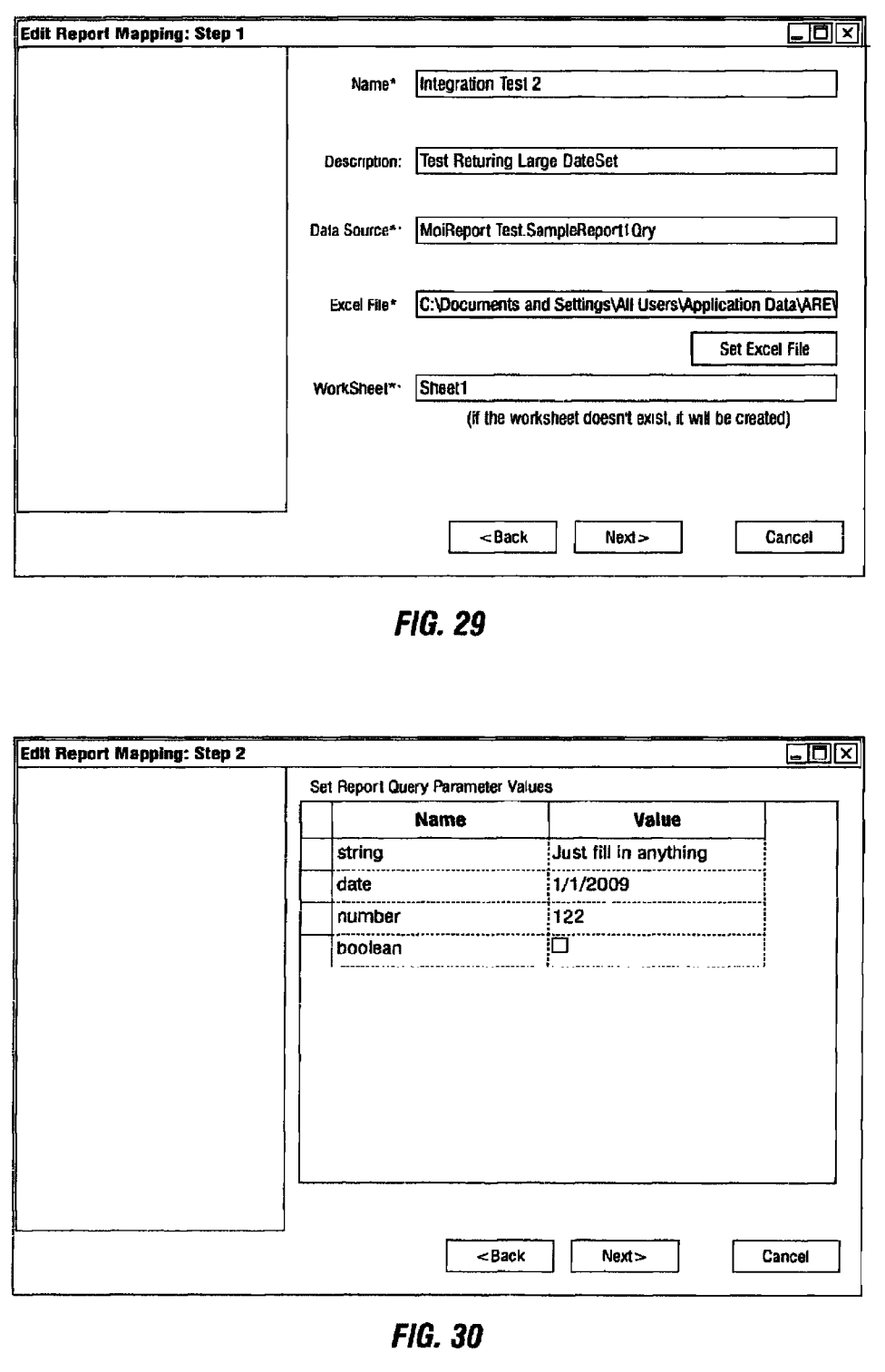
Figure 31:
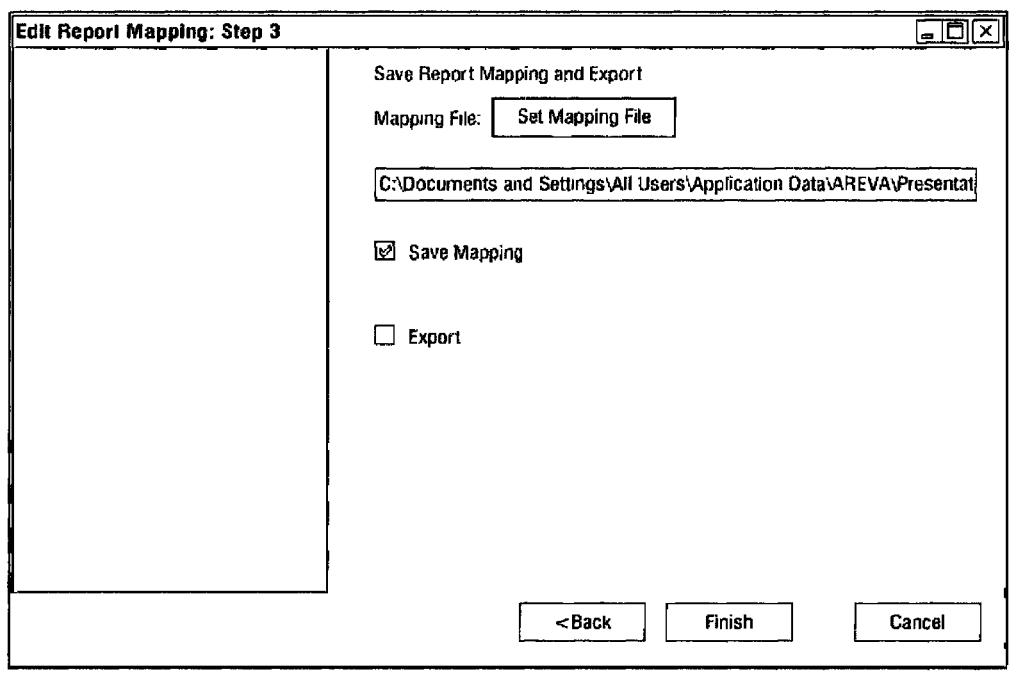

In some embodiments, creating and editing mappings requires a three-step wizard: (i) report mappings grid provides right click context menu to add, edit mapping, where available reports can be driven from database report stored procedures, while worksheet names can be driven by a selected Excel file; (ii) set query procedure parameters stored in a database, FIG. 29, and the like, where values can be textbox, date and decimal input controls that map, data and number in the query parameters; (iii) and the last step is to save the mapping or/and run export, see FIGS. 30 and 31.

Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

What is claimed is:

1. A method for merging different load forecasts for power grid centers, comprising:
providing a plurality of multi-stage engines, each of a multi-stage engine providing at least one of scheduling, commitment of resources, and dispatch of resources;
implementing each of a multi-stage engine at a different time to provide the at least one of scheduling, commitment of resources and dispatch of resources;
accepting area load forecasts from the plurality of multi-stage engines;
saving load forecast data in a data base;
using a processor of a demand forecast integrator to integrate individual load forecasts into a composite load forecast to present a comprehensive, synchronized and harmonized load forecast, the demand forecast integrator including or coupled to a user interface that allows an operator to review input load forecasts and modify load forecasts via an override capability, and an ability to merge multiple load forecasts that cover a same time range to form the composite load forecast, and a persistence resource that supports auditing, and archiving of load forecasts, the demand forecast integrator capable of merging load forecasts from 3rd party engines; and
integrating the at least one of scheduling, commitment of resources and dispatch of resources for all of the multi-stage engines.

2. The method of claim 1, further comprising,
using a programmatic interface that accepts the area load forecasts from load forecast engines.

3. The method of claim 1, further comprising:
merging multiple load forecasts that cover a same time range to form a composite load forecast.

4. The method of claim 1, further comprising:
providing a programmatic interface that allows consuming applications to query for load forecasts covering at least one of a range of areas, intervals, and time ranges.

5. The method of claim 1, further comprising:
providing a persistence store to hold load forecast data.

6. A method for merging different load forecasts for power grid centers, comprising:
providing a plurality of multi-stage engines, each of a multi-stage engine providing at least one of scheduling, commitment of resources, and dispatch of resources;
accepting area load forecasts from load forecast engines within a common service framework;
saving load forecast engine data in a database; and
using a processor of a demand forecast integrator to integrate individual load forecasts into a composite load forecast to present a comprehensive, synchronized and harmonized load forecast, the demand forecast integrator including or coupled to a user interface that allows an operator to review input load forecasts and modify load forecasts via an override capability, and an ability to merge multiple load forecasts that cover a same time range to form the composite load forecast, and a persistence resource that supports auditing, and archiving of load forecasts, the demand forecast integrator capable of merging load forecasts from 3rd party engines.

7. The method of claim 6, further comprising:
integrating an operator interface to support flexible manual override.

8. A method for merging different load forecasts for power grid centers, comprising:
providing a plurality of multi-stage engines, each of a multi-stage engine providing at least one of scheduling, commitment of resources, and dispatch of resources;
accepting area load forecasts from the plurality of multi-stage engines;
serving load forecast requests from different clients with consistent load forecast data; and
using a processor of a demand forecast integrator to integrate individual load forecasts into a composite load forecast to present a comprehensive, synchronized and harmonized load forecast, the demand forecast integrator including or coupled to a user interface that allows an operator to review input load forecasts and modify load forecasts via an override capability, and an ability to merge multiple load forecasts that cover a same time range to form the composite load forecast, and a persistence resource that supports auditing, and archiving of load forecasts, the demand forecast integrator capable of merging load forecasts from 3rd party engines.

9. The method of claim 8, wherein improved load forecasts are provided over different time horizons.

10. The method of claim 8, wherein operator interface to load forecast is streamlined with reduction of repetitive manual entries.

11. The method of claim 8, further comprising:
providing an operator user interface to support manual override capability.

12. A method for merging different load forecasts for power grid centers, comprising:
providing a plurality of multi-stage engines, each of a multi-stage engine providing at least one of scheduling, commitment of resources, and dispatch of resources;
accepting area load forecasts from load forecast engines;
saving load forecast engine data in a database;
using a processor of a demand forecast integrator to integrate individual load forecasts into a composite load forecast to present a comprehensive, synchronized and harmonized load forecast, the demand forecast integrator including or coupled to a user interface that allows an operator to review input load forecasts and modify load forecasts via an override capability, and an ability to merge multiple load forecasts that cover a same time range to form the composite load forecast, and a persistence resource that supports auditing, and archiving of load forecasts, the demand forecast integrator capable of merging load forecasts from 3rd party engines; and
performing at least one of scaling, adding, setting and linear transformation.

13. The method of claim 12, further comprising:
synthesizing a composite load profile for any given scheduling study period.

14. The method of claim 13, further comprising:
using a weighting factor model to synthesize the composite load profile.

15. The method of claim 14, further comprising:
using a set of front end programmings for inputting and retrieving load forecasts along with boundary processing.

16. The method of claim 15, wherein boundary processing includes at least one of priority and averaging.

17. The method of claim 12, further comprising:
providing a middle-tier architecture.

18. The method of claim 17, wherein the middle-tier architecture includes an service layer for web services, and exposes services to client applications.

19. The method of claim 18, wherein the middle-tier architecture includes an internal service layer.

* * * * *